United States Patent [19]

Sano

[11] Patent Number: 5,645,326
[45] Date of Patent: Jul. 8, 1997

[54] TURN CONTROL APPARATUS FOR A VEHICLE

[75] Inventor: Yoshiaki Sano, Okazaki, Japan

[73] Assignee: Mitsubishi Jidosha Kogyo Kabushiki Kaisha, Tokyo, Japan

[21] Appl. No.: 671,641

[22] Filed: Jun. 28, 1996

[30] Foreign Application Priority Data

Jun. 30, 1995 [JP] Japan ................................. 7-166404

[51] Int. Cl.⁶ ........................................................ B60T 8/32
[52] U.S. Cl. ............................. 303/146; 303/147; 303/140
[58] Field of Search ........................................ 303/146, 147, 303/148, 121, 199, 169, 186, 140, 116.1, 119.1; 180/197; 364/426.01, 426.02, 426.03

[56] References Cited

U.S. PATENT DOCUMENTS

| | | | |
|---|---|---|---|
| 5,134,352 | 7/1992 | Matsumoto et al. | 303/146 |
| 5,206,808 | 4/1993 | Inoue et al. | 303/146 |
| 5,344,224 | 9/1994 | Yasuno | 303/146 |
| 5,470,136 | 11/1995 | Tozu et al. | 303/147 |

*Primary Examiner*—Douglas C. Butler

[57] ABSTRACT

A vehicle turn control apparatus includes an electronic control unit, which computes a required control valve for yaw moment control in accordance with the operating condition and/or behavior of a vehicle, actuates a pump when a first predetermined value is reached by the required control valve, and starts operation control for hydraulic pressure control valves when a request for turn control is made after a second predetermined value is reached by the required control valve. Since the pump is already actuated at the start of the control, the turn control can be quickly started without a delay in response to the turn control request. A hydraulic pressure, generated by the pump and adjusted by the hydraulic pressure control valves, is supplied to wheel brakes during the turn control. Thereupon, braking force differences are caused between the wheels of the vehicle, whereby the yaw moment of the vehicle is controlled.

8 Claims, 42 Drawing Sheets

TURN CONTROL APPARATUS FOR A VEHICLE

BACKGROUND OF THE INVENTION

1. Field of the Invention

The present invention relates to a turn control apparatus for a vehicle, and more specifically, to an apparatus for controlling yawing of a vehicle.

2. Description of the Related Art

Yaw rate sensors for detecting yaw rates that indicate the degrees of yawing of objects go into actual use and are used in operation control for vehicles, for example. A vehicle turn behavior control apparatus that uses a yaw rate sensor is disclosed in Jpn. Pat. Appln. KOKAI Publication No. 3-112755. In this control apparatus, the actual yaw rate of a vehicle is detected by means of the yaw rate sensor, and a target yaw rate is computed in accordance with the steering-wheel angle and vehicle velocity. Also, a brake fluid pressure for yaw rate compensation such that the actual yaw rate is approximated to the target yaw rate is computed for each of the inside and outside wheels in a turn. The fluid pressure is supplied to the wheel cylinder of each wheel so that the yaw rate obtained is conformable to the operating conditions of the vehicle.

It is advisable to start the vehicle turn control of this type immediately when it is requested as the vehicle turns yawing excessively or inadequately. Accordingly, the brake fluid pressure for turn control (yaw rate compensation) must be generated as soon as the turn control is requested.

In the case where a pump is used as a source of the brake fluid pressure for turn control, It is to be desired that the pump should be kept continually actuated to shorten a delay in response of the brake fluid pressure to the request for the turn control. In order to meet a demand that the energy consumption for the vehicle drive should be cut down, on the other hand, it is advisable to reduce energy consumed by the actuation of the pump. This may be attained by designing the pump so that it cannot be actuated when the vehicle is not subject to the turn control and can start operation when the turn control is requested. It is difficult, however, fully to raise the fluid pressure the moment the pump is actuated, so that actuating the pump in response to the turn control request is subject to a response delay.

In the apparatus disclosed in Jpn. Pat. Appln. KOKAI Publication No. 3-112755, a brake fluid pressure for turn control, generated by means of a pump, is previously stored in an accumulator, and is supplied to wheel brakes when turn control is started. According to this arrangement, the delay in response to the turn control request can be removed. The use of the accumulator, however, renders the apparatus more complicated in construction and requires a wider installation space. Thus, it is impractical to furnish a small vehicle, such as a passenger car, with the turn control apparatus with accumulator.

SUMMARY OF THE INVENTION

The object of the present invention is to provide a vehicle turn control apparatus with a compact design, capable of quickly starting turn control without a delay in response to a request for the turn control.

According to the present invention, there is provided a vehicle turn control apparatus, which includes a hydraulic circuit connecting a master cylinder connected to a brake pedal and wheel brakes provided correspondingly individually to wheels of a vehicle, a pump adapted to generate and supply a hydraulic pressure to the hydraulic circuit when actuated, and a hydraulic pressure control valve unit arranged in the hydraulic circuit so as to be located between the pump and the wheel brakes and adapted to adjust the hydraulic pressure generated by the pump, and which supplies the hydraulic pressure, generated by the pump and adjusted by means of the hydraulic pressure control valve unit, to one or more required wheel brakes while there is a request for turn control.

The vehicle turn control apparatus comprises required control valve calculating means for deriving a required control valve for yaw moment control in accordance with the operating condition and/or behavior of the vehicle, pre-pressurization control means for actuating the pump when a first predetermined value is reached by the required control valve, and hydraulic pressure control means for controlling the operation of the hydraulic pressure control valve unit in accordance with the required control valve, the hydraulic pressure control means being adapted to discriminate the turn control request and start the operation control for the hydraulic pressure control valve unit when a second predetermined value greater than the first predetermined value is reached by the required control valve.

When the brake pedal is depressed, according to the invention, the master cylinder is actuated so that the hydraulic pressure is supplied to each wheel brake through the hydraulic circuit, whereby the vehicle is braked normally. When the first predetermined value is reached by the required control valve, moreover, the pump is actuated by the pre-pressurization control means, whereupon the hydraulic pressure for the turn control starts to be generated. Thus, the hydraulic pressure is generated before the turn control is requested. When the second predetermined value is reached by the required control valve in this state, that is, when the turn control is requested, actuation control (turn control) for the hydraulic pressure control valve unit by the hydraulic pressure control means is started without regard to the execution of the brake pedal operation. Since the pump is already actuated at the start of the turn control, the required hydraulic pressure can be obtained immediately after the start of actuation of the hydraulic pressure control valve unit. Accordingly, the turn control can be quickly started without a delay in response to the request for the turn control. Thus, it is unnecessary to use the accumulator for compensating for a delay in rise of the hydraulic pressure that is attributable to a delay in actuation of the pump, so that the turn control apparatus can enjoy a simple construction. This makes the apparatus compact in size. Further, the pump can be kept unactuated till the moment just before the start of the turn control, so that the energy consumption for the pump actuation required by the turn control can be made much less than in the case where the pump is actuated continually.

During the turn control, moreover, the operation of the hydraulic pressure control valve unit is controlled so that hydraulic pressure generated by the pump is adjusted by means of the valve unit. The adjusted hydraulic pressure is supplied to the one or more required wheel brakes. Thereupon, a difference is caused between the respective braking forces of specific wheels, whereby the vehicle is controlled in yawing.

Preferably, according to the invention, the pre-pressurization control means causes the hydraulic pressure control means to start the operation control for the hydraulic pressure control valve unit when the first predetermined value is reached by the required control valve. When the pump is actuated with the required controlled variable at the first predetermined value, according to this preferred arrangement, the hydraulic pressure corresponding to the first predetermined value starts to be supplied to the one or more required wheel brakes. As a result, an appropriate pre-pressure is applied to the wheel brake or brakes before the turn control is requested. Thus, an adequate brake pressure can be obtained quickly and securely in response to the request for the turn control, so that the yaw control or turn control can be carried out more satisfactorily.

Further preferably, the pre-pressurization control means causes the hydraulic pressure control means to carry out the operation control for the hydraulic pressure control valve unit so that the hydraulic pressure applied to the one or more required wheel brakes increases gradually. According to this preferred arrangement, the pre-pressure can be prevented from being suddenly applied to the wheel brakes, so that a driver can drive the vehicle without any awkward feeling.

Preferably, moreover, the pre-pressurization control means continues the operation of the pump for a predetermined period of time when the required control valve falls below the first predetermined value after once reaching the first predetermined value. According to this preferred arrangement, the operation of the pump can be prevented from being frequently started and stopped, despite fluctuations of the required control valve in the vicinity of the first predetermined value, so that the load on the pump can be lightened.

Preferably, furthermore, the pre-pressurization control means allows the pump to be operated only when the brake pedal is not operated and if the required control valve is greater than the first predetermined value. According to this arrangement, pre-pressurization is prohibited when the brake pedal is manipulated by the driver, so that the driver can depress the pedal without any awkward feeling. Further, the pre-pressurization control means can prevent the delay in response to the request for the turn control, which involves a problem particularly when the vehicle is not braked or decelerated.

Preferably, according to the invention, the required control valve means includes yaw rate detecting means for detecting the actual yaw rate of the vehicle and setting means for setting the required control valve in accordance with the actual yaw rate detected by the yaw rate detecting means. Further preferably, the required control valve calculating means includes target yaw rate setting means for setting a target yaw rate for the vehicle, the target yaw rate setting means setting the required control valve in accordance with a yaw rate deviation between the actual yaw rate and the target yaw rate or the time derivative of the yaw rate deviation. According to these preferred arrangements, the required control valve can be properly set in accordance with the actual yaw rate, the yaw rate deviation, or the time derivative thereof, and the pre-pressurization before the delivery of the request for the turn control and the turn control after the delivery of the turn control request can be carried out appropriately.

Preferably, furthermore, the pre-pressurization control means causes the hydraulic pressure control means to control the operation of the hydraulic pressure control valve unit so that a braking force applied to one wheel, out of the outside front wheel and inside rear wheel of the vehicle, as viewed with respect to a turn of the vehicle, increases and a braking force applied to the other wheel decreases when the vehicle is braked while turning. According to this preferred arrangement, the turning moment of the vehicle can be effectively promoted or restrained as required by increasing the braking force on the outside front wheel or inside rear wheel and decreasing the braking force on the other wheel, when the vehicle is braked while turning, so that satisfactory turn control can be accomplished.

DETAILED DESCRIPTION OF THE PREFERRED EMBODIMENTS

The following is a description of a brake system furnished with a vehicle turn control apparatus according to one embodiment of the present invention.

Figure 1:
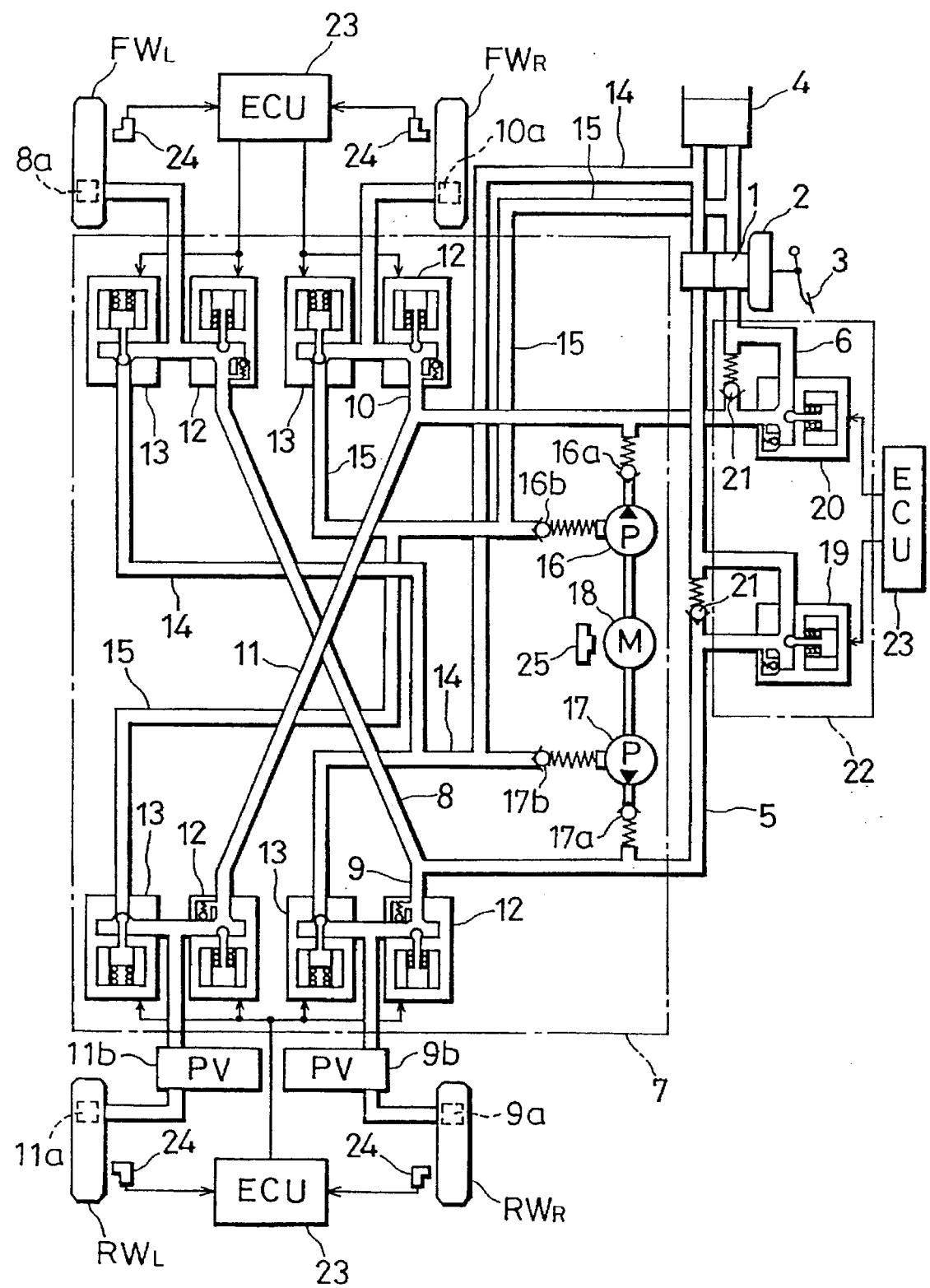
FIG. 1 is a schematic view showing a turn control apparatus according to one embodiment of the present invention along with a brake system attached thereto.

Referring to FIG. 1, the brake system comprises a tandem master cylinder 1, which is connected to a brake pedal 3 through a vacuum brake booster 2. A pair of pressure chambers of the master cylinder 1 are connected to a reservoir 4 on one side, and to main brake lines 5 and 6, individually, on the other side. The lines 5 and 6 extend in a hydraulic unit (HU) 7, and branch into a pair of branch brake lines each.

Brake lines 8 and 9, which diverge from the main brake line 5, are connected to wheel brakes 8a and 9a for front-left and rear-right wheels $FW_L$ and $RW_R$, respectively. On the other hand, brake lines 10 and 11, which diverge from the main brake line 6, are connected to wheel brakes 10a and 11a for front-right and rear-left wheels $FW_R$ and $RW_L$, respectively. Thus, the wheel brakes 8a to 11a for the four wheels are connected to the tandem master cylinder 1 in a cross-piping form.

A solenoid valve is inserted in each of the branch brake lines 8, 9, 10 and 11. Each solenoid valve is composed of an inlet valve 12 and an outlet valve 13. The outlet valve 13 attached to each branch brake line is connected to the reservoir 4 by means of a return line 14 or 15. Thus, the brake pressure for each wheel can be controlled by opening or closing the inlet and outlet valves to supply or discharge the hydraulic pressure to or from each wheel brake. Numerals 9b and 11b denote proportional valves, which are interposed between the rear-left and -right wheel brakes 9a and 11a and the solenoid valves corresponding thereto in order to distribute properly a braking force, which is generated by brake pedal operation, between the front and rear wheels.

The following is a description of the vehicle turn control apparatus used in the brake system.

Part of the turn control apparatus is composed of some components (e.g., brake lines 5 to 11, wheel brakes 8a to 11a, inlet valves 12, and outlet valves 13) of the brake system. Also, the turn control apparatus includes pumps 16 and 17. The respective discharge ports of the pumps 16 and 17 communicate with the intermediate portions of their corresponding main brake lines 6 and 5 through check valves 16a and 17a, respectively, while the intake ports of the pumps 16 and 17 are connected to the return lines 15 and 14 through check valves 16b and 17b, respectively. Also, the pumps 16 and 17 are operatively coupled to a common motor 18. The solenoid valves (inlet and outlet valves 12 and 13) in the branch brake lines 8, 9, 10 and 11 constitute a hydraulic pressure control unit, which adjusts hydraulic pressures that are produced by the pumps 16 and 17.

Further, cutoff valves 19 and 20, formed of solenoid valves, are inserted in the main brake lines 5 and 6, respectively, on the upstream side of the junctions between the line 5 and the pump 17 and between the line 6 and the pump 16. The cutoff valves 19 and 20 constitute a cutoff valve unit (CVU) 22. Moreover, the main brake lines 5 and 6 include bypass lines that bypass the cutoff valves 19 and 20, respectively, and are provided with a relief valve 21 each.

The turn control apparatus is provided with an electronic control unit (ECU) 23, which comprises a microprocessor, memories, such as RAM and ROM, input and output interfaces, etc. The output interface of the ECU 23 is connected with the aforesaid inlet and outlet valves 12 and 13, cutoff valves 19 and 20, and motor 18. The input interface of the ECU 23 is connected electrically with wheel velocity sensors 24, which are attached individually to the wheels, and a rotational speed sensor 25 for detecting the rotational speed of the motor 18. For ease of illustration in FIG. 1, the connections between the motor 18 and the ECU 23 and between the rotational speed sensor 25 and the ECU 23 are omitted.

Figure 2:
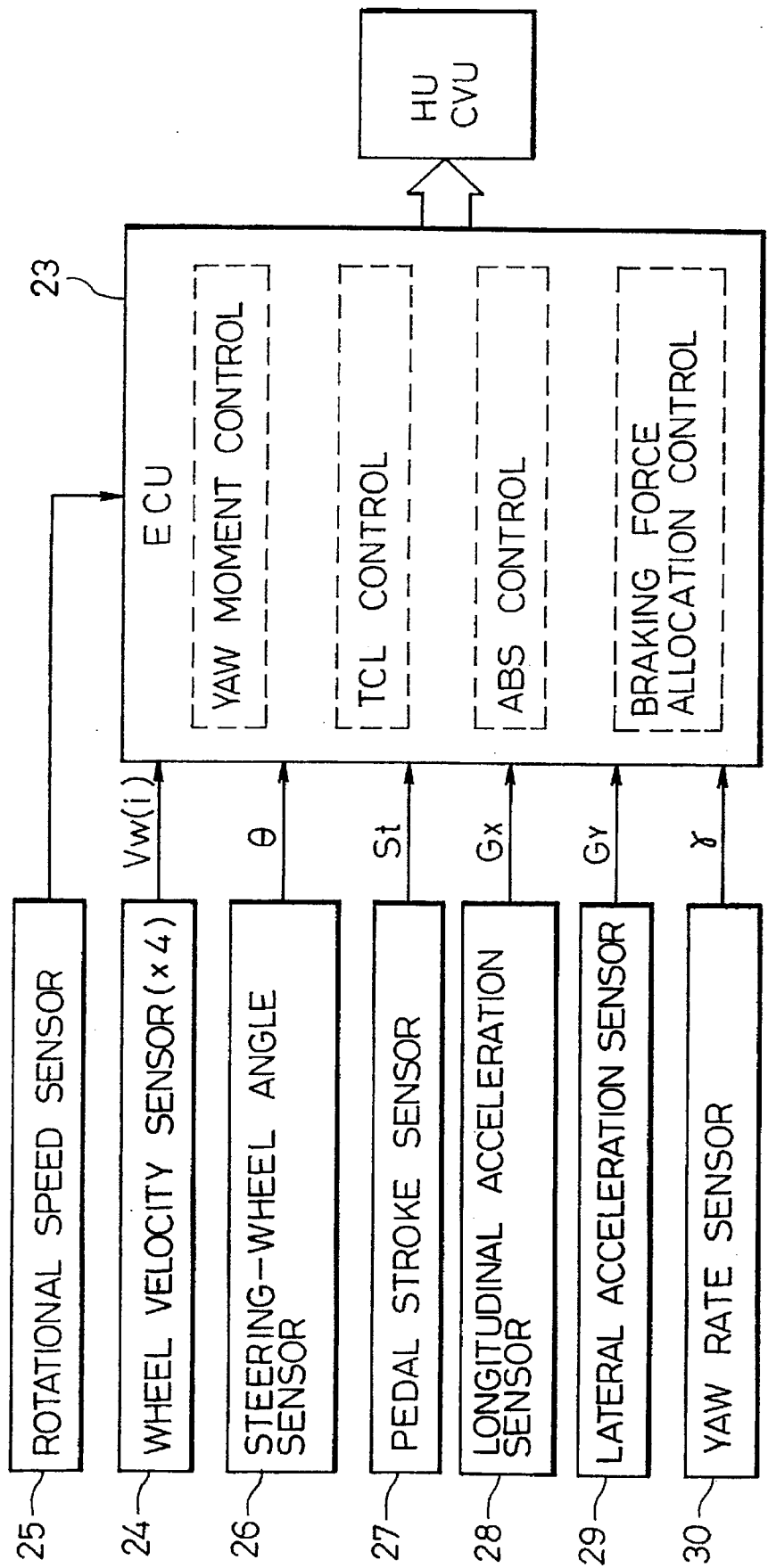
FIG. 2 is a block diagram showing the way an electronic control unit (ECU) shown in FIG. 1 is connected with various sensors and a hydraulic unit (HU)

As shown in FIG. 2, moreover, the input interface of the ECU 23 is connected electrically with a steering-wheel angle sensor 26, pedal stroke sensor 27, longitudinal acceleration sensor 28, lateral acceleration sensor 29, and yaw rate sensor 30, as well as the wheel velocity sensor 24 and the rotational speed sensor 25.

The steering-wheel angle sensor 26 detects the steerage of a steering-wheel angle of a vehicle, that is, steering-wheel angle, while the pedal stroke sensor 27 detects the depth of depression of the brake pedal 3, that is, pedal stroke. The longitudinal and lateral acceleration sensors 28 and 29 detect longitudinal and lateral accelerations that act in the longitudinal and lateral directions of the vehicle, respectively. The yaw rate sensor 30 detects the vehicle yaw angular velocity around a vertical axis that passes through the center of gravity of the vehicle.

Based on sensor signals from the aforementioned various sensors, the ECU 23 controls the operations of the HU 7 and the CVU 22, thereby effecting various vehicle motion control operations. As shown in the block for the ECU 23 in FIG. 2, the vehicle motion control operations include traction control (TCL), anti-skid brake (ABS) control, braking force allocation control, and yaw moment control (yaw control) that is carried out while the vehicle is turning.

Figure 3:
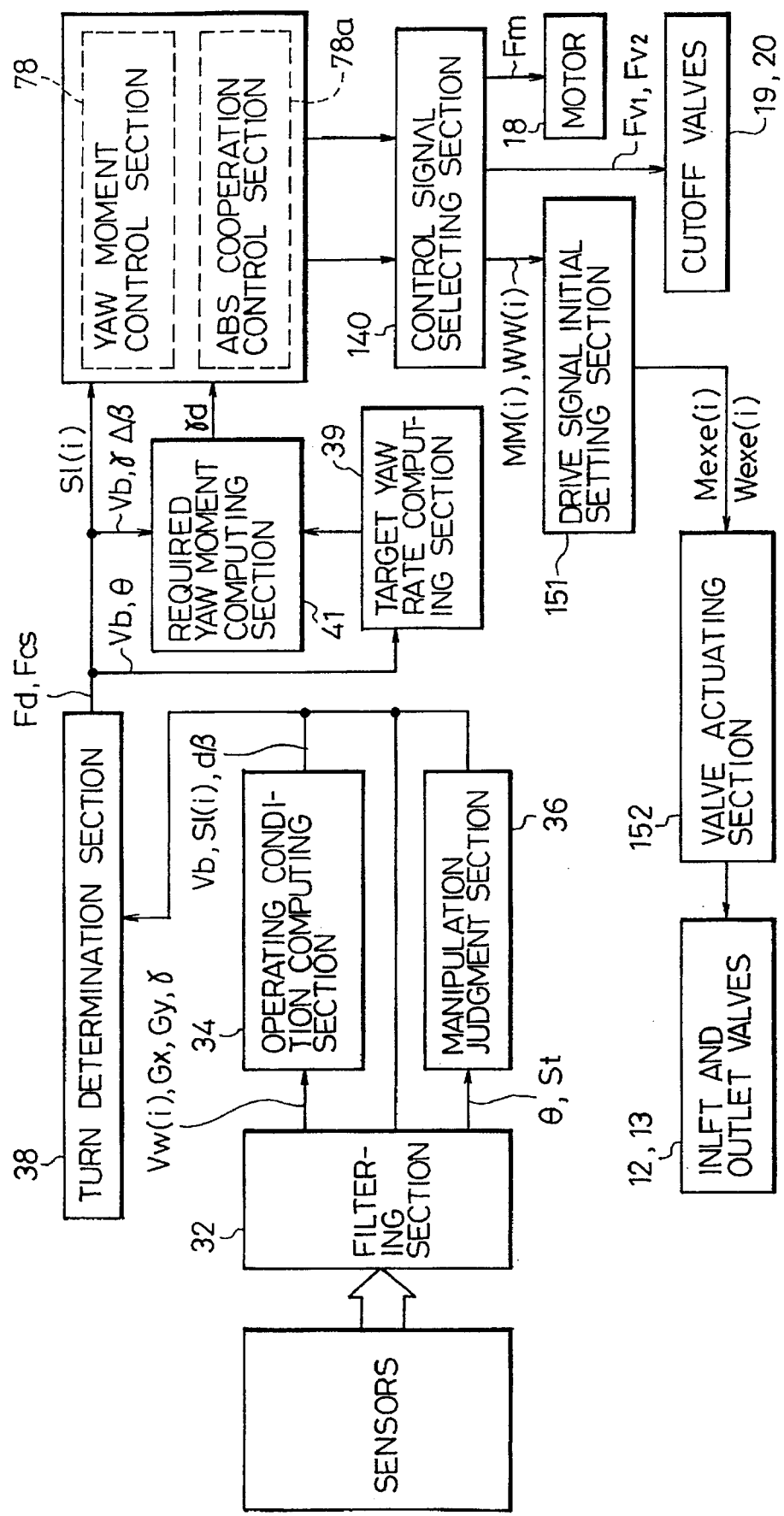
FIG. 3 is a block diagram showing the function of the ECU.
Figure 4:
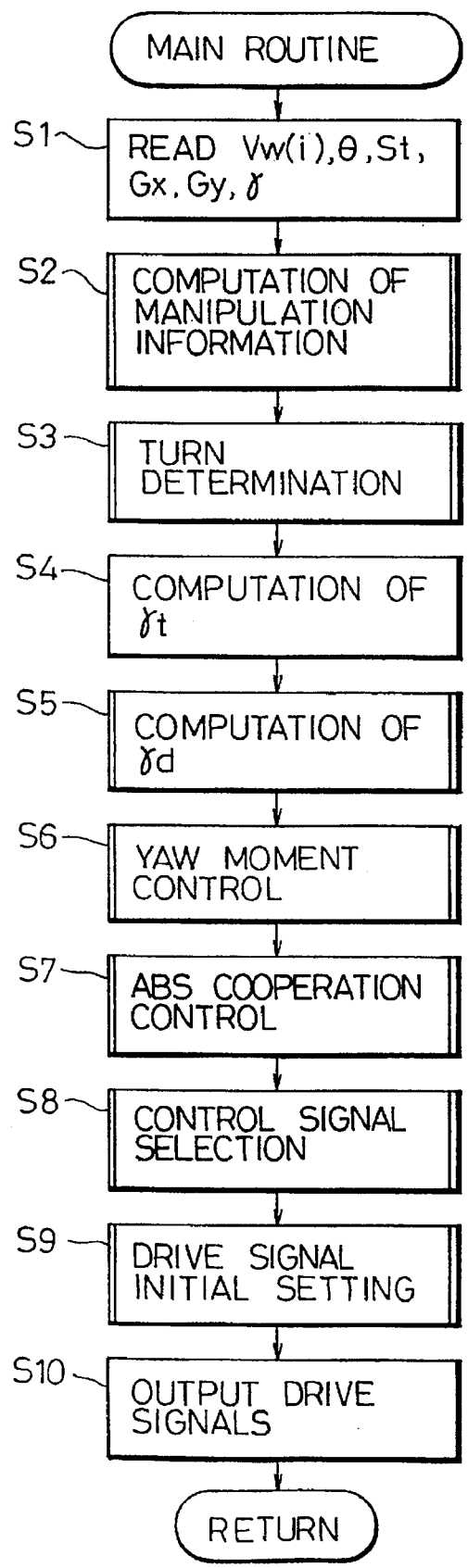
FIG. 4 is a flowchart showing a main routine the ECU executes.

Functionally, the ECU 23 includes various operating sections associated with the yaw moment control, as shown in FIG. 3, and executes a main routine shown in FIG. 4.

More specifically, the ECU 23 comprises a filtering section 32, computing section 34, judgment section 36, and determination section 38. The filtering section 32 receives sensor signals, indicative of wheel velocities Vw(i), longitudinal acceleration Gx, lateral acceleration Gy, yaw rate $\gamma$, steering-wheel angle $\theta$, and pedal stroke St, from the aforesaid various sensors, and subjects these sensor signals to filtering processes. The computing section 34 computes a vehicle operating condition (vehicle body velocity Vb, slip factor Sl(i), and slip angular velocity $d\beta$ at the gravity-center of vehicle) in accordance with the filtered sensor signals Vw(i), Gx, Gy, and $\gamma$. The judgment section 36 judges driver's manipulations (e.g., manipulations on the steering wheel, brake pedal, etc.) by the filtered sensor signals $\theta$ and St. The determination section 38 makes decisions on the vehicle turn direction and countersteer in accordance with the vehicle operating condition and vehicle manipulating condition.

Also, the ECU 23 comprises computing sections 39 and 41 and control sections 78 and 78a. The computing section 39 computes a target yaw rate $\gamma t$ for the vehicle in accordance with the steering-wheel angle $\theta$ and vehicle body velocity Vb. The computing section 41 computes a required yaw moment $\gamma d$ in accordance with the target yaw rate $\gamma t$ and actual yaw rate $\gamma$. The control section 78 delivers a yaw moment control signal in accordance with the required yaw moment $\gamma d$, while the control section 78a delivers a cooperation control while the control section 78a delivers a cooperation control signal for executing yaw moment control in cooperation with the ABS control when the vehicle turns during the ABS control. The control section 78 has a pre-pressurization control function (see pre-pressurization control determination section 100 shown in FIG. 15) to deliver control signals for controlling the operations of the pumps 16 and 17, inlet and outlet valves 12 and 13, and cutoff valves 19 and 20, which are executed in order to apply a pre-pressure to the wheel brake for one or more desired wheels in advance of the yaw moment control.

Further, the ECU 23 comprises a control signal selecting section 140 for delivering a control signal obtained in response to the yaw moment control signal from the control section 78 and the cooperation control signal from the control section 78a, a drive signal initial setting section 151, and a valve actuating section 152. The elements 151 and 152, in cooperation with the selecting section 140, actuate the inlet and outlet valves 12 and 13, cutoff valves 19 and 20, and motor 18.

The yaw moment control function of the ECU 23 will now be described in detail.

Main Routine for Yaw Moment Control

The ECU 23 carries out yaw moment control (turn control) by executing the main routine of FIG. 4 in a control period T of, for example, 8 msec.

Filtering of Sensor Signals

In the main routine, the aforesaid various sensor signals are read by the filtering section 32 of the ECU 23 in Step S1. In Step S2, the various sensor signals are subject to filtering (e.g., a recursion type primary (first order) low-pass filtering) in the filtering section 32.

A recursion type primary low-pass filtering is also used in the filtering processes mentioned later, unless otherwise specified.

Computation of Vehicle Operating Condition Signals

Among the filtered sensor signals, the signals indicative of the wheel velocities Vw(i), longitudinal acceleration Gx, lateral acceleration Gy, and yaw rate $\gamma$ are supplied to the computing section 34. Symbol Vw(i) is used to designate the respective wheel velocities Vw of the four wheels collectively. Character i suffixed to symbol Vw may be any of integers 1, 2, 3 and 4, and suffixes 1, 2, 3 and 4 correspond to the front-left wheel $FW_L$, front-right wheel $FW_R$, rear-left wheel $RW_L$, and rear-right wheel $RW_R$, respectively. In the description to follow, character i suffixed to reference symbols will be used in the same sense.

Based on the filtered signals Vw(i), Gx, Gy, and $\gamma$, the computing section 34 successively computes some pieces of information indicative of the vehicle operating conditions, such as the vehicle body velocity Vb, slip factor Sl(i), and gravity-center slip angular velocity $d\beta$ (gravity-center slip angle $\beta g$).

Computation of Vehicle Body Speed Vb

First, the computing section 34 selects a reference wheel velocity Vs among the wheel velocities Vw(i). Preferably, the velocity of the wheel that is not susceptible to a slip is set as the reference wheel velocity Vs. More specifically, the velocity Vw of the faster driven wheel is selected as the reference wheel velocity Vs when the vehicle is not braked, and the velocity Vw of the fastest wheel when the vehicle is braked. Whether the vehicle is braked or not is determined by the value of a brake flag Fb (mentioned later), which is set in response to the depressing operation of the brake pedal 3.

Then, the computing section 34 computes the gravity-center velocity (vehicle body velocity in the center of gravity) Vcg of the vehicle in accordance with the reference wheel velocity Vs. When the vehicle is turning, the gravity-center velocity Vcg is computed in consideration of the difference (inside-outside wheel velocity difference) $\Delta$Vif between the respective velocities of the inside and outside front wheels, inside-outside wheel velocity difference $\Delta$Vir on the rear-wheel side, and front-rear wheel velocity ratio (velocity ratio between front and rear wheels) Rv. More simply, the gravity-center velocity is regarded as substantially equal to an intermediate value between the front- and rear-axle velocities. In stead of using the inside-outside wheel velocity difference $\Delta$Vif or $\Delta$Vir on the front- or rear-wheel side, moreover, ½ of an average inside-outside wheel velocity difference $\Delta$Via, which is an average of the differences $\Delta$Vif and $\Delta$Vir, may be used.

In the case of a front-engine front-drive (FF) car, the reference wheel velocity Vs (velocity of outside rear wheel) is corrected by means of ½ of the average inside-outside wheel velocity difference $\Delta$Via, and is further corrected by means of the reciprocal of the front-rear wheel velocity ratio Rv, which is indicative of the difference between velocities in the rear axle position and gravity-center position. By doing this, the gravity-center velocity Vcg of the vehicle turning without being braked can be obtained (See, to the following equation).

$$Vcg0 = (Vs - \Delta Via/2) \times \{1 + (1/Rv)\}/2,$$

where Vcg0 is the gravity-center velocity obtained before the filtering process (mentioned later).

On the other hand, the gravity-center velocity Vcg0 of the FF vehicle turning with the brakes on is computed as follows by correcting the reference wheel velocity Vs (velocity of outside front wheel) by means of ½ of the average inside-outside wheel velocity difference $\Delta$Via and the difference between velocities in the front axle position and gravity-center position:

$$Vcg0 = (Vs - \Delta Via/2) \times (1 = RV)/2.$$

Whether the vehicle is braked or not is determined by the brake flag Fb.

In connection with the computation of the gravity-center velocity Vcg0, the inside-outside wheel velocity differences $\Delta$Vif and $\Delta$Vir between the front wheels and between the rear wheels are expressed as follow:

$\Delta$Vif=$\gamma \times$Tf, $\Delta$Vir=$\gamma \times$Tr, $\Delta$Via=$\gamma \times$(Tf+Tr)/2, where $\gamma$, Tf and Tr are the yaw rate, front tread, and rear tread, respectively.

If the center of turn of the vehicle is on an extension of the rear axle and when the vehicle is turning clockwise, front-rear wheel velocity ratios Rvr and Rvl on the right- and left-wheel sides are expressed as follow:

Rvr=cos($\delta$),

Rvl$\equiv$cos($\delta$), where $\delta$ is the front-wheel steering angle (obtainable by dividing the steering wheel angle by the steering gear ratio).

As is evident from the above equations, the front-rear wheel velocity ratio Rv can be given by cos($\delta$) without regard to the side, right or left, on which the wheels are situated.

However, the above equations hold true only when the vehicle is running at low velocity (more accurately, when the lateral acceleration Gy is low). Accordingly, the correction of the gravity-center velocity Vcg by means of the front-rear wheel velocity ratio Rv is carried out only when the vehicle is running at low velocity. Thus, the wheel velocity ratio Rv is set at the value cos($\delta$) if a vehicle body velocity Vbm which is computed in the manner mentioned later in the preceding cycle of the main routine is lower than a determined value (e.g., 30 km/h), and at 1 if the vehicle body velocity Vbm is not lower than the determined value.

As described above, the gravity-center velocity Vcg0 is computed in accordance with the reference wheel velocity Vs, yaw rate $\gamma$, steering wheel angle $\theta$, and the other known values Tf and Tr. Subsequently, a filtered gravity-center velocity Vcg is obtained as follows by continuously filtering the gravity-center velocity Vcg0 twice (fc=6 Hz):

$$Vcg=LPF (LPF (Vcg0)).$$

Since the gravity-center velocity Vcg is equal to the vehicle body velocity Vb, normally, it is set as the vehicle body velocity Vb as follow:

$$Vb=Vcg.$$

In a situation such that the ABS control is started for the selected wheel that rotates at the reference wheel velocity Vs and tends to lock, however, the reference wheel velocity Vs is substantially reduced owing to a slip of the selected wheel, and does not represent the actual vehicle body velocity any longer. Therefore, in the case where the vehicle is driven in this decelerate condition so that a requirement (separation condition) that the vehicle body velocity Vb should be obtained independently of the gravity-center velocity Vcg is fulfilled, i.e., for example, if a gravity-center velocity changing rate dVcg/dt continues to be not higher than a separation determination value Gxs for a predetermined period of time (e.g., 50 msec) or if the velocity changing rate dVcg/dt is not higher than a determination value (e.g., −1.4 g), then the vehicle body velocity Vb is estimated from the following equation:

$$Vb=Vbm-\Delta G,$$

where $\Delta$G is the gradient of decrease of the vehicle body velocity from the vehicle body velocity Vbm obtained in the control cycle immediately before the establishment of the separation condition.

The gradient $\Delta$G and the separation determination value Gxs are computed according to the following equations:

$$\Delta G=(|Gx|+0.15),$$

$$Gxs=-(|Gx|+0.2),$$

provided that −1.2 g$\leq\Delta$G$\leq$−0.3 g and −1.4 g$\leq$Gxs$\leq$−0.35 g are given.

If the gravity-center velocity Vcg exceeds the vehicle body velocity Vbm before the establishment the separation condition while the yaw moment control is being executed using the estimated vehicle body velocity Vb, a separation termination condition is established. In this case, Just as before the establishment of the separation condition, the gravity-center velocity Vcg is set as the vehicle body velocity Vb.

Computation of Slip Factor Sl(i)

A reference wheel position velocity Vr(i) for each wheel is computed according to the following equation by correcting the computed or estimated vehicle body velocity Vb by means of the average inside-outside wheel velocity difference $\Delta$Via and the front-rear wheel velocity ratio Rv:

$$Vr(i)=Vb\times 2/(1+Rv)+(\text{or }-)\ Via/2.$$

The above equation includes the arithmetic symbol that connects the first term thereof associated with the vehicle body velocity Vb and the velocity ratio Rv and the second term thereof associated with the average inside-outside wheel velocity difference ΔVia.

In case that the vehicle turns clockwise, the sign of the arithmetic symbol is positive (+) at the reference wheel position velocity corresponding to the outside front or rear wheel, so that the first and second terms are added together. The sign of the arithmetic symbol is negative (−) at the reference wheel position velocity corresponding to the inside front or rear wheel, so that the second term is subtracted from the first term. In case that the vehicle turns counterclockwise or makes a left-hand turn, the sign of the arithmetic symbol is the reverse of that of the clockwise vehicle turning.

Subsequently, an unfiltered slip factor Sl0(i) is obtained for each wheel from the reference wheel position velocity Vr(i) and the wheel velocities Vw(i) according to the following equation, and is then filtered (fc=10 Hz) to obtain the factor Sl(i):

$$Sl0(i)=(Vr(i)-Vw(i))/Vr(i),$$

$$Sl(i)=LPF(Sl0(i)).$$

Computation of Gravity-Center Slip Angle Speed dβ

If the angular velocity around the center of turn of the vehicle (velocity of vehicle revolution) is ω, the relation between the gravity-center slip angular velocity dβ and the yaw rate γ is expressed as follows:

$$\gamma=d\beta(=\beta g)+\omega$$

If the gravity-center slip angle βg is small, there are relations:

$$Gy=V\times\omega,$$

$$Vb=V\times\cos(\beta g)=V,$$

where V is the vehicle velocity.

Eliminating ω and V from the above three equations, an unfiltered gravity-center slip angular velocity dβ0 is obtained as follows:

$$d\beta 0=\omega-Gy/Vb.$$

Then, the gravity-center slip angular velocity dβ is obtained by filtering (fc=2 Hz) the slip angular velocity dβ0 as follows:

$$d\beta=LPF(d\beta 0).$$

In order to make the sign of the gravity-center slip angular velocity dβ positive on the understeer (US) side and negative on the oversteer (OS) side, without regard to the vehicle turn direction, the computed slip angular velocity dβ is multiplied by −1 to be inverted in sign when the vehicle turns clockwise.

If Vb<10 km/h is met when the vehicle runs at low velocity, the computation of the gravity-center slip angular velocity dβ is inhibited to prevent overflowing of computations. In this case, the slip angular velocity dβ is regarded as zero.

Judgment of Manipulations

In Step S2 shown in FIG. 4, the judgment section 36 of FIG. 3 computes several pieces of information for the judgment of the driver's manipulations (e.g., manipulations on the steering wheel, brake pedal, etc.) in the following manner, in accordance with the filtered steering wheel angle θ and the pedal stroke St supplied from the filtering section 32.

Computation of Steering Wheel Angular Velocity θa

Figure 5:
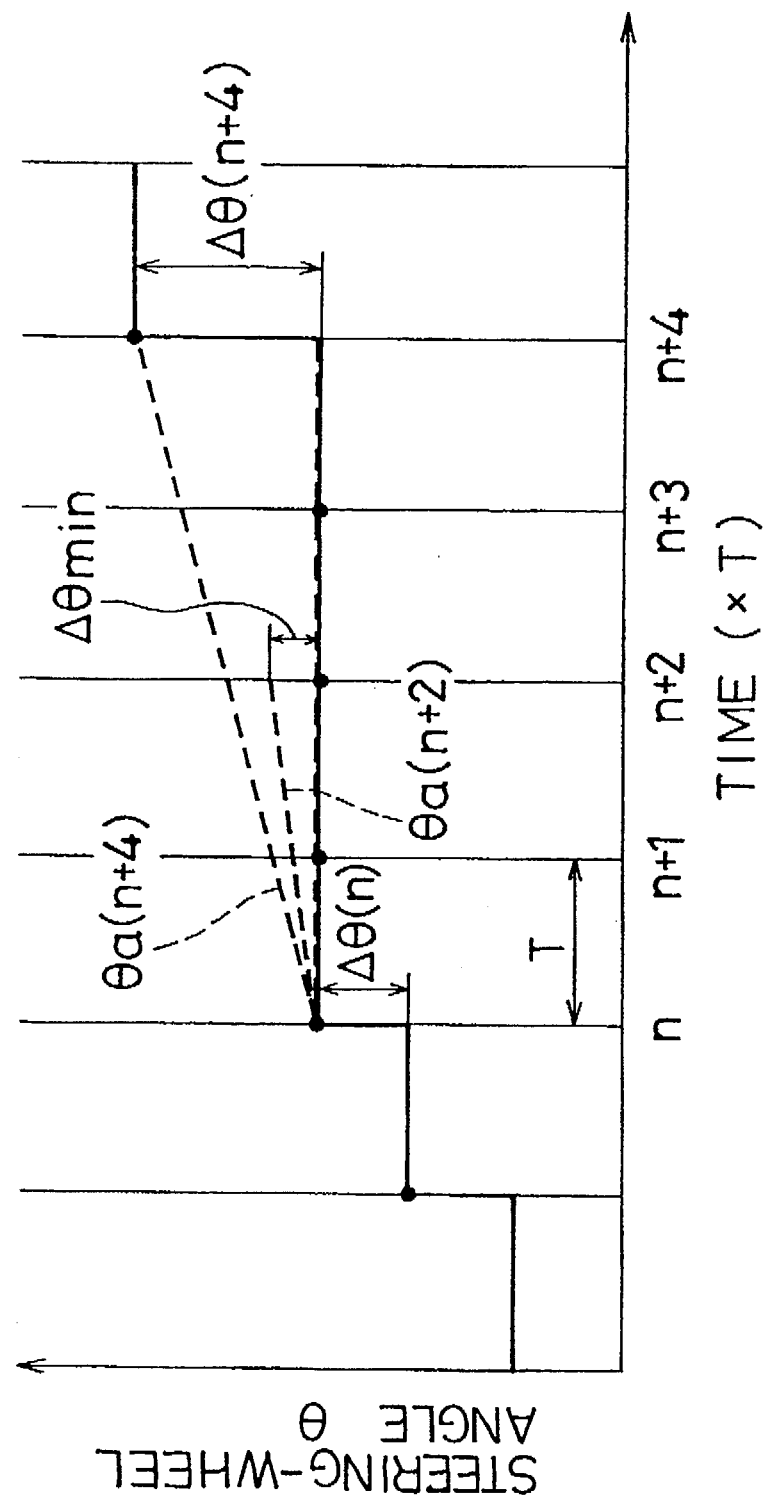
FIG. 5 is a graph showing the time-dependent change of a steering-wheel angle $\theta$ caused when a steering wheel is manipulated.

A steering wheel angular velocity θa can be obtained by dividing the variation of the steering wheel angle θ by the time required for the change. If the steering wheel angle θ is changed by Δθ(n+4) during the period between times n and n+4, as shown in FIG. 5, for example, a steering wheel angular velocity θa0(n+4) at time n+4 is calculated as follows:

$$\theta a0(n+4)=\Delta\theta(n+4)/(4\times T),$$

where T is the control period for the aforementioned main routine.

When the steering wheel angle θ is not changed, the steering wheel angular velocity θa is computed on the assumption that the angle θ is changed by a minimum variation Δθmin in the same direction for its last change. The steering wheel angular velocity θa is obtained by dividing the minimum variation Δθmin by a period of time for which the steering wheel angular velocity is computed. For example, a steering wheel angular velocity θa0(n+2) for the period between times n and n+2 is computed as follows:

$$\theta a0(n+2)=\Delta\theta\min/(2\times T).$$

Then, the steering wheel angular velocity θa0 is filtered (fc=2 Hz), whereupon the filtered steering wheel angular velocity θa is obtained as follows:

$$\theta a=LPF(\theta a0)$$

Computation of Effective Steering Wheel Angular Velocity Value θae

An effective steering wheel angular velocity θae is obtained by filtering the absolute value of the steering wheel angular velocity θa as follows:

$$\theta ae=LPF(|\theta a|).$$

The cutoff frequency fc for this filtering process is changed depending on the changing direction of the steering wheel angle θa. For example, the cutoff frequency fc is set at 20 Hz in the direction for the increase of the steering wheel angle θa and at 0.32 Hz in the direction for the decrease of the angle θa.

Computation of Pedal Stroke Velocity Vst

A stroke velocity Vst of the brake pedal 3 is obtained by filtering (fc=1 Hz) finite differences in the pedal stroke St as follows:

$$Vst = LPF(St(n) - St(n-1)),$$

where St(n−1) is a pedal stroke read in Step S1 during the execution of the preceding routine, and St(n) is a pedal stroke read during the present routine.

Setting of Brake Flag Fb

The brake flag Fb is set in accordance with the pedal stroke St and the pedal stroke velocity Vst. Specifically, the brake flag Fb is set at 1 if the pedal stroke St exceeds a depth of depression Ste for actually raising the pressure in the master cylinder 1 as the brake pedal 3 depressed (St>Ste) or if the pedal stroke velocity Vst is higher than a determination value, e.g., 50 mm/s (Vst>50 mm/s). In other cases, the brake flag Fb is set at 0.

The brake flag Fb is used in selecting the reference wheel velocity Vs or computing the gravity-center velocity Vcg.

Setting of Augmented Depression Flag Fpp

Figure 6:
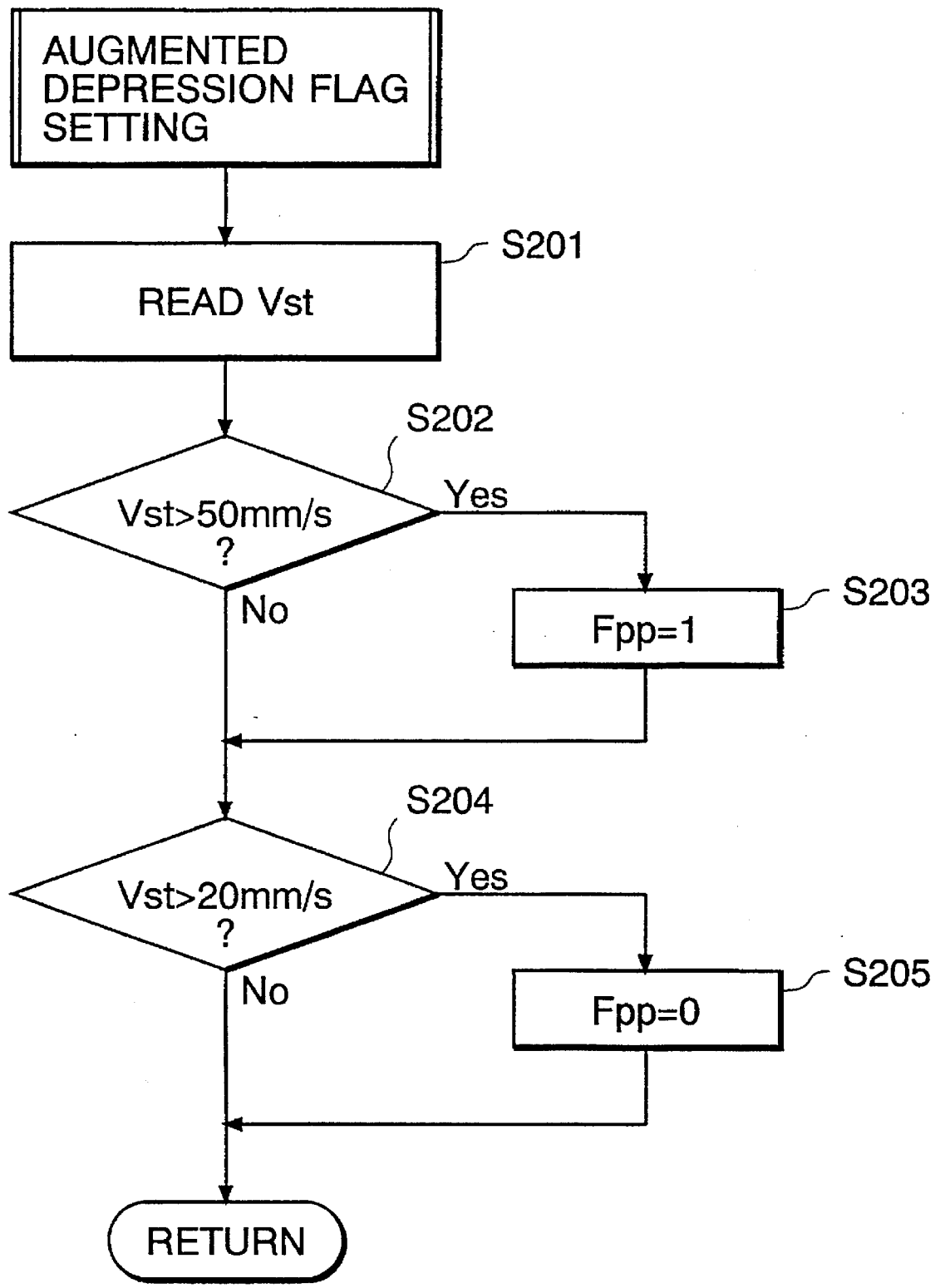
FIG. 6 is a flowchart showing the details of an augmented brake pedal depression flag setting routine shown in FIG. 4.

When the pedal stroke velocity Vst is read (Step S201) in an augmented depression flag setting routine shown in FIG. 6, an augmented brake pedal depression flag Fpp is set (Steps S203 and S205) in accordance with the decisions in Steps S202 and S204.

Thus, the augmented depression flag Fpp associated with the brake pedal is reset at 1 if the pedal stroke velocity Vst is higher than the determination value 50 mm/s and at 0 if the velocity Vst is lower than a determination value 20 mm/s.

Turn Determination

Figure 7:
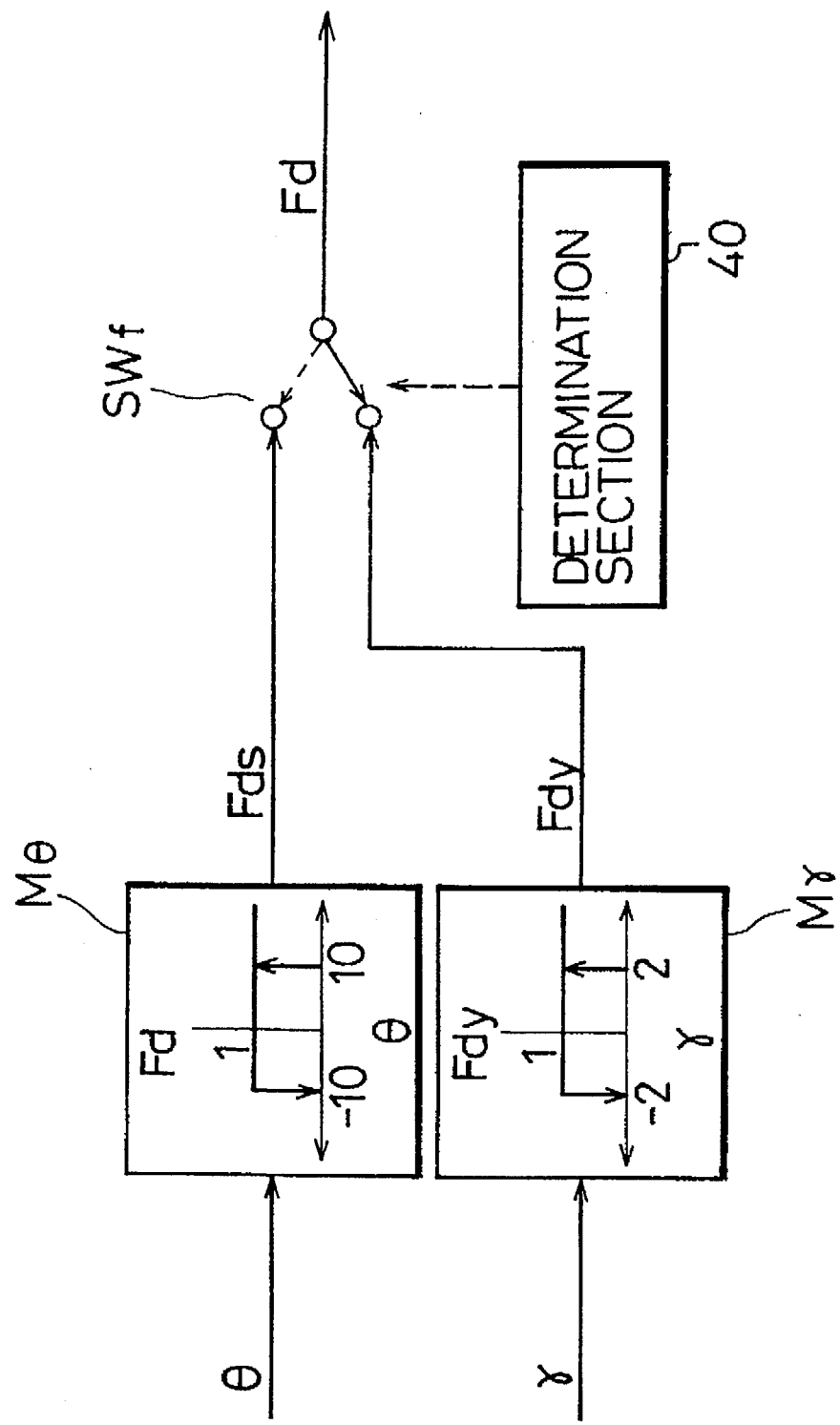
FIG. 7 is a block diagram showing the details of a turn determination section shown in FIG. 3.
Figure 8:
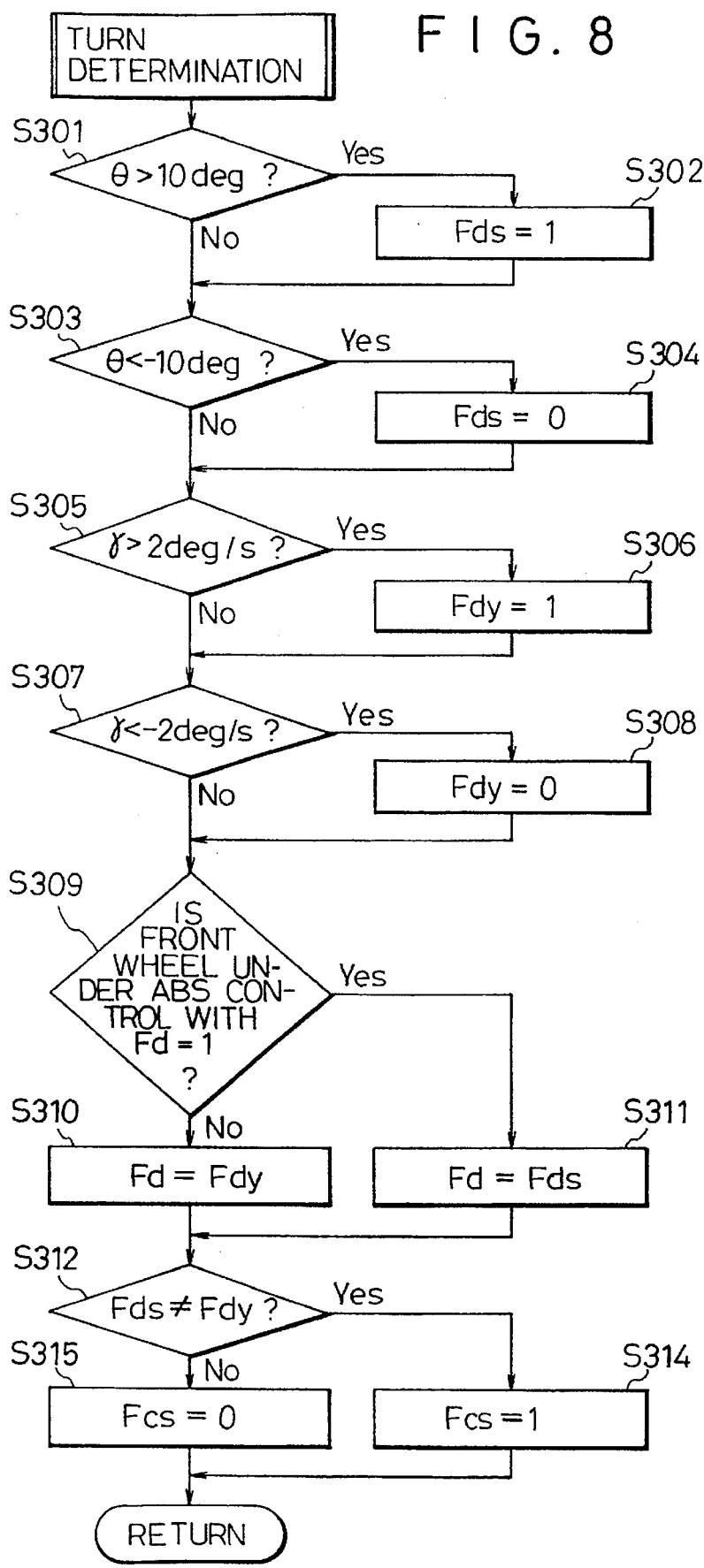
FIG. 8 is a flowchart showing the details of a turn determination routine executed in the turn determination section.

When the various pieces of information indicative of the vehicle operating conditions and information for the judgment of the driver's manipulations are obtained in the aforementioned manner, turn determination to make decisions on the vehicle turn direction and countersteer is carried out in accordance with the steering wheel angle $\theta$ and the yaw rate $\gamma$ by the determination section 38 shown in FIG. 3 in Step S3 of FIG. 4. FIGS. 7 and 8 show the details of the determination section 38 and Step S3 for turn determination, respectively.

First, a steering-wheel-angle-based turn direction flag Fds is determined on the basis of the steering wheel angle $\theta$ according to a map M$\theta$ shown in the block diagram of FIG. 7. Specifically, the turn direction flag Fds is set at 1, which is indicative of a clockwise turn of the vehicle, if the steering wheel angle $\theta$ exceeds a determination value (e.g., 10 deg) in the positive direction (Steps S301 and S302 of FIG. 8). If the steering wheel angle $\theta$ exceeds a determination value (e.g., −10 deg) in the negative direction, on the other hand, the flag Fds is set at 0, which is indicative of a counterclockwise turn of the vehicle (Steps S303 and S304). In the case where the steering wheel angle $\theta$ is within the range, $-10 \text{ deg} \leq \theta \leq 10 \text{ deg}$, the turn direction flag Fds is kept at the value set in the preceding routine.

Also, a yaw-rate-based turn direction flag Fdy is determined on the basis of the yaw rate $\gamma$ according to a map M$\gamma$ shown in the block diagram of FIG. 7. Specifically, the turn direction flag Fdy is set at 1, which is indicative of a clockwise turn of the vehicle, if the yaw rate $\gamma$ exceeds a determination value, 2 deg/s in the positive direction (Steps S305 and S306). If the yaw rate $\gamma$ exceeds a determination value −2 deg/s in the negative direction, on the other hand, the flag Fdy is set at 0, which is indicative of a counterclockwise turn of the vehicle (Steps S307 and S308). It is to be understood that the turn direction flag Fdy is kept at the value set in the preceding routine in the case where the yaw rate $\gamma$ is within the range, $-2 \text{ deg/s} \leq \gamma \leq 2 \text{ deg/s}$.

When the turn direction flags Fds and Fdy are set in this manner, one of them is selected as a turn flag Fd by a switch SWf shown in FIG. 7. The switch SWf is shifted in response to a switching signal delivered from a determination section 40 shown in FIG. 7.

If a condition that at least one front wheel is under the ABS control with the brake flag Fb set at 1 is met, the determination section 40 delivers a switching signal to shift the switch SWf to an upper operating position, as indicated by broken-line arrow in FIG. 7. In this case, the steering-wheel-angle-based turn direction flag Fds is selected as the turn flag Fd (Fd=Fds; see Steps S309 and S311 of FIG. 8 for this flag setting). If the aforesaid condition is not met, on the other hand, the switch SWf is shifted to a lower operating position, as indicated by full-line arrow in FIG. 7. In this case, the yaw-rate-based turn direction flag Fdy is selected as the turn flag Fd (Fd=Fdy; see Steps S309 and S310 of FIG. 8).

After the turn flag Fd is set in this manner, it is further determined in Step S312 of FIG. 8 whether or not the respective values of the turn direction flags Fds and Fdy are not equal from each other. If the decision in this step is Yes, that is, if the yawing direction of the vehicle does not agree with the operating direction of the steering wheel, 1 is set in a countersteer flag Fcs (Step S314). If the decision in Step S312 is No, on the other hand, 0 is set in the countersteer flag Fcs (Step S315).

Computation of Target Yaw Rate $\gamma t$

When the routine of FIG. 4 advances from Step S3 to Step S4, the target yaw rate $\gamma t$ of the vehicle is computed in the computing section 39 shown in FIG. 3.

Figure 9:
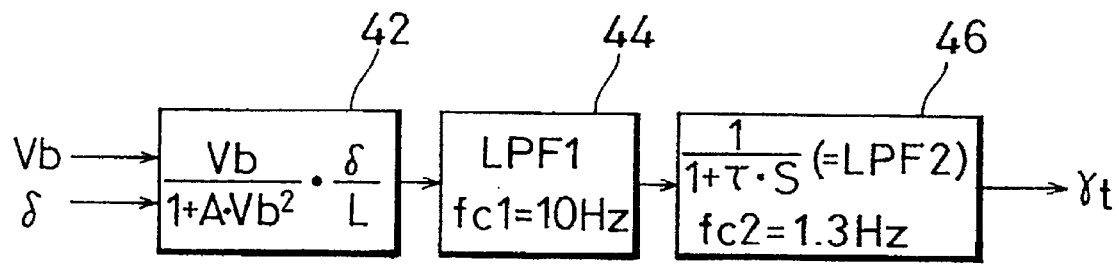
FIG. 9 is a block diagram showing the details of a target yaw rate computing section shown in FIG. 3.

Specifically, the front-wheel steering angle $\delta(\delta=\theta/\rho)$, which is obtained by dividing the steering wheel angle $\theta$ by a steering gear ratio $\rho$, and the vehicle body velocity Vb are first supplied to a computing section 42, as shown in FIG. 9. In the computing section 42, a steady-state gain, which is indicative of a steady-state value of the yaw rate response to the vehicle steering, is obtained from a linear two-wheel model of the vehicle. In a block 44, filtering is carried out using a low-pass filter (LPF1) for noise removal. Then, in a block 46, filtering is carried out using a low-pass filter (LPF2) for the first-order-delay response. Thereupon, the target yaw rate $\gamma t$ is obtained.

Specifically, the target yaw rate $\gamma t$ is computed as follows:

$$\gamma t = LPF2[LPF1\{Vb/(1+A \times Vb^2) \times (\delta/L)\}],$$

where A and L are a stability factor and a wheel base, respectively.

Computation of Required Yaw Moment $\gamma d$

When the target yaw rate $\gamma t$ is computed in Step S4 of FIG. 4, the required yaw moment $\gamma d$ is computed in Step S5 by the computing section 41 shown in FIG. 3. The details of the computing section 41 and Step S5 are shown in the block diagram of FIG. 10 and the flowchart of FIG. 11, respectively.

Figure 10:
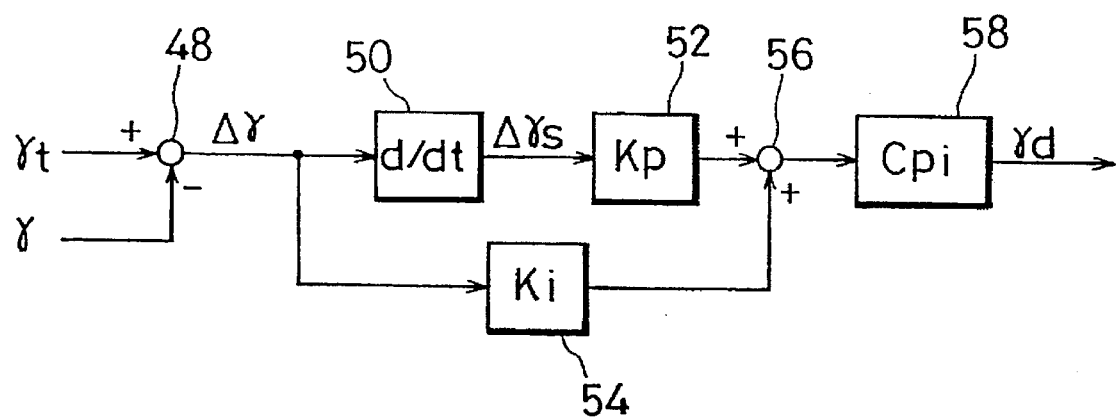
FIG. 10 is a block diagram showing the details of a required yaw moment computing section shown in FIG. 3.
Figure 11:
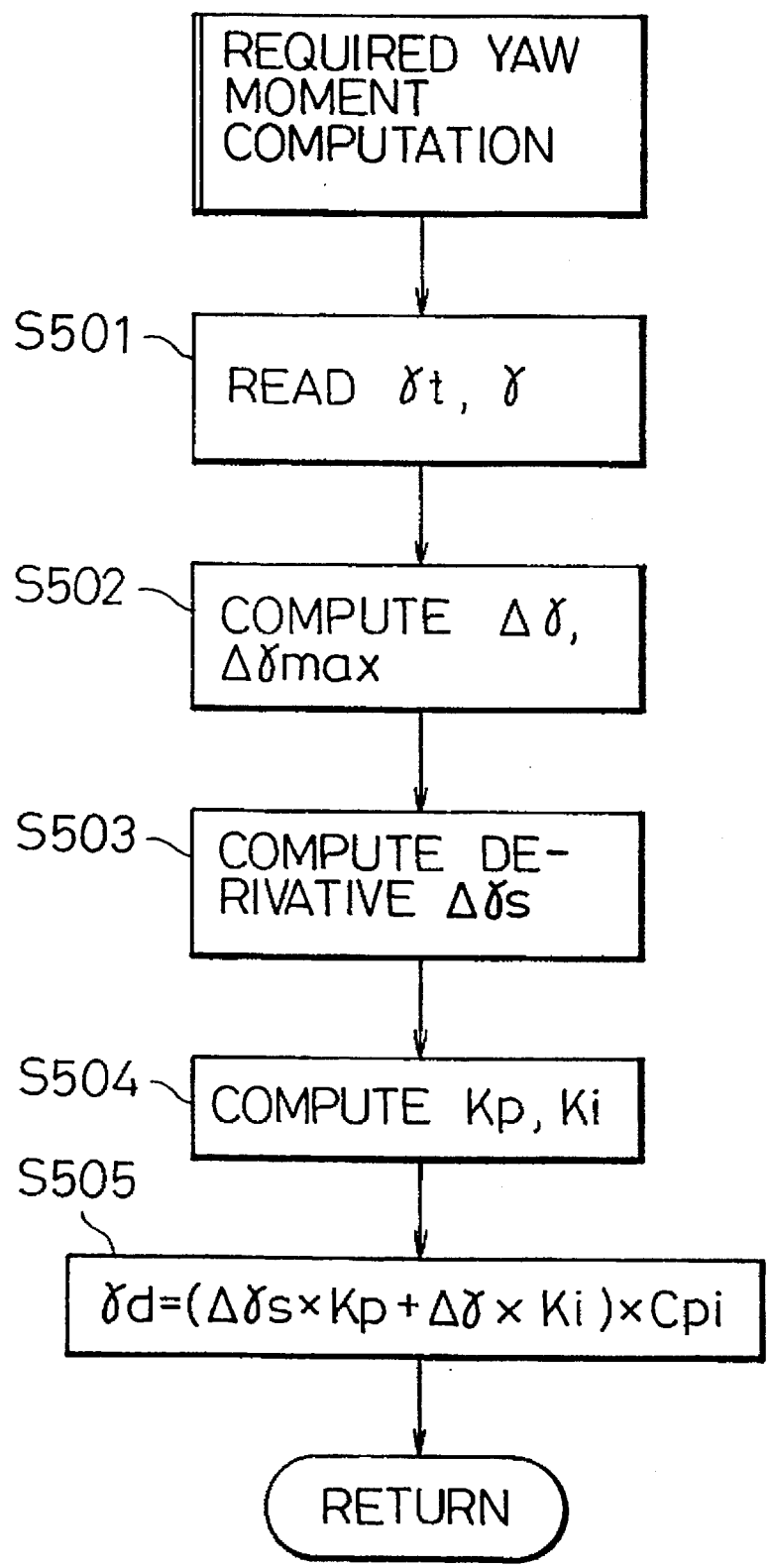
FIG. 11 is a flowchart showing a required yaw moment computation routine.

First, a yaw rate deviation $\Delta\gamma$ between the target yaw rate $\gamma t$ and the actual yaw rate $\gamma$ is computed in a subtractor section 48 shown in FIG. 10 (Steps S501 and S502 of FIG. 11).

In Step S502, the sign of the yaw rate deviation $\Delta\gamma$ is inverted so that it is positive on the understeer (US) side and negative on the oversteer (OS) side when the vehicle turns counterclockwise. The vehicle turn direction can be discriminated by the value of the aforesaid turn flag Fd.

In Step S502, a maximum yaw rate deviation $\Delta\gamma\text{max}$ is computed according to the following equation by filtering the absolute value of the computed yaw rate deviation $\Delta\gamma$:

$$\Delta\gamma\text{max} = LPF(|\Delta\gamma|).$$

In this filtering process, the value of the cutoff frequency fc varies depending on whether the yaw rate deviation $\Delta\gamma$ is increased or decreased. It is set at 10 Hz on the increased-deviation side and at 0.08 Hz on the decreased-deviation side.

When the yaw moment control is finished (or when the value of a yaw moment control beginning/ending flag Fym (mentioned later) is 0), the maximum yaw rate deviation $\Delta\gamma\text{max}$ is adjusted to the absolute value of the yaw rate deviation $\Delta\gamma$ as follows:

$$\Delta\gamma\text{max} = |\Delta\gamma|,$$

After the derivative or finite difference of the yaw rate deviation $\Delta\gamma$ is then computed in a differentiator section 50 shown in FIG. 10, it is filtered (fc=5 Hz) to provide a yaw rate deviation derivative $\Delta\gamma s$ as follows:

$$\Delta\gamma s = LPF(\Delta\gamma - \Delta\gamma m),$$

where $\Delta\gamma m$ is a yaw rate deviation computed in the preceding routine. Also in this case, the sign of the yaw rate deviation derivative $\Delta\gamma s$ is inverted when the vehicle turns counterclockwise, for the same reason as in the case of the yaw rate deviation $\Delta\gamma$.

The yaw rate deviation derivative a $\Delta\gamma$ is computed in Step S503 of FIG. 11.

Thereafter, the yaw rate deviation derivative $\Delta\gamma s$ is multiplied by a feedback gain or proportional gain Kp in a multiplier section 52, the yaw rate deviation a $\Delta\gamma$ is multiplied by an integral gain Ki in a multiplier section 54, and the resulting products are added together in an adder section 56, as shown in FIG. 10.

Further, the sum outputted from the adder section 56 is multiplied by a correction value Cpi in a multiplier section 58, whereupon the required yaw moment $\gamma d$ is obtained.

The correction value Cpi varies depending on whether the vehicle is braked or not, and is set as follows, for example:

Cpi=1.0 (when the vehicle is braked (Fb=1)),

Cpi=1.5 (when the vehicle is not braked (Fb=0)).

The required yaw moment $\gamma d$ is computed in Steps S504 and S505 in the routine shown in FIG. 11.

Step S504 is a step in which the proportional and integral gains Kp and Ki are computed. The procedure of computation for the proportional gain Kp is shown in the block diagram of FIG. 12.

The proportional gain Kp may take different reference values Kpu (e.g., 4 kgm/s/(deg/s$^2$)) and Kpo (e.g., 5 kgm/s/(deg/s$^2$)), depending on whether the vehicle turns on the US side or on the OS side. A switch SWp is used for the selection between the values Kpu and Kpo.

Figure 12:
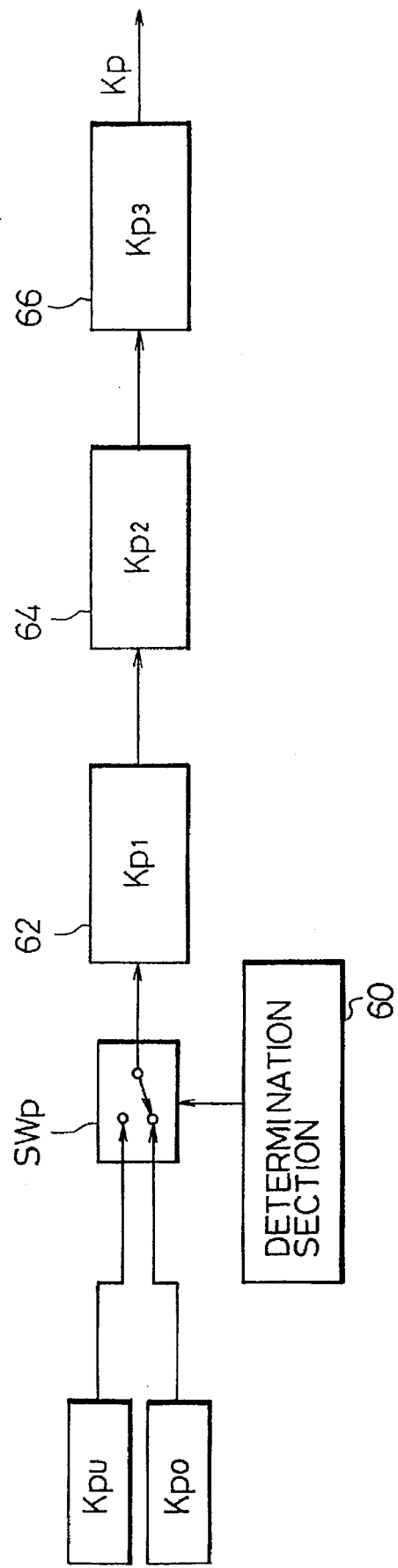
FIG. 12 is a block diagram showing the way a proportional gain Kp for the computation of a required yaw moment is calculated.

The switch SWp is shifted in response to a determination signal delivered from a determination section 60 shown in FIG. 12. The determination section 60 delivers a determination signal such that the switch SWp is shifted to the side of the reference value Kpu when in the US mode in which the yaw rate deviation derivative $\Delta\gamma s$ is 0 or more.

The reference value outputted from the switch SWp is multiplied successively by correction factors Kp1, Kp2 and Kp3 in multiplier sections 62, 64 and 66, respectively, whereby the proportional gain Kp is obtained.

Thus, the proportional gain Kp is computed as follows:

$$Kp = Kpu \times Kp1 \times Kp2 \times Kp3 \text{ (US mode)},$$

$$Kp = Kpo \times Kp1 \times Kp2 \times Kp3 \text{ (OS mode)}.$$

If the vehicle body is subjected to the yaw moment control before the vehicle reaches its critical travel region, it will inevitably make the driver feel uneasy. To avoid this, the correction factor Kp1 is used to correct the proportional gain Kp so that it effectively acts only when the yaw rate deviation $\Delta\gamma$ or the lateral acceleration Gy of the vehicle body is substantial.

Figure 13:
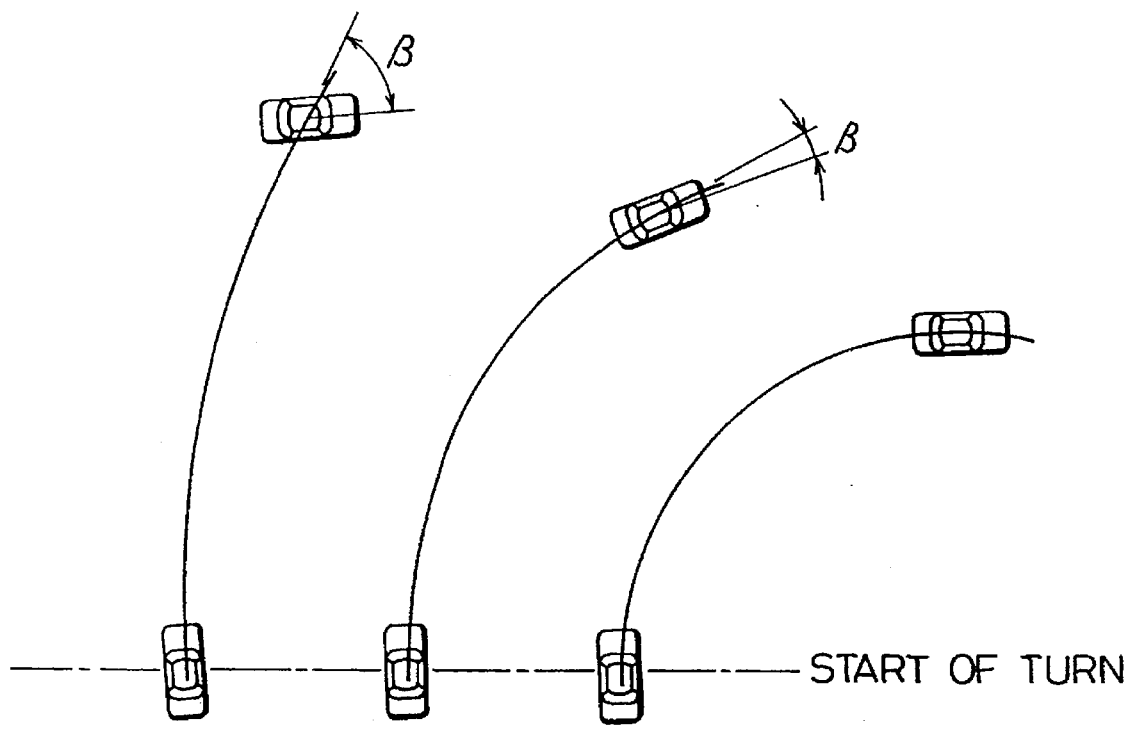
FIG. 13 is a diagram showing the behavior of the body of a turning vehicle.

As for the correction factor Kp2, it is used to correct the proportional gain Kp for the following reason. If the actual yaw rate $\gamma$ is made simply to follow up the target yaw rate $\gamma t$ in the case where the vehicle is running on a low-$\mu$ road, the lateral force on the vehicle body reaches its critical value, and the gravity-center slip angle $\beta$ of the vehicle body increases, so that the vehicle body may possibly spin, as shown in the left-hand portion of FIG. 13. The correction factor Kp2 is set in order to prevent this. If the correction factor Kp2 is set appropriately, it is believed that the gravity-center slip angle $\beta$ of the vehicle body can be kept small, so that the vehicle body can be prevented from spinning, as shown in the central portion of FIG. 13. The right-hand portion of FIG. 13 shows the case of the vehicle running on a high-$\mu$ road.

The correction factor Kp3 is used to correct the proportional gain Kp for the following reason. If a vibration component acts on the output of the yaw rate sensor 30 when the vehicle is running on a rough road, it greatly influences the yaw rate deviation derivative $\Delta\gamma s$, resulting in erroneous control operation or worsened controllability. Accordingly, the correction factor Kp3 serves to reduce the proportional gain Kp, thereby preventing such an awkward situation.

Figure 14:
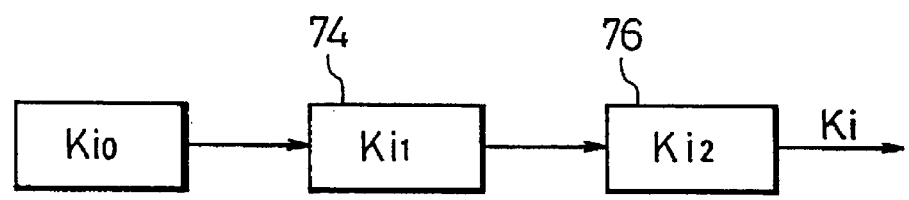
FIG. 14 is a block diagram showing the way an integral gain K1 for the required yaw moment computation is calculated.

Referring now to the block diagram of FIG. 14, there is shown a procedure of computation for the integral gain Ki. The integral gain Ki, like the proportional gain Kp, is computed by multiplying a reference integral gain Ki0 (e.g., 10 kgm/s/(deg/s)) successively by correction factors Ki1 and Ki2 in multiplier sections 74 and 76. Thus, the integral gain Ki is computed as follows:

$$Ki = Ki0 \times Ki1 \times Ki2.$$

The correction factor Ki1 is used to reduce the integral gain Ki for the following reason. If the front-wheel steering angle increases, an error in the target yaw rate $\gamma t$ enlarges an error in the yaw rate deviation $\Delta\gamma$, possibly entailing erroneous control operation. In this situation, therefore, the integral gain Ki is reduced by means of the correction factor Ki1.

The correction factor Ki2 is used to reduce the integral gain Ki for the same reason for the case of the correction factor Kp2 for the proportional gain Kp.

A detailed description of the values Kp1, Kp2, Kp3, Ki1 and Ki2 is omitted herein.

Yaw Moment Control

Figure 15:
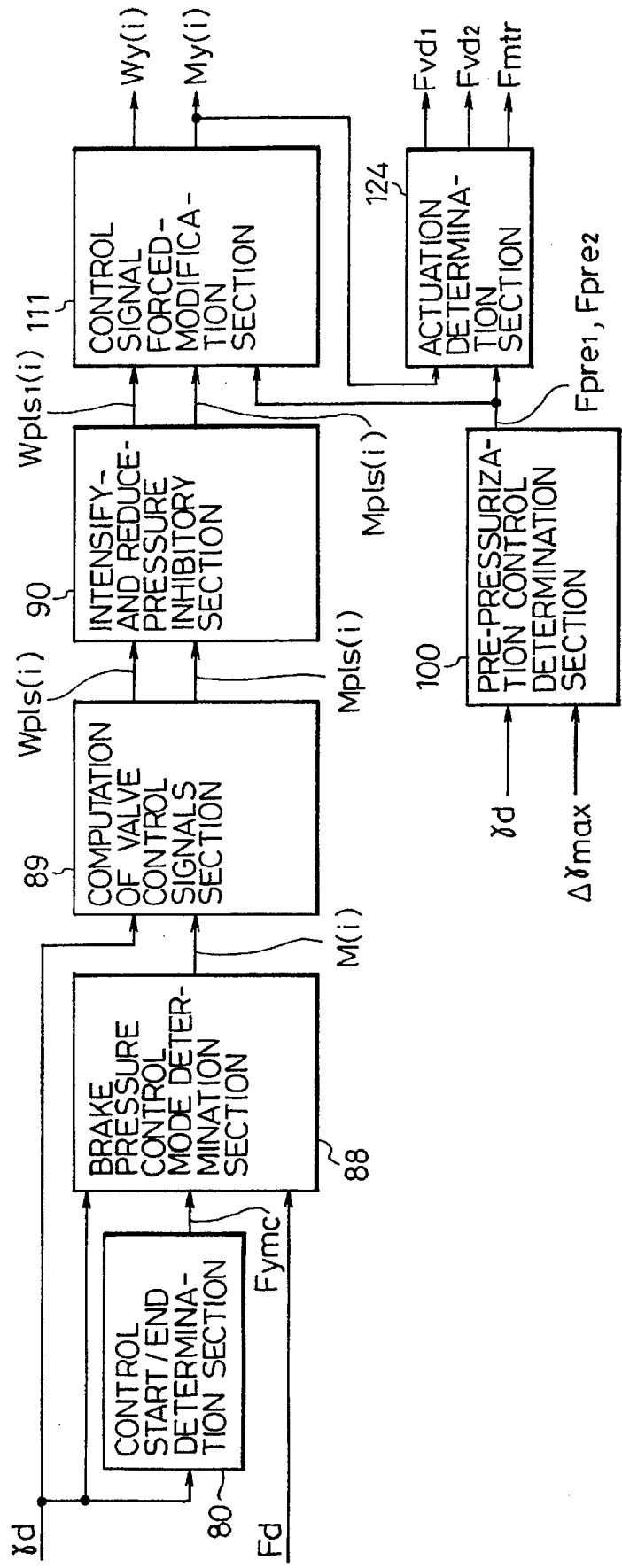
FIG. 15 is a block diagram showing the details of a yaw moment control section shown in FIG. 3.

When the required yaw moment γd is computed in the aforementioned manner, the yaw moment control is carried out by the computing section 78 shown in FIG. 3 in Step S6 of the main routine of FIG. 4. FIG. 15 shows the details of the computing section 78.

First, in a control start/end determination section 80 shown in FIG. 15, the value of a control beginning/ending flag Fymc is settled in accordance with the required yaw moment γd.

Figure 16:
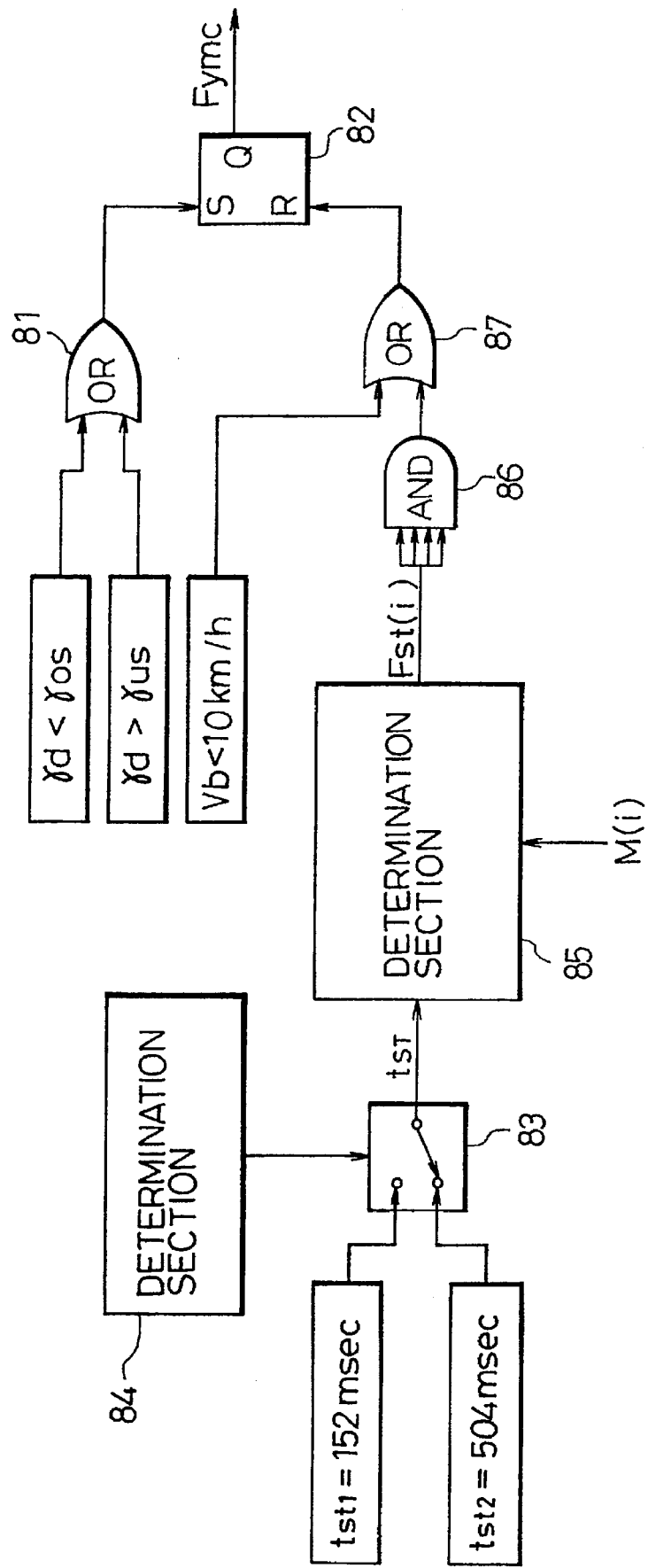
FIG. 16 is a block diagram showing the details of a control start/end determination section shown in FIG. 15.

Specifically, the value of the control beginning/ending flag Fymc is settled in a determination circuit shown in FIG. 16. This determination circuit includes an OR circuit 81, and on- and off-signals corresponding to the required yaw moment γd are applied to two input terminals of the OR circuit 81.

More specifically, the on-signal is applied to one input terminal of the OR circuit 81 if the required yaw moment γd is lower than a threshold value γos (e.g., −100 kgm/s) on the OS side. If the required yaw moment γd is higher than another threshold value γus (e.g., −200 kgm/s) on the US side, on the other hand, the on-signal is applied to the other input terminal of the OR circuit 81. Thus, if either of the threshold values are exceeded by the required yaw moment γd, the on-signal is delivered from the output terminal of the OR circuit 81, and is applied to the set terminal S of a flip-flop 82. In consequence, the control beginning/ending flag Fymc, i.e., flag Fymc (=1) indicative of the start of the yaw moment control in this case, is outputted from the output terminal Q of the flip-flop 82.

The absolute value (100 kgm/s) of the threshold value γos on the OS side is smaller than the absolute value (200 kgm/s) of the threshold value γus on the US side. Thus, the output timing for the control beginning/ending flag Fymc=1, that is, the start timing for the yaw moment control, is earlier on the OS side than on the US side.

On the other hand, the reset terminal R of the flip-flop 82 is supplied with a reset signal for settling the reset timing for the control beginning/ending flag Fymc, that is, the timing for the delivery of the flag Fymc (=0) from the flip-flop 82.

As shown in FIG. 16, a circuit for generating the reset signal includes a switch 83, which has two input terminals. A first end determination time tst1 (e.g., 152 msec) is supplied to one input terminal of the switch 83, and a second end determination time tst2 (e.g., 504 msec) to the other input terminal.

The switch 83 can be shifted in response to a switching signal from a determination section 84. When the behavior of the vehicle body is stable, that is, if all the following conditions are fulfilled, the determination section 84 delivers a first switching signal, which causes the first end determination time tst1 (e.g., 152 msec) to be outputted as an end determination time tst from the output terminal of the switch 83.

Conditions:

Target yaw rate γt<10 deg/s,

Yaw rate γ<10 deg/s, and

Effective steering wheel angular velocity value θae<200 deg/s.

If any of these three requirements is not fulfilled, the determination section 84 delivers a second switching signal, which causes the second end determination time tst2 (e.g., 504 msec) to be outputted as the end determination time tst from the output terminal of the switch 83.

The aforesaid conditions for the delivery of the first switching signal define a range in which the posture of the vehicle can be regarded as stable. If these conditions are met, it can be concluded that the yaw moment control need not be continued any longer. In this case, therefore, the yaw moment control should be finished without delay, and a short time of, for example, 152 msec is set as the first end determination time tst1. Thus, the yaw moment control can be finished quickly, so that a braking force based on the yaw moment control cannot continue to be applied in vain for a long period of time, and there is no possibility of the vehicle driver having a dragging feeling.

If the aforesaid conditions are not met, on the other hand, the vehicle can be regarded as unstable. In this case, the yaw moment control can be supposed to be able to be further continued, and a relatively long time of, for example, 504 msec is used as the second end determination time tst2. Thus, the yaw moment control is finished after the passage of a sufficient period of time.

The output of the end determination time tst is supplied to a determination section 85. If a condition is met such that a brake pressure control signal continues to be held or non-controlled (control mode M(i) (mentioned later) is a hold mode or noncontrol mode) for the end determination time tst or longer, the determination section 85 outputs an end indication flag Fst(i)=1. If this condition is not met, the determination section 85 outputs an end indication flag Fst(i)=0. Character i suffixed to each end indication flag Fst represents a corresponding wheel. The brake pressure control signal used in the determination in the determination section 85 will be mentioned later.

The end indication flags Fst(i) are supplied individually to input terminals of an AND circuit 86. The output terminal of the AND circuit 86 is connected to one input terminal of an OR circuit 87, the other input terminal of which is supplied with an on-signal when the vehicle body velocity Vb is lower than a determination value 10 km/h. The output terminal of the OR circuit 87 is connected to the reset terminal R of the flip-flop 82.

The AND circuit 86 supplies the on-signal to the OR circuit 87 when all the respective values of the end indication flags Fst(i) are 1. The OR circuit 87 supplies an on-signal to the reset terminal R of the flip-flop 82 when the on-signal is supplied to one of its input terminals. Thus, the reset signal is supplied to the flip-flop 82 if the vehicle body velocity Vb is lower than 10 km/h or if the aforesaid condition for the brake pressure control signal is fulfilled for any of the four wheels.

On receiving the reset signal, the flip-flop 82 outputs the control beginning/ending flag Fymc=0, which is indicative of the termination of the yaw moment control.

As shown in FIG. 15, the output of the control start/end determination section 80, that is, the control beginning/ending flag Fymc, is supplied to a brake pressure control mode determination section 88. In this determination section 88, the brake pressure control mode for each wheel is determined in accordance with the required yaw moment γd and the turn flag Fd in the case where the value of the control beginning/ending flag Fymc is 1.

Figure 17:
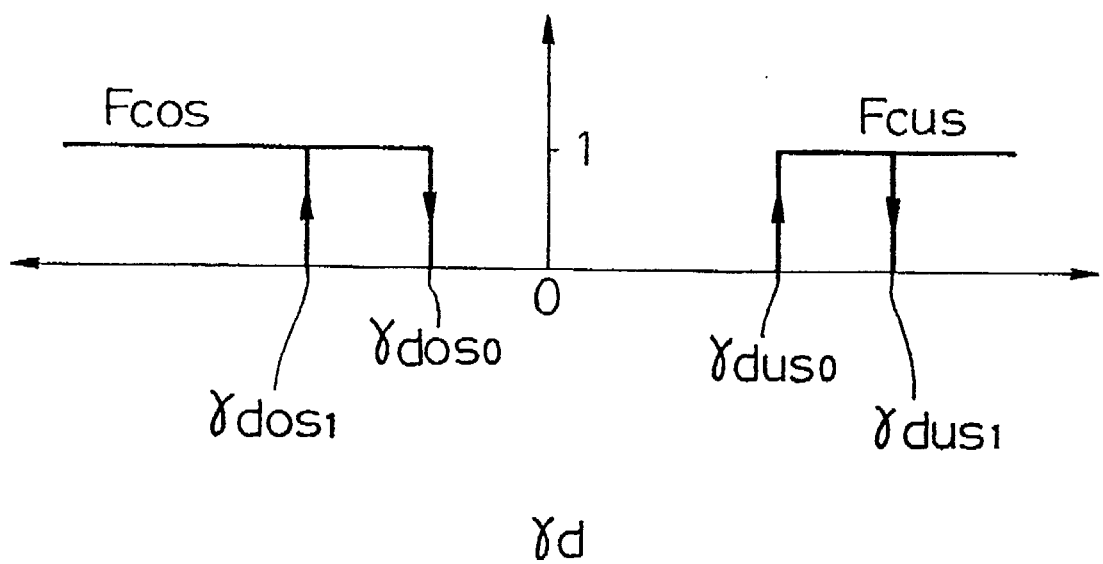
FIG. 17 is a graph showing a criterion for setting control execution flags Fcus and Fcos for the magnitude of the required yaw moment.

First, based on the required yaw moment γd from the map shown in FIG. 17, compared with its threshold values, brake pressure control execution flags Fcus and Fcos for the US and OS mode are set as follows:

US mode:

Fcus=1 (γd>γdus1 (=100 kgm/s)),

Fcus=0 (γd<γdus0 (=80 kgm/s)),

OS mode:

Fcos=1 ($\gamma$d<$\gamma$dos1 (=−80 kgm/s)),

Fcos=0 ($\gamma$d>$\gamma$dos0 (=−60 kgm/s)).

The absolute value of the threshold value $\gamma$dos0 (=−60 kgm/s) at which the yaw moment control in the OS mode to generate a restoration moment M(−) is started is smaller than that of the $\gamma$dus0 (=80 kgm/s) at which the yaw moment control in the US mode to generate a turning moment M(+) is started. Thus, the yaw moment control can be carried out more easily on the side of the restoration moment M(−) than on the side of the turning moment M(+). If the required yaw moment $\gamma$d reaches the aforesaid threshold value $\gamma$os1 (e.g., −100 kgm/s) when the vehicle has a tendency to OS, therefore, then the yaw moment control will be started at once.

Figure 18:
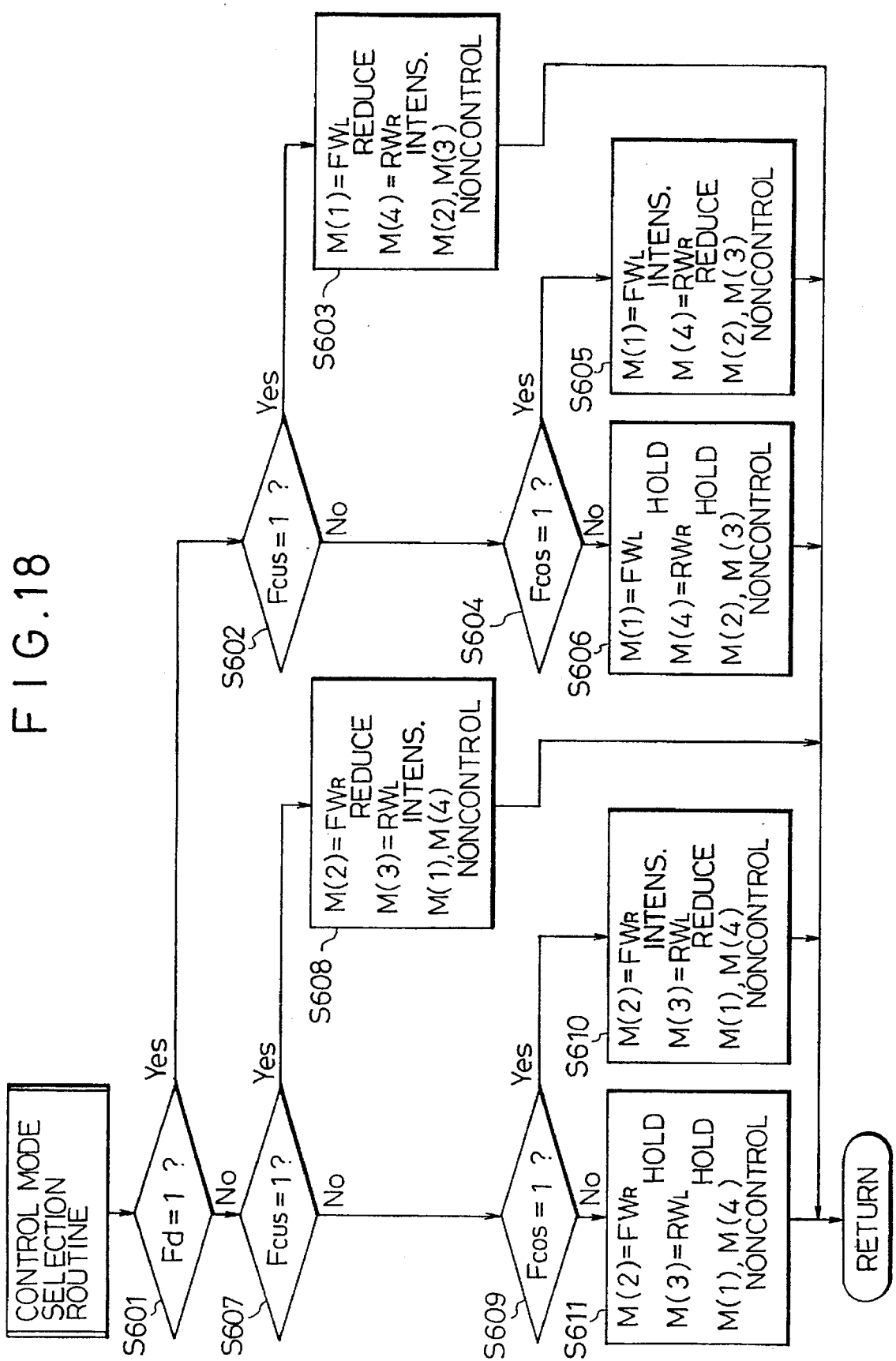
FIG. 18 is a flowchart showing a control mode selection routine.

Subsequently, the brake pressure control modes M(i) for the individual wheels are selected in accordance with the combinations of the turn flag Fd and the control execution flags Fcus and Fcos. FIG. 18 shows a selection routine for these control modes.

In the control mode selection routine of FIG. 18, it is first determined whether or not the value of the turn flag Fd is 1 (Step S601). If the decision in Step S601 is Yes, that is, if it is concluded that the vehicle is turning clockwise, it is determined whether or not the value of the control execution flag Fcus is 1 (Step S602).

If the decision in Step S602 is Yes, then the turning vehicle has a marked tendency to US, the required yaw moment $\gamma$d is at a great value greater than the threshold value $\gamma$dus1, and the vehicle requires the turning moment M(+). In this case, a control mode M(1) for the front-left wheel $FW_L$ is adjusted to a reduce-pressure mode, a control mode M(4) for the rear-right wheel $RW_R$ to an intensify-pressure mode, and control modes M(2) and M(3) for the front-right and rear-left wheels $FW_R$ and $RW_L$ to the noncontrol mode (Step S603).

If the decision in Step S602 is No, it is determined whether or not the value of the control execution flag Fcos is 1 (Step S604).

If the decision in Step S604 is Yes, then the turning vehicle has a marked tendency to OS, the required yaw moment $\gamma$d is at a small value smaller than the threshold value $\gamma$dos1, and the vehicle requires the restoration moment M(−). In this case, the control mode M(1) for the front-left wheel $FW_L$ is adjusted to the intensify-pressure mode, the control mode M(4) for the rear-right wheel $RW_R$ to the reduce-pressure mode, and the control modes M(2) and M(3) for the front-right and rear-left wheels $FW_R$ and $RW_L$ to the noncontrol mode (Step S605).

If both the decisions in Steps S602 and S604 are No, then the turning vehicle has no marked tendency either to US or to OS. In this case, therefore, the control modes M(1) and M(4) for the front-left and rear-right wheels $FW_L$ and $RW_R$ are both adjusted to the hold mode, and the control modes M(2) and M(3) for the front-right and rear-left wheels $FW_R$ and $RW_L$ to the noncontrol mode (Step S606).

If the decision in Step S601 is No, that is, if it is concluded that the vehicle is turning counterclockwise, on the other hand, it is determined whether or not the value of the control execution flag Fcus is 1 (Step S607).

If the decision in Step S607 is Yes, then the vehicle requires the turning moment M(+), as in the case of the clockwise turn. In this case, in contrast with the case of the clockwise turn, the control mode M(2) for the front-right wheel $FW_R$ is adjusted to the reduce-pressure mode, the control mode M(3) for the rear-left wheel $RW_L$ to the intensify-pressure mode, and the control modes M(1) and M(4) for the front-left and rear-right wheels $FW_L$ and $RW_R$ to the noncontrol mode (Step S608).

If the decision in Step S607 is No, it is determined whether or not the value of the control execution flag Fcos is 1 (Step S609). If the decision in Step S609 is Yes, then the vehicle requires the restoration moment M(−), so that the control mode M(2) for the front-right wheel $FW_R$ is adjusted to the intensify-pressure mode, the control mode M(3) for the rear-left wheel $RW_L$ to the reduce-pressure mode, and the control modes M(1) and M(4) for the front-left and rear-right wheels $FW_L$ and $RW_R$ to the noncontrol mode (Step S610).

If both the decisions in Steps S607 and S609 are No, the control modes M(2) and M(3) for the front-right and rear-left wheels $FW_R$ and $RW_L$ are both adjusted to the hold mode, and the control modes M(1) and M(4) for the front-left and rear-right wheels $FW_L$ and $RW_R$ to the noncontrol mode (Step S611).

Table 1 below collectively shows the control modes M(i) described above.

TABLE 1

| | Clockwise Turn (Fd = 1) | | | Counterclockwise Turn (Fd = 0) | | |
|---|---|---|---|---|---|---|
| Fcus | 1 | 0 | 0 | 1 | 0 | 0 |
| Fcos | 0 | 1 | 0 | 0 | 1 | 0 |
| $FW_L$:M(1) | Reduce | Intens. | Hold | Noncont. | Noncont. | Noncont. |
| $FW_R$:M(2) | Noncont. | Noncont. | Noncont. | Reduce | Intens. | Hold |
| $RW_L$:M(3) | Noncont. | Noncont. | Noncont. | Intens. | Reduce | Hold |
| $RW_R$:M(4) | Intens. | Reduce | Hold | Noncont. | Noncont. | Noncont. |

When the control modes M(i) for the individual wheels are selected in the aforementioned manner, a valve control signal computing section 89 in the next stage computes control signals for the solenoid valves or the inlet and outlet valves 12 and 13 for controlling the respective brake pressures of the wheel brakes for the individual wheels, in accordance with the control modes M(i) and the required yaw moment $\gamma$d.

Figure 19:
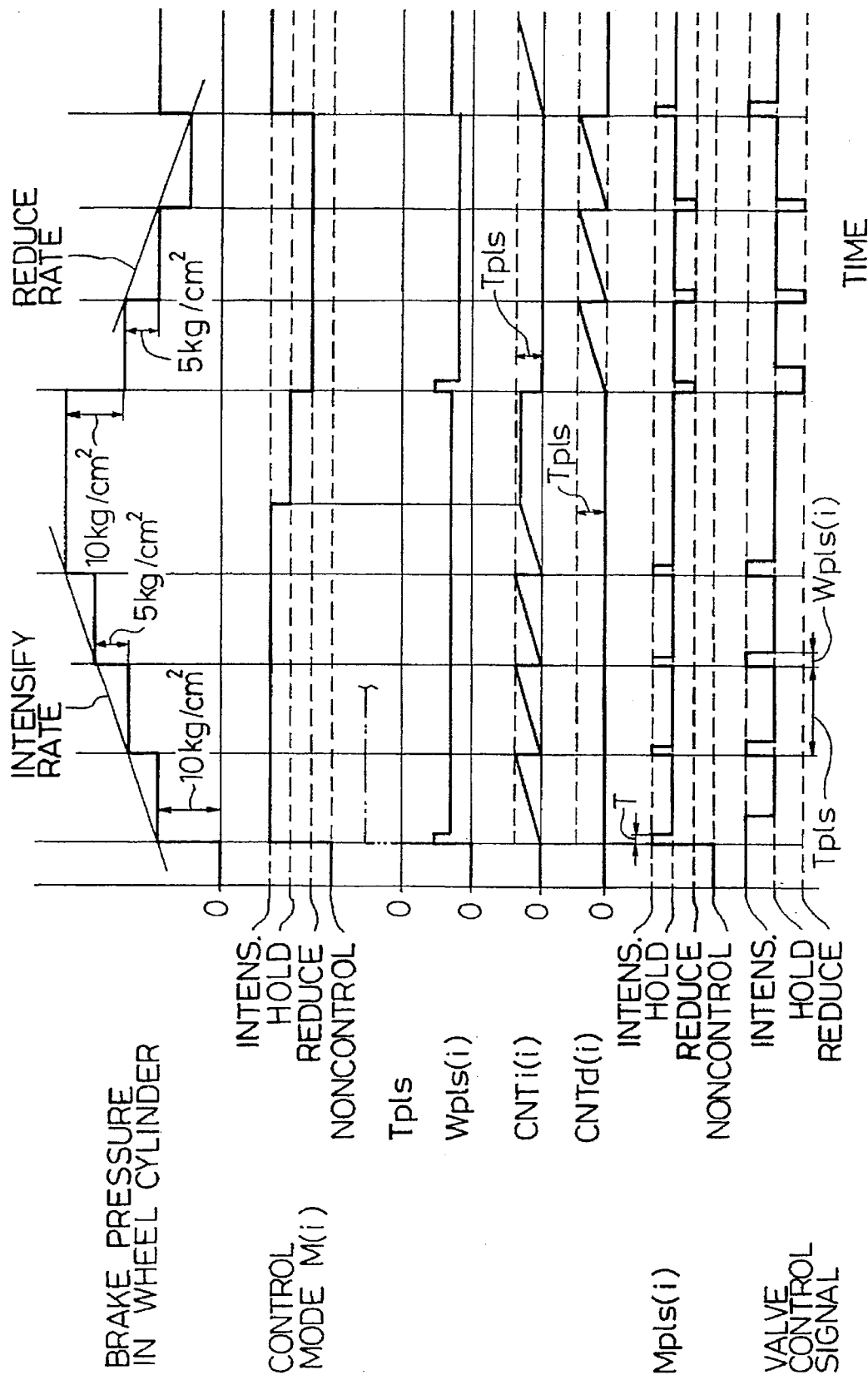
FIG. 19 is a time chart showing the relations between a control mode M(i), actuation mode Mpls(i), and pulse width Wpls(i) set in the selection routine of FIG. 18.

Specifically, the increase/decrease rate (gradient of pressure increase or decrease) for the fluid pressure (brake pressure) in each wheel brake is first computed to obtain the required yaw moment. In order to change the actual brake pressure by a fixed increment or decrement $\Delta$p at a time in accordance with the computed increase/decrease rate, the pulse periods Tpls and pulse widths Wpls(i) of driving pulses (valve control signals) for the inlet or outlet valves 12 or 13 to produce the increment or decrement $\Delta$p are computed. The increment or decrement $\Delta$p is set at ±5 kg/cm², for example. In order to secure good response, however, the increment or decrement $\Delta$p is set at ±10 kg/cm², for example, in the initial cycle only. Referring to FIG. 19, there is shown the way the brake pressure in each wheel brake is increased or decreased with every increment or decrement ΔP.

Based on the hold mode, the inlet and outlet valves 12 and 13 are actuated when supplied with the valve control signals (or intensify-pressure or reduce-pressure pulse signals). Since the actuation of the valves 12 and 13 is ordered with every control period T (8 msec) for the main routine, an actuation mode Mpls(i) is set so that actual actuation is carried out with every pulse period Tpls.

The following is a detailed description of the pulse period Tpls, pulse width Wpls(i), and actuation mode Mpls(i).

If the lateral force on the vehicle body is ignored, a variation ΔMz of the yaw moment of the vehicle body caused when the brake pressure in the wheel brake for each front wheel is changed by ΔPwc can be expressed as follows:

$$\Delta Mz = \Delta Pwc \times BF \times TF/2,$$

where BF and TF are the front brake coefficient (kg/cm² → kg) and front tread, respectively.

Accordingly, the increase/decrease rate Rpwc (kg/cm²/s) of the brake pressure obtained when the required yaw moment γd is given can be expressed as follows:

$$Rpwc = 2 \times \gamma d/BF/TF.$$

If the increment or decrement ΔP (5 or 10 kg/cm²) for each cycle is fixed, on the other hand, the relationship between the increase/decrease rate Rpwc and the pulse period Tpls leads to the following equation:

$$|Rpwc| = \Delta P/(Tpls \times T \ (=8 \ msec)).$$

Based on these two equations, the pulse period Tpls is expressed as follows:

$$Tpls = \Delta P \times BF \times TF/(2 \times T \times |\gamma d|),$$

where $2 \leq Tpls \leq 12$ is given.

The pulse period Tpls for the inlet and output valves on the front-wheel side is used as the pulse period on the rear-wheel side.

The pulse width Wpls(i) is previously set in an experiment. According to this experiment, the master cylinder pressure and wheel brake pressure (brake pressure) are adjusted to their respective reference values, the time for the change of the wheel brake pressure by the increment or decrement ΔP (5 or 10 kg/cm²) after the actuation of the valve concerned is measured in this state, and the pulse width Wpls(i) is set on the basis of the measured time.

Since the pressure of discharge from the pump 16 or 17 is utilized for the increase of the wheel brake pressure, the pulse width Wpls(i) is set in consideration of a delay in response of the pump 16 or 17. The following is a description of a setting procedure for a correction value Δty for the pulse width Wpls(i), which is based on a response delay time ty peculiar to the pump 16 or 17.

Figure 20:
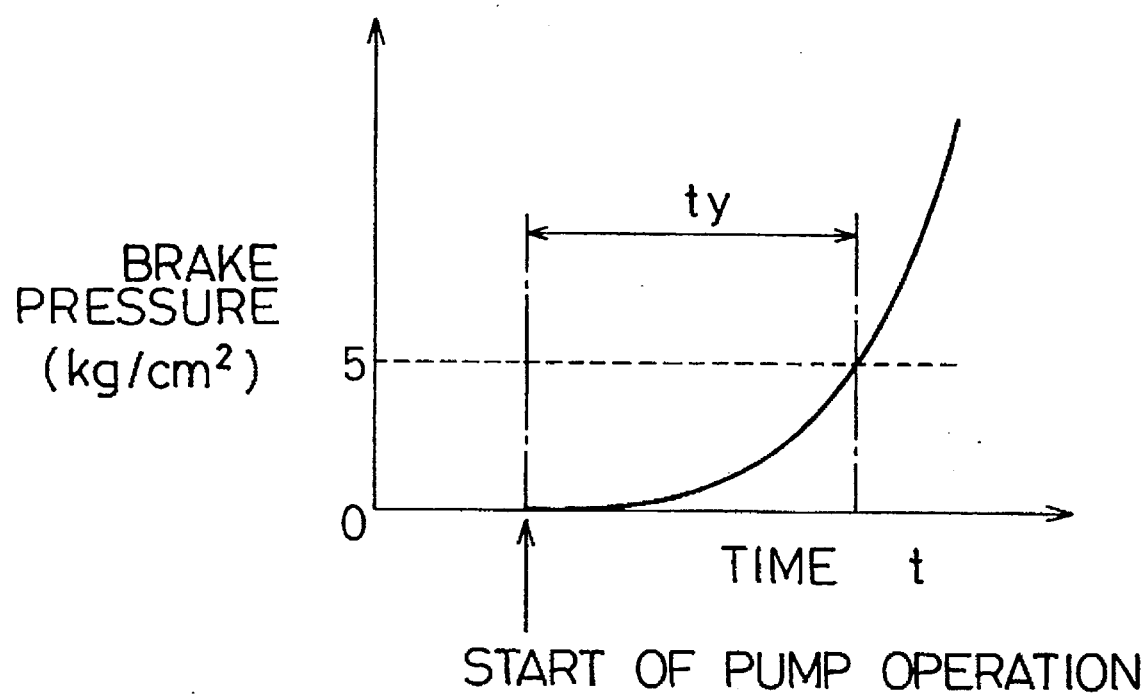
FIG. 20 is a graph showing the relation between the brake pressure and pump response delay time ty.

First, a value previously obtained in an experiment is used as the response delay time ty. FIG. 20 is a graph showing the result of the experiment, that is, the time-dependent change of the brake pressure after the actuation of the pump 16 or 17. In FIG. 20, the actuation start timing for the pump 16 or 17 is a point of time that the cutoff valve 19 or 20, inlet and output valves 12 and 13, and motor 18 are actuated simultaneously.

As shown in FIG. 20, the brake pressure is hardly raised at the point of time immediately after the actuation of the pump 16 or 17, and is suddenly increased after the passage of a certain period of time. Accordingly, the brake pressure immediately after the actuation of the pump 16 or 17 cannot be regarded as effective. In this case, the response delay time ty is obtained by measuring the time during which the brake pressure undergoes at least a change equal to the increment or decrement ΔP (5 kg/cm²).

According to this experiment, response delay times ty(i) are measured individually for the front-left wheel $FW_L$, front-right wheel $FW_R$, rear-left wheel $RW_L$, and rear-right wheel $RW_R$, and the greatest of these measured values is used as the response delay time ty.

Based on this response delay time ty, the response delay correction value Δty is set as required during the yaw moment control. In setting the correction value Δty, a response delay correction value setting routine shown in the flowchart of FIG. 21 is executed.

First, in Step S6000 of FIG. 21, it is determined whether or not the value of a motor actuation flag Fm (mentioned later) is 1. If the decision in Step S6000 is Yes, that is, if the value of the flag Fm is 1, then the motor 18 is concluded to be actuated. In this case, the program advances to Step S6002. In Step S6002, a counter CNTm for measuring the time elapsed after the start of actuation of the motor 18 is counted up.

Figure 22:
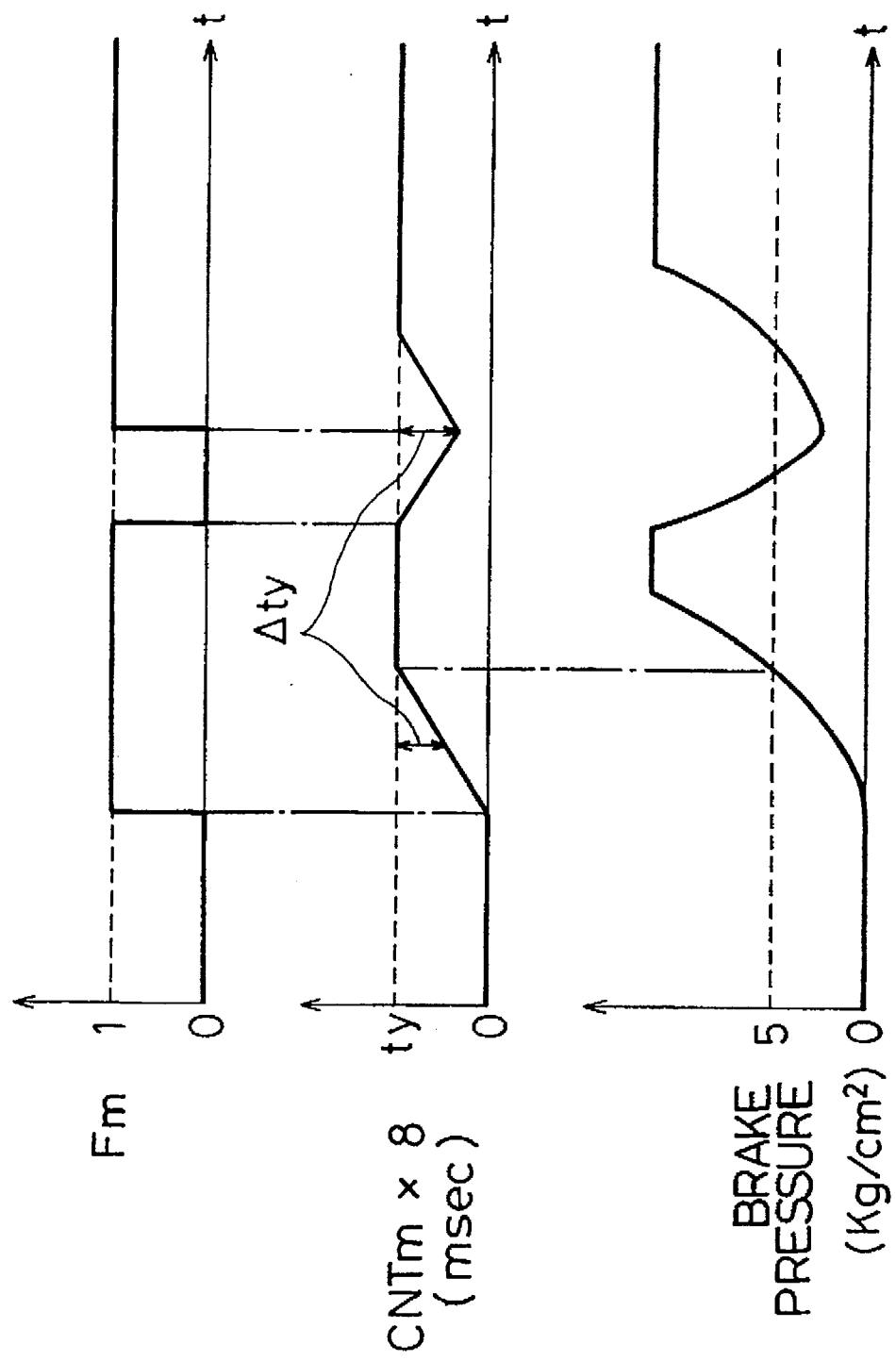
FIG. 22 is a time chart showing the time-dependent change of the response delay correction value $\Delta$ty set with reference to the flowchart of FIG. 21.

FIG. 22 shows the respective time-dependent changes of the motor actuation flag Fm, elapsed time (CNTm×T (=8 msec)) based on the counter value CNTm, and brake pressure. Immediately after the change of the value of the motor actuation flag Fm from 0 to 1 after the start of actuation of the motor 18, as shown in FIG. 22, the counter value CNTm is gradually counted up to increase the elapsed time (CNTm×T), so that the brake pressure increases.

Figure 21:
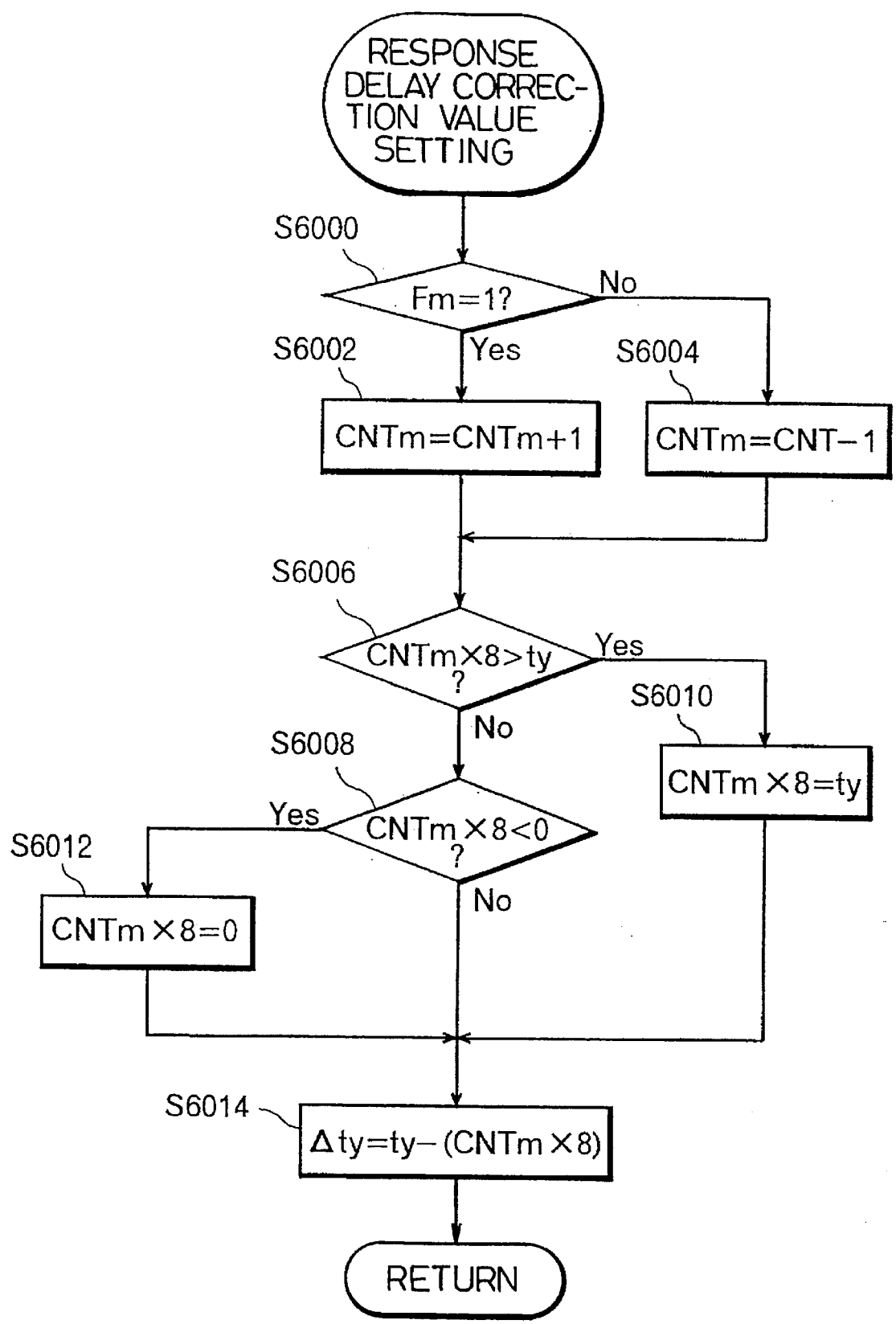
FIG. 21 is a flowchart showing a setting routine for a response delay correction value $\Delta$ty.

When the counter value CNTm is counted up in Step S6002 of FIG. 21, the program advances to Step S6006. In Step S6006, it is determined whether or not the value of the elapsed time is greater than that of the response delay time ty (CNTm×T>ty).

If the decision in Step S6006 is No, that is, if the value of the response delay time ty is not reached by that of the elapsed time (CNTm×T), the program advances to Step S6008. In Step S6008, it is determined whether or not the value of the elapsed time is smaller than 0 (CNTm×T<0). Since the counter value CNTm is counted up from the initial value 0, the decision in Step S6008 is No, whereupon the program advances to Step S6014.

In Step S6014, the response delay correction value Δty is computed and set as follows (see FIG. 22):

$$\Delta ty = ty - (CNTm \times T).$$

If the decision in Step S6006 becomes Yes, that is, if the elapsed time (CNTm×T) since the start of actuation of the motor is concluded to have reached the response delay time ty, while the routine concerned is being carried out repeatedly, the program advances to Step S6010. In Step S6010, the value of the elapsed time (CNTm×T) is fixed to the response delay time ty.

The counter value CNTm can naturally be fixed by adjusting the value of the elapsed time (CNTm×T) to the response delay time ty. When the response delay time ty is reached by the elapsed time (CNTm×T (=8 msec)), as shown in FIG. 22, the brake pressure is at 5 kg/cm², as mentioned before.

After Step S6010 is executed, the program advances to Step S6014. In Step S6014, the response delay correction value Δty is computed and set. Since (CNTm×T)=ty is obtained by executing Step S6010, in this case, the value of Δty is 0.

If the decision in Step S6000 becomes No, that is, if the value of the motor actuation flag Fm is changed from 1 to 0, which is indicative of the nonoperating state of the motor 18, while the routine concerned is executed repeatedly, the program advances to Step S6004. In Step S6004, in contrast with Step S6002, the counter value CNTm is counted down. At this time, the brake pressure decreases, as shown in FIG. 22.

When the counter value CNTm is counted down, the value of the elapsed time (CNTm×T) becomes smaller than that of the response delay time ty. In this case, the decision in Step S6006 becomes No again, and Step S6008 is then executed.

Although the counter value CNTm is counted down, at this time, the value of the elapsed time (CNTm×T) is still equal to or greater than 0, so that the decision in Step S6008 is No. In Step S6014, as mentioned before, the response delay correction value Δty is computed according to the difference between the elapsed time (CNTm×T), which corresponds to the counter value CNTm counted down in the aforesaid manner, and the response delay time ty.

If the value of the motor actuation flag Fm is changed again to 1 while the counter value CNTm is being counted down, the decision in Step S6000 becomes Yes. In this case, the counter value CNTm is counted up again on the basis of the counted-down value as an initial value. Thereupon, the elapsed time (CNTm×T (=8 msec)) and the brake pressure increase again without returning to 0, as shown in FIG. 22.

When the counter value CNTm is thus counted up again in the middle of the countdown as the motor 18 is actuated again, the brake pressure increases from a certain pressure value. In this case, the brake pressure can reach 5 kg/cm² without taking much time. Thus, the response delay correction value Δty obtained in Step S6014 corresponds to the counter value CNTm at the point of time that the counter value starts to be counted up again.

When the response delay time ty is reached again by the elapsed time (CNTm×T (=8 msec)), the response delay correction value Δty becomes 0. Also in this case, the brake pressure can reach 5 kg/cm² satisfactorily, as shown in FIG. 22.

If the decision in Step S6008 is Yes, that is, if the value of the elapsed time (CNTm×T) is concluded to be smaller than 0, after the countdown of the counter value CNTm in Step S6004 is continued, on the other hand, the program advances to Step S6012. In Step S6012, the value of the elapsed time is fixed to 0, that is, the counter value CNTm is set at 0. When the value of the elapsed time is thus set at 0, the response delay correction value Δty computed in Step S6014 is equal to the response delay time ty itself.

The response delay correction value Δty, obtained in this manner, is added to the initial value of the pulse width Wpls(i). Thereupon, the response delay of the pump 16 or 17 is compensated, and an adequate brake pressure can be obtained such that the intended yaw moment control can be carried with accuracy.

Figure 23:
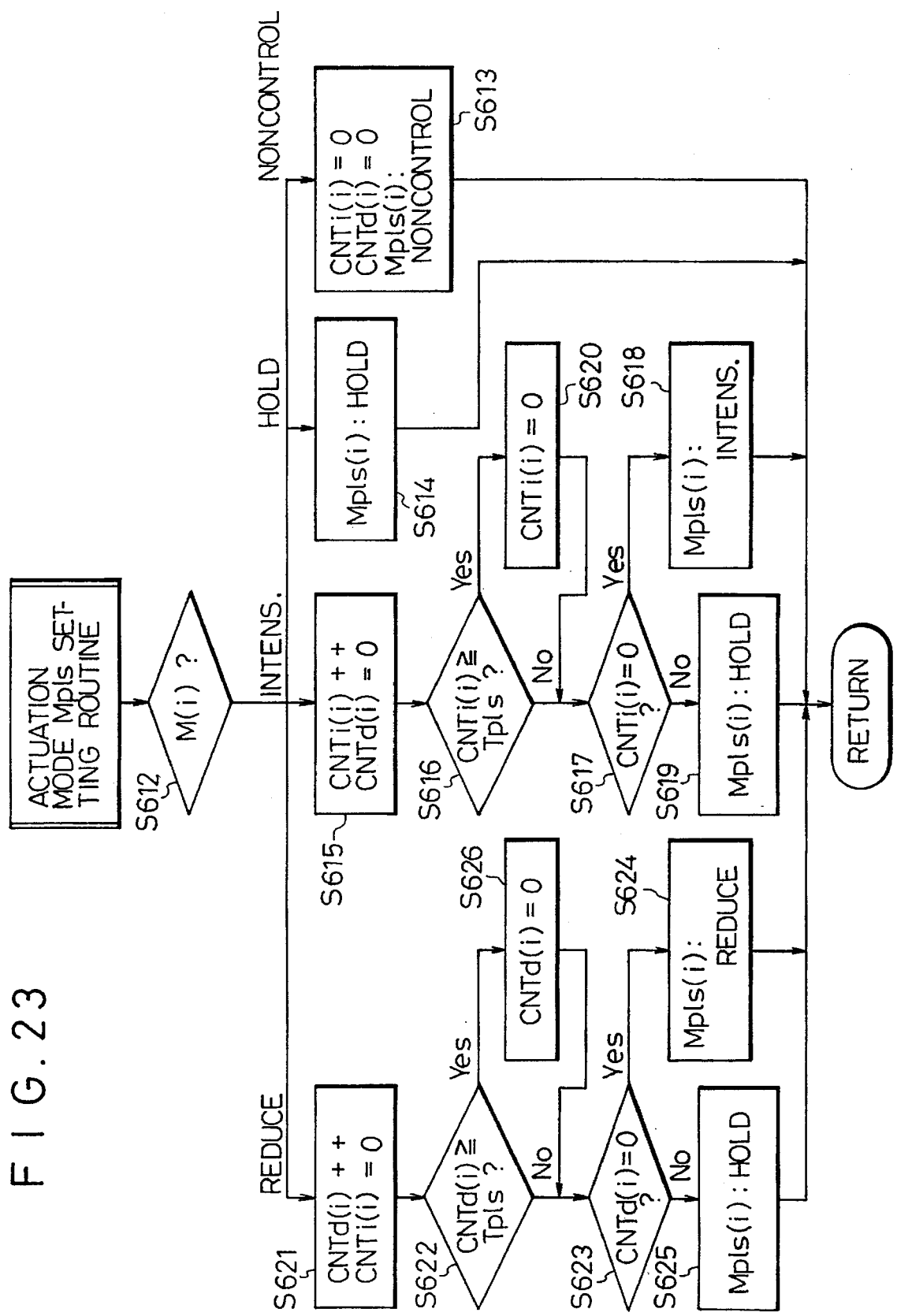
FIG. 23 is a flowchart showing a setting routine for the actuation mode Mpls(i)

The actuation mode Mpls(i) is set in accordance with the control mode M(i) and the pulse period Tpls in a setting routine shown in FIG. 23. In this setting routine, the control mode M(i) is determined first (Step S612). If the control mode M(i) is the noncontrol mode, values in an intensify-pressure period counter CNTi(i) and a reduce-pressure period counter CNTd(i) are both adjusted to 0, whereupon the noncontrol mode is set for the actuation mode Mpls(i) (Step S613).

If the control mode M(i) is the pressure-hold mode, the hold mode is set for the actuation mode Mpls(i) (Step S614).

If the control mode M(i) is the intensify-pressure mode, only the intensify-pressure period counter CNTi(i) is actuated (Step S614), and it is determined whether or not the pulse period Tpls is reached by the value in the counter CNTi(i) (Step S616). Since the decision in Step S616 is No at this point of time, it is then determined whether or not the value in the increase period counter CNTi(i) is 0 (Step S617). In this case, the decision in Step S617 is Yes. Accordingly, the intensify-pressure mode is set for the actuation mode Mpls(i) (Step S618).

If the decision in Step S617 remains No as the routine is executed repeatedly, thereafter, the hold mode is set for the actuation mode Mpls(i) (Step S619).

If the decision in Step S616 becomes Yes so that the value in the intensify-pressure period counter CNTi(i) is reset at 0 (Step S620), with the passage of time, the decision in Step S617 becomes Yes, whereupon the intensify-pressure mode is set for the actuation mode Mpls(i) (Step S618). While the control mode M(i) is the intensify-pressure mode, therefore, the intensify-pressure mode is set for the actuation mode Mpls(i) with every pulse period Tpls.

If the control mode M(i) is the reduce-pressure mode, on the other hand, Steps S621 to S625 of FIG. 23 are executed in the same manner as in the case of the intensify-pressure mode, whereupon the reduce-pressure mode is set for the actuation mode Mpls(i) with every pulse period Tpls.

When the actuation mode Mpls(i) and the pulse width Wpls(i) are computed in the aforesaid manner, the pulse width Wpls(i) is corrected in an intensify-pressure/reduce-pressure inhibitory section 90 (see FIG. 15) in the next stage, in order to inhibit increase and decrease of the brake pressure, in consideration of the driver's countersteer operation, excessive slip, or control overshoot. The correction section 90 is shown in detail in the block diagram of FIG. 24.

The pulse width Wpls(i) supplied to the intensify-pressure/reduce-pressure inhibitory section 90 is outputted as a pulse width Wpls1(i) through three switches 91, 92 and 93. The respective outputs of these switches can be changed between Wpls1(i)=Wpls(i) and Wpls1(i)=0, depending on the values of flags set in setting sections 94, 95 and 96. The actuation mode Mpls(i) supplied to the intensify-pressure/reduce-pressure inhibitory section 90 is outputted without change.

First, an intensify-pressure inhibiting flag Fk1(i) for countersteer is set in the setting section 94. Specifically, the setting section 94 includes an AND circuit 97, the output of which is supplied to the switch 91. On-signals are supplied individually to input terminals of the AND circuit 97 if corresponding conditions are met. Input conditions for the individual on-signals involve cases that the target wheel is a rear wheel, the value of a countersteer flag Fcs is 1, and the control mode M(i) is the intensify-pressure mode.

Thus, the AND circuit 97 outputs an intensify-pressure inhibiting flag Fk1(i)=1 if all its inputs are on-signals, and outputs an intensify-pressure inhibiting flag Fk1(i)=0 if not.

Figure 24:
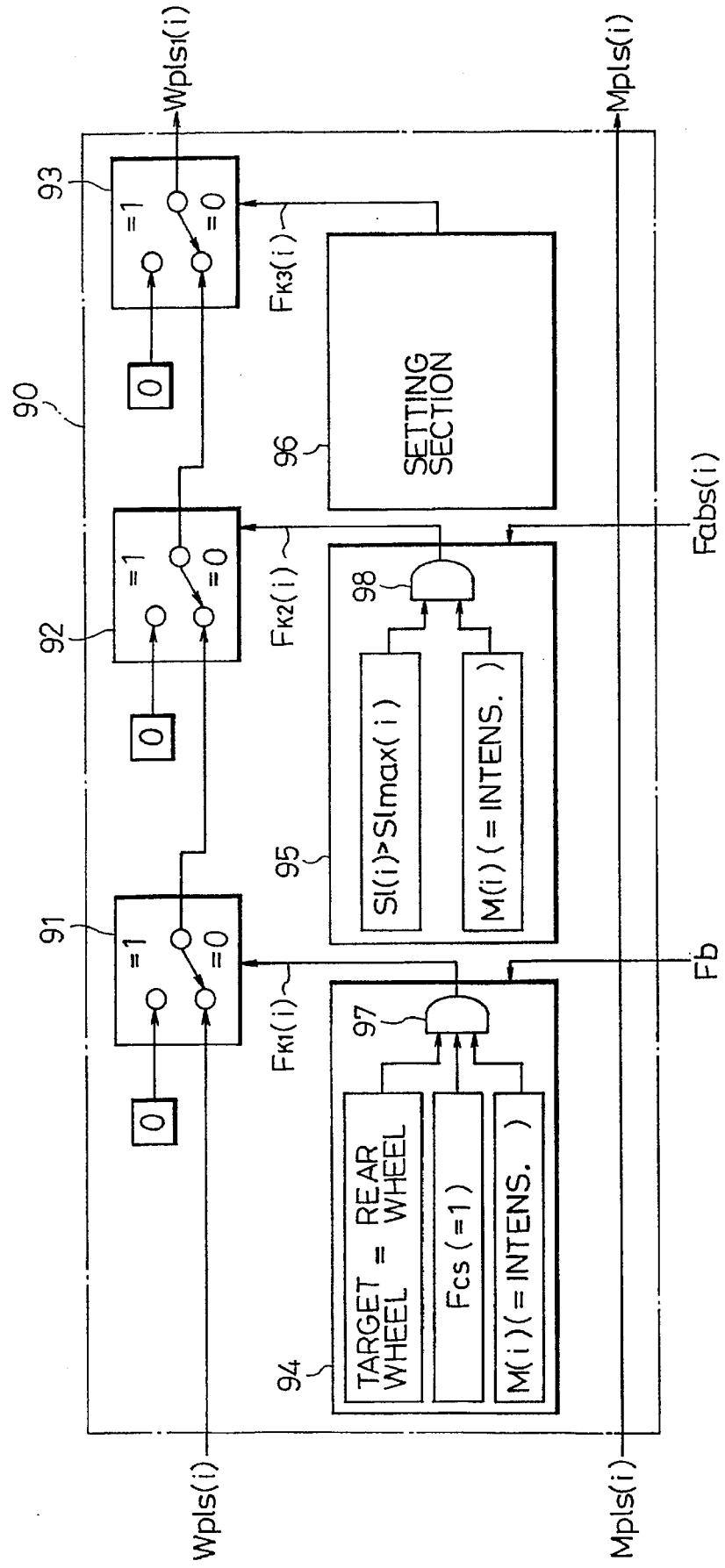
FIG. 24 is a block diagram showing the details of an intensify-pressure/reduce-pressure inhibitory section shown in FIG. 15.

When the switch 91 receives the inhibiting flag Fk1(i)=1, it is shifted from the state shown in FIG. 24, whereupon the pulse width Wpls1(i) is set at 0. Instead of setting the pulse width Wpls(i) at 0, in this case, its value may be reduced.

Figure 25:
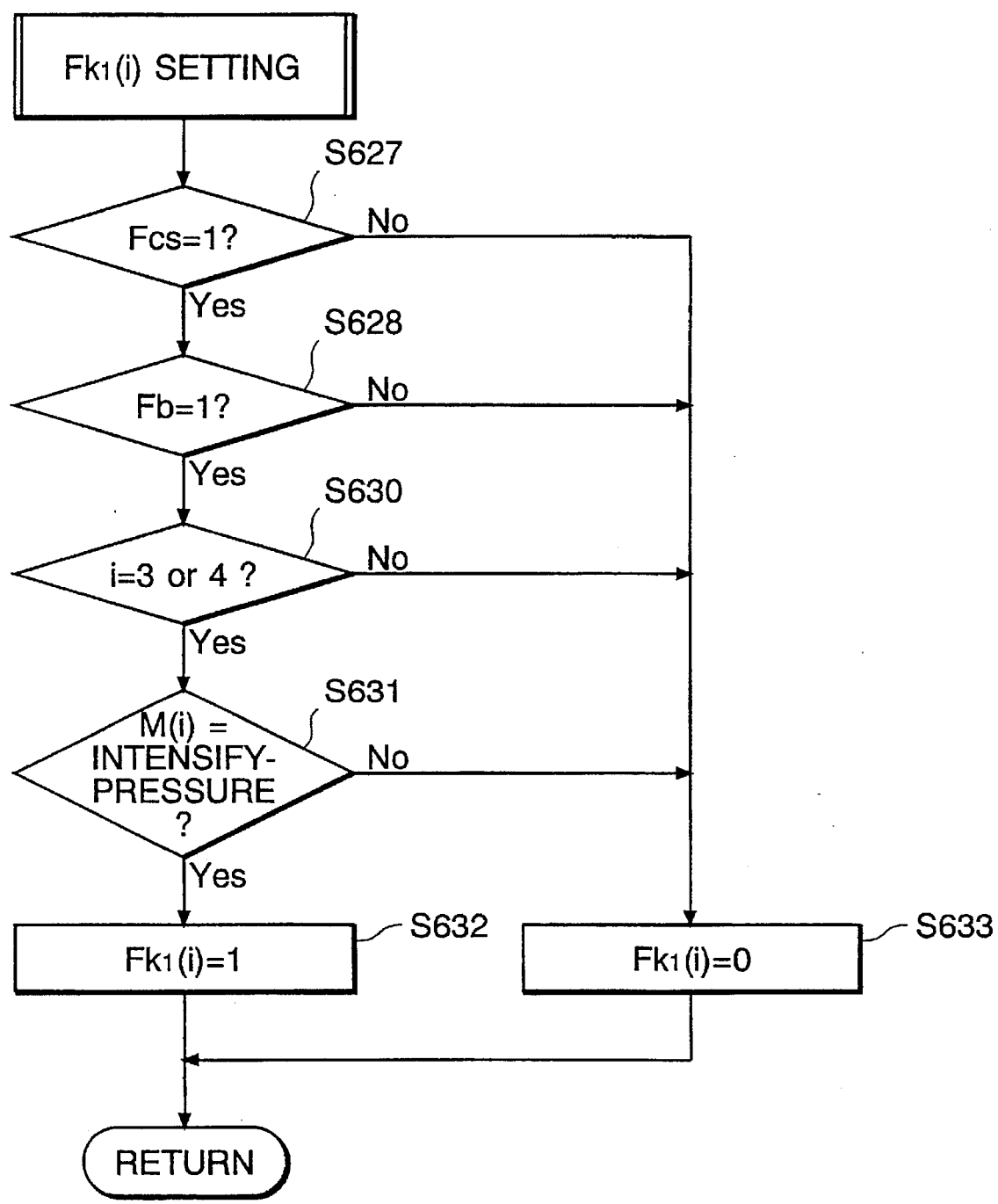
FIG. 25 is a flowchart showing a setting routine for an intensify-pressure inhibiting flag Fk1(i) associated with the intensify-pressure/reduce-pressure inhibitory section.

FIG. 25 shows a setting routine for the intensify-pressure inhibiting flag Fk1(i). In this routine, 1 is set in the inhibiting flag Fk1(i) only when all the decisions in Steps S627 to S631 are Yes. In other words, the value of the flag Fk1(i) is set at 1 only in the case where on-signals are applied to all three inputs of the AND circuit 97 shown in FIG. 24 when the vehicle is not braked. In connection with this, the AND circuit 97 is supplied with the flag Fb that indicates whether the vehicle is braked or not. The index i associated with the determination in Step S630 is a numerical value by which the four wheels of the vehicle are discriminated from one another, as mentioned before. If the index i is 3 or 4, the wheel to be discriminated is a rear wheel.

An intensify-pressure inhibiting flag Fk2(i) for the case of an excessive slip is set in the setting section 95. The setting section 95 also includes an AND circuit 98, the output of which is supplied to the switch 92. On-signals are supplied individually to input terminals of the AND circuit 98 if corresponding conditions are met. Input conditions for the individual on-signals involve cases that the slip factor Sl(i) is higher than an allowable slip factor Slmax(i) and that the control mode M(i) is the intensify-pressure mode.

The AND circuit 98 outputs an intensify-pressure inhibiting flag Fk2(i)=1 if all its inputs are on-signals, and outputs an intensify-pressure inhibiting flag Fk2(i)=0 if not.

When the switch 92 receives the intensify-pressure inhibiting flag Fk2(i)=1, it is shifted from the state shown in FIG. 24, whereupon the pulse width Wpls1(i) is set at 0. Instead of setting the pulse width Wpls(i) at 0, in this case, its value may be reduced.

Figure 26:
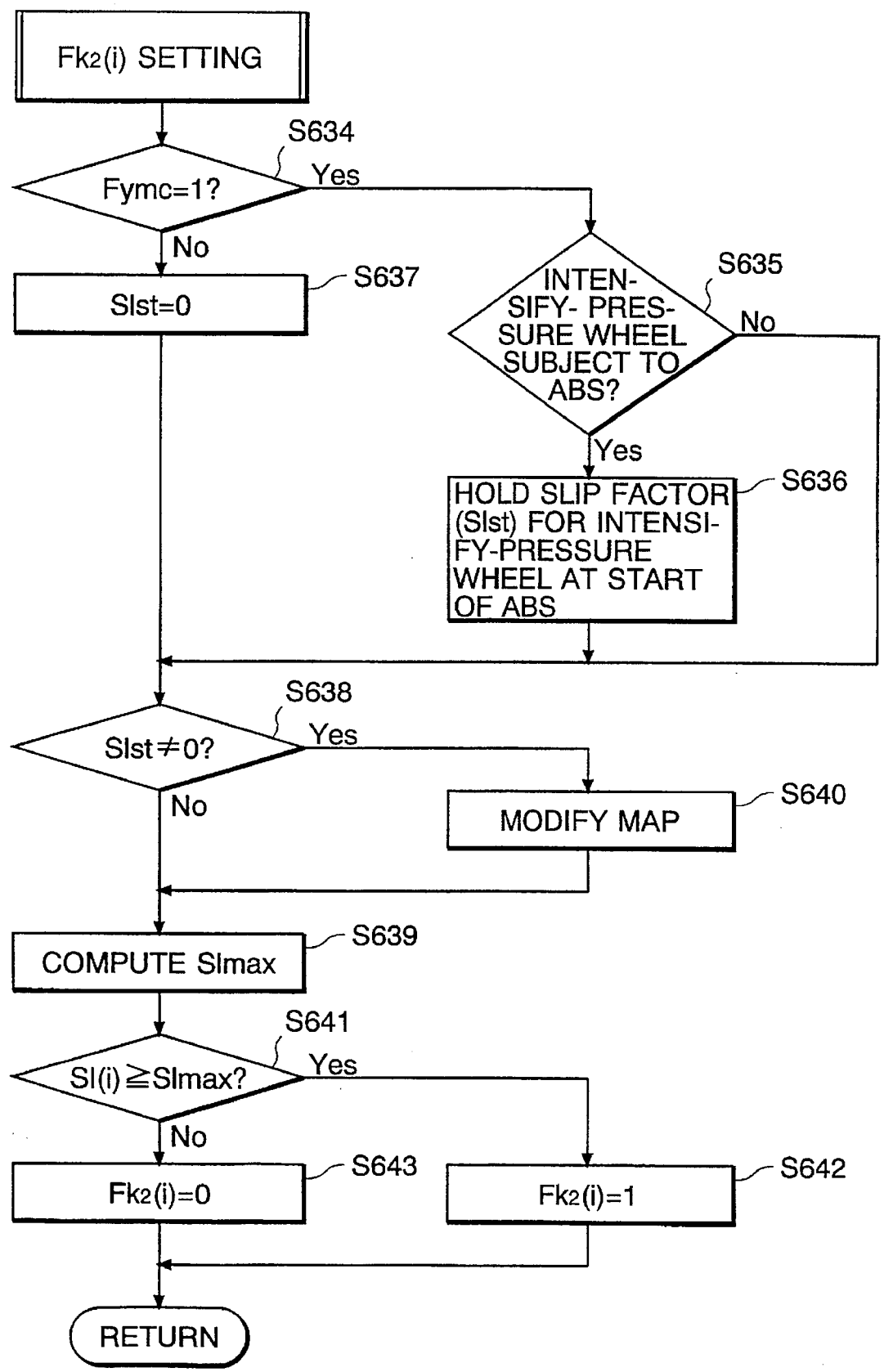
FIG. 26 is a flowchart showing a setting routine for an intensify-pressure inhibiting flag Fk2(i) associated with the intensify-pressure/reduce-pressure inhibitory section.

Referring to FIG. 26, there is shown a detailed routine illustrating a setting sequence for the intensify-pressure inhibiting flag Fk2(i). In this setting routine, it is first determined whether or not the value of the control beginning/ending flag Fymc is 1, that is, whether or not the vehicle is under the yaw moment control (Step S634). If the decision in Step S634 is Yes, it is determined whether or not the wheel (intensify-pressure wheel) for which the intensify-pressure mode is established as its control mode M(i) is subjected to the ABS control (Step S635). A flag Fabs(i) (mentioned later) is used for the determination in Step S635, so that the setting section 95 of FIG. 24 is also supplied with the flag Fabs(i).

If the decision in Step S635 is Yes, a determination slip factor associated with the intensify-pressure wheel at the start of the ABS control is held as a determination slip factor Slst(i) (Step S636), and Step S638 is then executed. If the decision in Step S635 is No, in contrast with this, Step S638 is executed without carrying out Step S636. The ABS control will be described later.

If the decision in Step S634 is No, that is, if the vehicle is not under the yaw moment control, on the other hand, the determination slip factor Slst(i) is reset at 0 (Step S637), and Step S638 is then executed.

In Step S638, it is determined whether or not the determination slip factor Slst(i) is 0. If the decision in Step S638 is No, that is, if the intensify-pressure wheel is not under the ABS control, the allowable slip factor Slmax(i) is computed (Step S639). Specifically, the allowable slip factor Slmax(i) is read from a map, such as the one shown in FIG. 27, in accordance with the required yaw moment γd. As seen from FIG. 27, the allowable slip factor Slmax(i) has a characteristic such that increases at a predetermined rate as the required yaw moment γd increases, and its maximum value is set at 20%.

In Step S641, it is determined whether or not the slip factor Sl(i) is equal to or higher than the allowable slip factor Slmax(i). If the decision in Step S641 is Yes, 1 is set in the intensify-pressure inhibiting flag Fk2(i) (Step S642). If the decision in Step S642 is No, 0 is set in the inhibiting flag Fk2(i) (Step S643).

Figure 27:
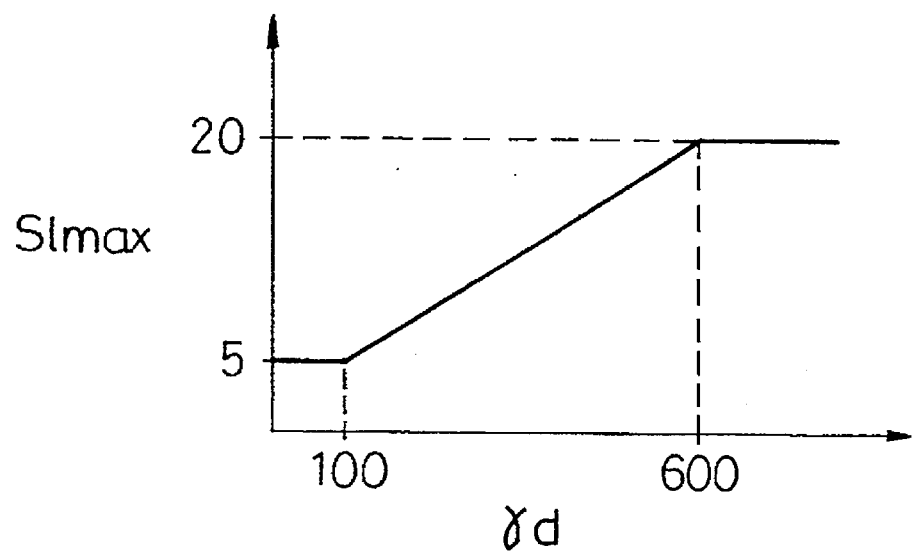
FIG. 27 is a graph showing the relation between the required yaw moment γd and allowable slip factor Slmax.
Figure 28:
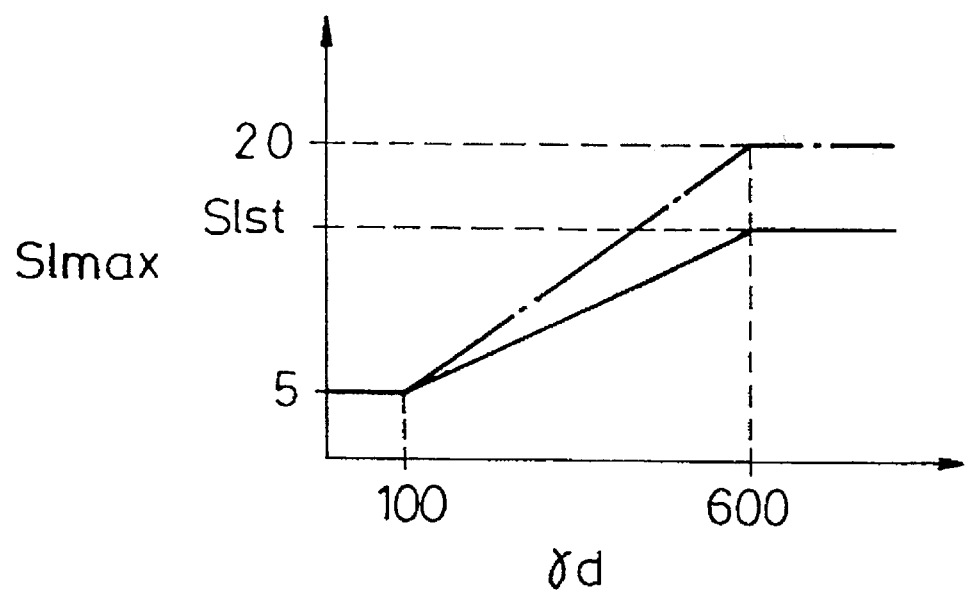
FIG. 28 is a graph showing the relation between the required yaw moment γd and allowable slip factor Slmax after the start of ABS control.

If the decision in Step S638 is Yes, that is, if the intensify-pressure wheel is under the ABS control, on the other hand, the map from which the allowable slip factor Slmax(i) is read is modified (Step S640). Specifically, the map of FIG. 27 is replaced by a map shown in FIG. 28 in Step S640. As seen from FIG. 28, in this case, the maximum value of the allowable slip factor Slmax(i) is adjusted to the determination slip factor Slst(i) (or 95% of Slst(i)), and the gradient of its increase is changed in accordance with the determination slip factor Slst(i).

When the intensify-pressure wheel is under the ABS control, therefore, the allowable slip factor Slmax(i) is adjusted to the determination slip factor Slst(i). Thereupon, the decision in Step S641 is Yes, so that the intensify-pressure inhibiting flag Fk2(i) is kept at 1.

In the setting section 96 (see FIG. 24), a prevention flag Fk3=1 for preventing overshooting of the brake pressure control is delivered to the switch 93 when a condition is met such that the absolute value of the required yaw moment γd tends to decrease to an extent higher than a predetermined degree. If this condition is not met, a prevention flag Fk3=0 is delivered to the switch 93. When the switch 93 is supplied with the flag Fk3=1, also in this case, it is shifted, whereupon the pulse width Wpls1(i) is set at 0.

Figure 29:
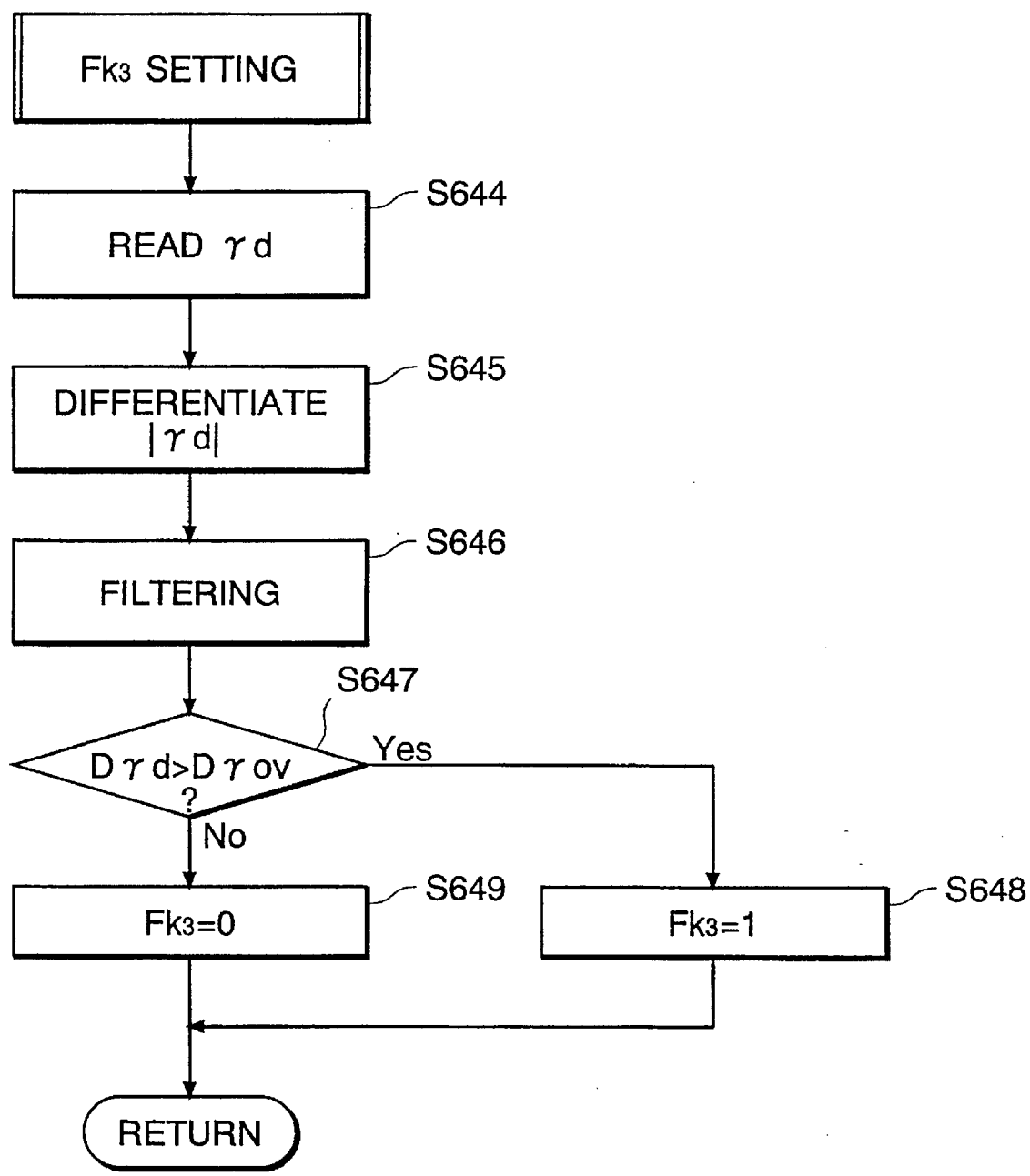
FIG. 29 is a flowchart showing a setting routine for a prevention flag Fk3.

Referring to FIG. 29, there is shown a detailed routine illustrating a setting sequence for the prevention flag Fk3. In this setting routine, the required yaw moment γd is read first (Step S644), and a derivative Dγd of the absolute value of the required yaw moment γd is computed (Step S645). Further, the derivative Dγd is filtered (fc=2 Hz) (Step S646).

The processing in Steps S645 and S646 can be expressed as follows:

$$D\gamma d = LPF(|\gamma d| - |\gamma dm|),$$

where γm is the preceding value.

Then, it is determined whether or not the derivative Dγd is smaller than an overshoot determination value Dγov (e.g., $-125$ kgm/s$^2$, that is, whether or not the required yaw moment γd is reduced at a gradient greater than the one represented by the absolute value of the determination value Dγov (Step S647). If the decision in Step S647 is Yes, 1 is set in the prevention flag Fk3 (Step S648). If the decision in Step S647 is No, on the other hand, 0 is set in the flag Fk3 (Step S649).

Referring again to FIG. 15, the block diagram for the yaw moment control includes a pre-pressurization control determination section 100. In this determination section 100, the respective values of pre-pressurization flags Fpre1 and Fpre2, which are referred to during operation control for the pumps 16 and 17, inlet and outlet valves 12 and 13, and cutoff valves 19 and 20, are set in advance of the start of the yaw moment control. Specifically, if the absolute value of the required yaw moment γd or the maximum yaw rate deviation Δγmax is greater than a predetermined value so that the yaw moment control is permitted to start, a pre-pressurization flag Fpre1=1 or Fpre2=1 is set for a fixed period of duration (e.g., 96 msec). When the yaw moment control is started during this period, the pre-pressurization flag Fpre1 or Fpre2 is reset at 0. The pre-pressurization flag Fpre1=1 is set for a clockwise turn of the vehicle, and Fpre2=1 for a counterclockwise turn.

Figure 30:
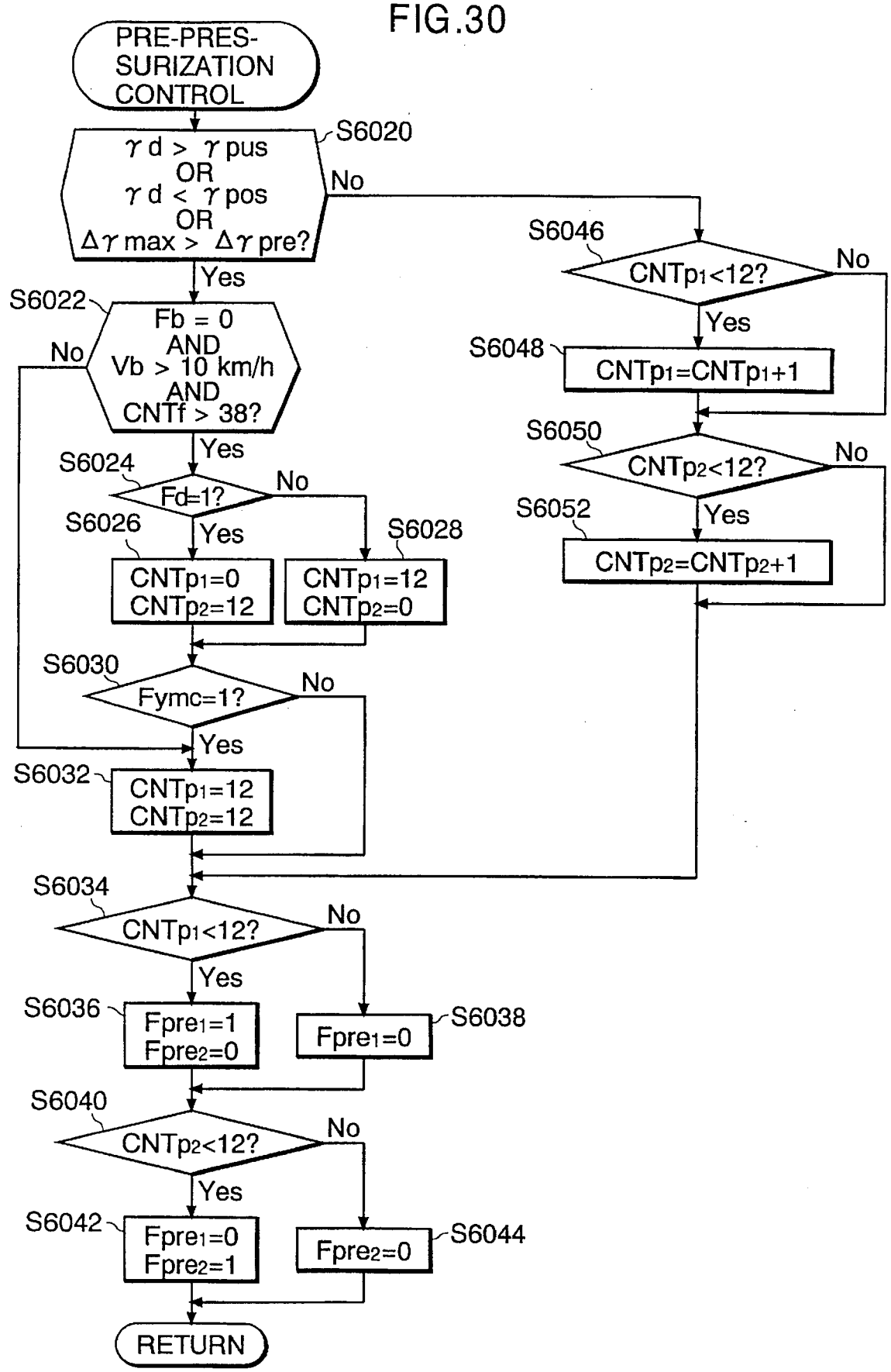
FIG. 30 is a flowchart showing a pre-pressurization control procedure.

FIG. 30 is a flowchart showing a pre-pressurization control routine. The procedure of pre-pressurization control will now be described further in detail with reference to the flowchart of FIG. 30.

First, in Step S6020, it is determined whether or not the absolute value of the required yaw moment γd is greater than the predetermined value, that is, whether or not the required yaw moment γd is greater than a predetermined value γpus (e.g., 150 kgm/s) on the US side or smaller than a predetermined value γpos (e.g., −80 kgm/s) on the OS side. Further, it is determined whether or not the maximum yaw rate deviation Δγ/T max is greater than a predetermined value Δγpre (e.g., 6 deg/s).

If the decision in Step S6020 is Yes, that is, if the required yaw moment Δd is greater than the predetermined value γpus or smaller than the predetermined value γpos, or if the maximum yaw rate deviation Δγmax is greater than the predetermined value Δγpre, the program then advances to Step S6022.

In Step S6022, it is determined whether or not the brake pedal 3 is not depressed so that the value of the brake flag Fb is 0 or the vehicle is not in a braked state, whether or not the vehicle velocity Vb is high enough or its value is greater than a determination value 10 km/h, and whether not the value in a counter CNTf, which is counted up during the execution of termination control (mentioned later) for terminating the yaw moment control, is greater than 38, which is indicative of completion of the termination control.

If all the decisions in Step S6022 are Yes, the program advances to Step S6024.

In Step S6024, it is determined whether or not the value of the turn flag Fd is 1, that is, whether the turn direction is clockwise or counterclockwise. If the decision in Step S6024 is Yes, that is, if the value of the turn flag Fd is 1, which is indicative of a clockwise turn (a right-hand turn) of the vehicle, the program then advances to Step S6026.

In Step S6026, the value in a counter CNTp1 is set at 0, and the value in a counter CNTp2 at a predetermined value (e.g., 12). These counters CNTp1 and CNTp2 start counting when the decision in Step S6020 changes from Yes to No, and their maximum value is 12. If the value in each of these counters is 12, then the pre-pressurization control will not be required any longer.

The counter CNTp1 is used when the vehicle turns clockwise (Fd=1). In this case, the front-left and rear-right wheels $FW_L$ and $RW_R$, for which the noncontrol mode is not established as the control mode M(i), are subjected to the pre-pressurization control. On the other hand, the counter CNTp2 is used when the vehicle turns counterclockwise (Fd=0). In this case, the front-right and rear-left wheels $FW_R$ and $RW_L$, for which the noncontrol mode is not established as the control mode M(i), are subjected to the pre-pressurization control.

In Step S6030, the next stage, it is determined whether or not the value of the required yaw moment γd is greater than the threshold value γus (γus>γpus) for the start of the control or smaller than the threshold value γos (γos<γpos), or whether or not the value of Fymc is 1, which indicates that the yaw moment control is started.

Immediately after the decision in Step S6020 is changed from No to Yes, the decision in Step S6030 is No. In this case, the program advances to Step S6034.

In Step S6034, it is determined whether or not the value in the counter CNTp1 is smaller than 12. Since the value in the counter CNTp1 is set at 0 in Step S6026, the decision in Step S6034 is Yes, whereupon the program advances to Step S6036.

In Step S6036, 1 and 0 are set in the pre-pressurization flags Fpre1 and Fpre2, respectively. These flags Fpre1 and Fpre2 indicate the execution or non-execution of pre-pressurization. The flag value 1 indicates that the pre-pressurization is carried out, while 0 indicates that the pre-pressurization is not carried out.

The pre-pressurization flag Fpre1 corresponds to the counter CNTp1, and indicates the case of a clockwise turn (Fd=1) of the vehicle. In this case, the front-left and rear-right wheels $FW_L$ and $RW_R$, for which the noncontrol mode is not established as the control mode M(i), are subjected to the pre-pressurization control. On the other hand, the pre-pressurization flag Fpre2 corresponds to the counter CNTp2, and indicates the case of a counterclockwise turn (Fd=0) of the vehicle. In this case, the front-right and rear-left wheels $FW_R$ and $RW_L$, for which the noncontrol mode is not established as the control mode M(i), are subjected to the pre-pressurization control. Since the value of the pre-pressurization flag Fpre1 is set at 1 in Step S6036, therefore, the pre-pressure for the brake pressure is applied to the front-left and rear-right wheels $FW_L$ and $RW_R$.

Figure 31:
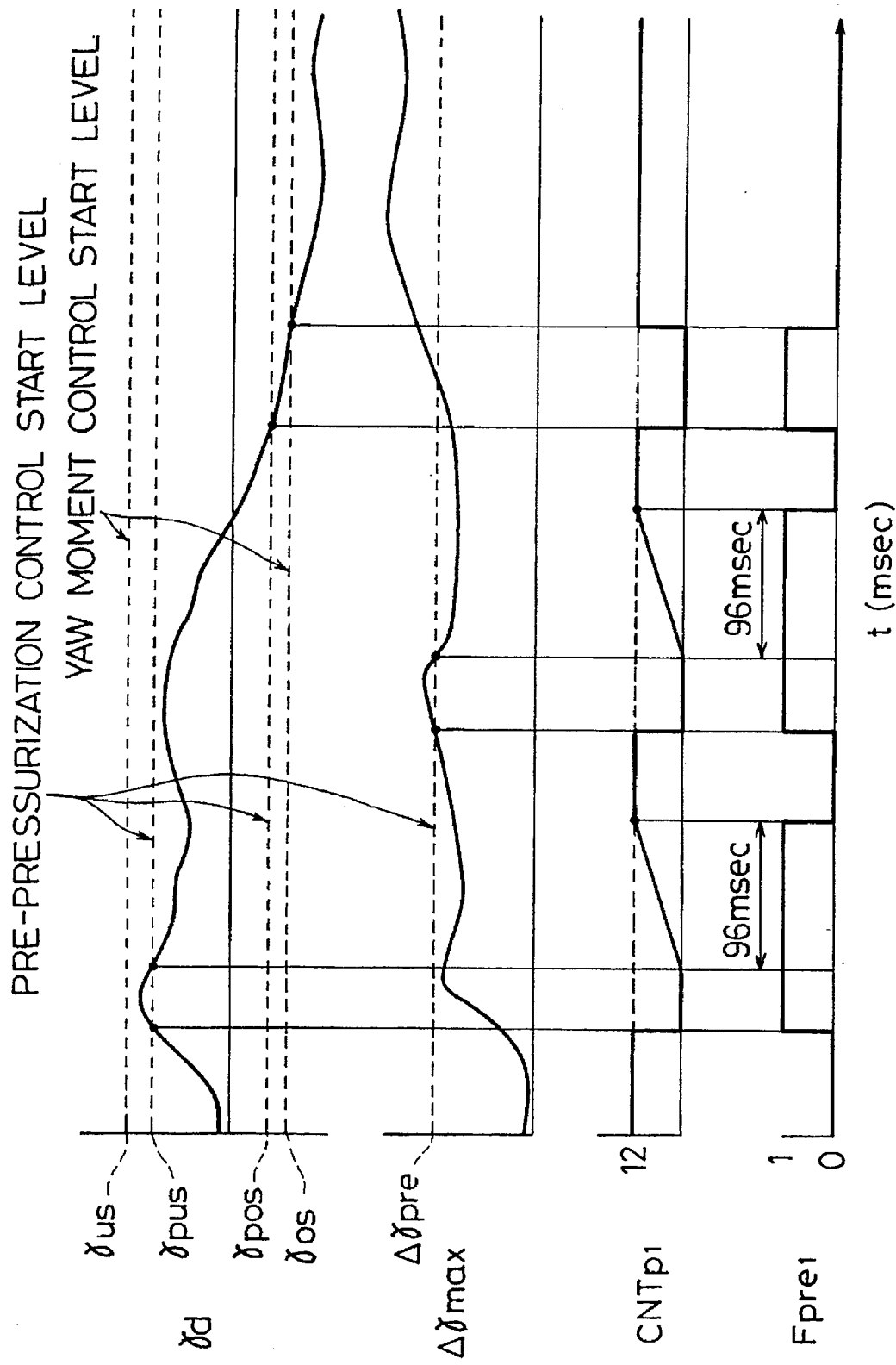
FIG. 31 is a time chart showing the time-dependent changes of a counter CNTp1 and a pre-pressurization flag Fpre1 set with reference to the flowchart of FIG. 30 when the vehicle turns clockwise or makes a right-hand turn.

FIG. 31 is a time chart showing the respective time-dependent changes of the required yaw moment γd, maximum yaw rate deviation Δγmax, counter CNTp1, and pre-pressurization flag Fpre1 obtained when the pre-pressurization control is carried out. When the required yaw moment γd exceeds the predetermined value γpus, as shown in FIG. 31, the value in the counter CNTp1 becomes 0 (Steps S6020 and S6026), and at the same time, the value of the pre-pressurization flag Fpre1 changes from 0 to 1 (Step S6036). Thereupon, application of the pre-pressure is started.

In Step S6040 shown in FIG. 30, it is determined whether or not the value in the counter CNTp2 is smaller than 12. Since the value in the counter CNTp2 is set at 12 in Step S6026 in this case, the decision in Step S6040 is No, whereupon the program advances to Step S6044.

In Step S6044, 0 is set anew in the pre-pressurization flag Fpre2 lest the pre-pressure be applied to the front-right and rear-left wheels $FW_R$ and $RW_L$.

If the decisions in Steps S6020 and S6030 are Yes and NO, respectively, so that no yaw moment control continues to be carried out while the routine concerned is being executed repeatedly, the values of the pre-pressurization flags Fpre1 and Fpre2 are kept at 1 and 0, respectively, as shown in FIG. 31.

The program advances to Step S6046, however, if the decision in Step S6020 becomes No, that is, if the required yaw moment γd becomes not higher than the predetermined value γpus or not lower than the predetermined value γpos, or if the maximum yaw rate deviation Δγmax becomes not higher than the predetermined value Δγpre, as the routine concerned is executed repeatedly.

In Step S6046, it is determined whether or not the value in the counter CNTp1 is smaller than 12. Since 0 is set in the counter CNTp1 in Step S6026, the decision in Step S6046 is Yes, whereupon the program advances to Step S6048.

In Step S6048, the value in the counter CNTp1 is counted up (see FIG. 31).

In Step S6050, the next stage, it is determined whether or not the value in the counter CNTp2 is smaller than 12. Since 12 is set in the counter CNTp2 in Step S6026, the decision in Step S6050 is No. In this case, the value in the counter CNTp2 is not counted up, and the program advances to Step S6034.

Step S6034 and the subsequent steps are executed in the aforementioned manner. Thus, the value of the pre-pressurization flag Fpre1 is kept at 1 while the value in the counter CNTp1 is being counted up in Step S6048 as the routine concerned is further executed repeatedly. More specifically, the pre-pressurization is continued for a given period of time (12×T (8 msec)=96 msec) before the value in the counter CNTp1 reaches 12. When the value in the counter CNTp1 reaches 12, the decision in Step S6034 becomes No. In this case, the program advances to Step S6038, whereupon the value of the pre-pressurization flag Fpre1 is reset from 1 to 0 (see FIG. 31).

Step S6032 is executed if the decision in Step S6030 becomes Yes during the pre-pressurization, that is, if the value of the required yaw moment γd is greater than the threshold value γus for the start of the control or smaller than the threshold value γos, so that the value of Fymc becomes 1 to permit the start of the yaw moment control. In Step S6032, both the values in the counters CNTp1 and CNTp2 are set at 12. Thereupon, both the decisions in Steps S6034 and S6040 are No, and the values of the pre-pressurization flags Fpre1 and Fpre2 are set at 0 in Steps S6038 and 6044, respectively. Thus, no pre-pressurization is carried out at all when the yaw moment control is started (see FIG. 31).

If the decision in Step S6024 is No so that the value of Fd is 0, which is indicative of a counterclockwise turn of the vehicle, the values in the counters CNTp1 and CNTp2 are set at 12 and 0, respectively, in Step S6028.

Thereafter, the control is effected following the same steps of procedure for the clockwise turn, so that a detailed description of these steps will be omitted. In this case, however, the value in the counter CNTp2 is counted up in Step S6052, and 1 is set in the pre-pressurization flag Fpre2 in Step S6042.

Figure 32:
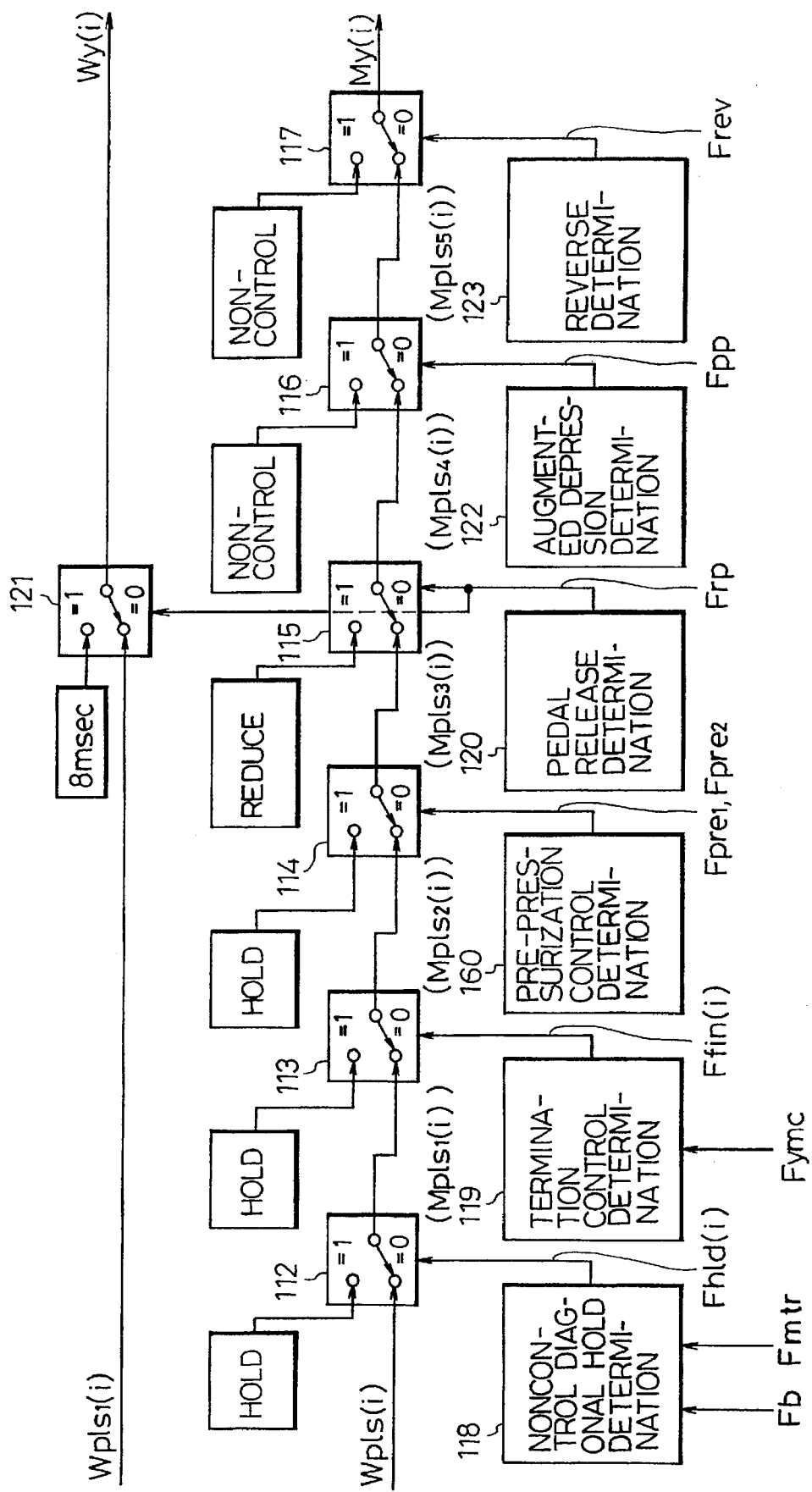
FIG. 32 is a block diagram showing the details of a signal forced-modification section shown in FIG. 15.

FIG. 15 also shows a control signal forced-modification section 111, the details of which are shown in FIG. 32. The forced-modification section 111 can compulsorily modify the pulse width Wpls(i) and the actuation mode Mpls(i), depending on various conditions. Thus, the pulse width Wpls(i) and the actuation mode Mpls(i) are modified as required when the forced-modification section 111 is passed, and are outputted as a pulse width Wy(i) and an actuation mode My(i), respectively.

As seen from FIG. 32, the actuation mode Mpls(i) is converted into the actuation mode My(i) by means of switches 112 to 117, which are supplied with flags and shifted in accordance with the respective values of the flags.

More specifically, the switch 112 is shifted by a flag Fhld(i) delivered from a noncontrol diagonal hold determination section 118. In the determination section 118, the value of that flag, among other flags Fhld(i), which corresponds to the wheel for which the noncontrol mode is established as the control mode M(i) is set at 1 when the pump 16 or 17 is actuated (or if a motor actuation flag Fmtr (mentioned later) is 1 (Fmtr=1)) with the vehicle not braked (Fb=0). In this case, therefore, the switch 112 outputs an actuation mode Mpls1(i), which is obtained by compulsorily changing the noncontrol mode, among the control modes set in the actuation mode Mpls(i), to the hold mode. If the value of the flag Fhld(i) is 0, on the other hand, the actuation mode Mpls(i) is outputted directly from the switch 112. In the actuation mode Mpls(i), the pressure of discharge from the pump 16 or 17 cannot be supplied to the wheel brakes of the wheels in the noncontrol mode, although the control mode of those wheels is compulsorily changed to the hold mode.

The switch 113 is shifted by termination flags Ffin(i) delivered from a termination control determination section 119. In the determination section 119, the termination control to terminate the yaw moment control is carried out in a manner such that the brake pressure is gradually decreased to the master cylinder pressure by setting the termination flags Ffin(i) at 1 for a predetermined time (e.g., 24 msec) with every predetermined cycle (e.g., 40 msec) in a fixed period (e.g., 304 msec) since the delivery of a termination command (Fymc=0) for the yaw moment control.

Figure 33:
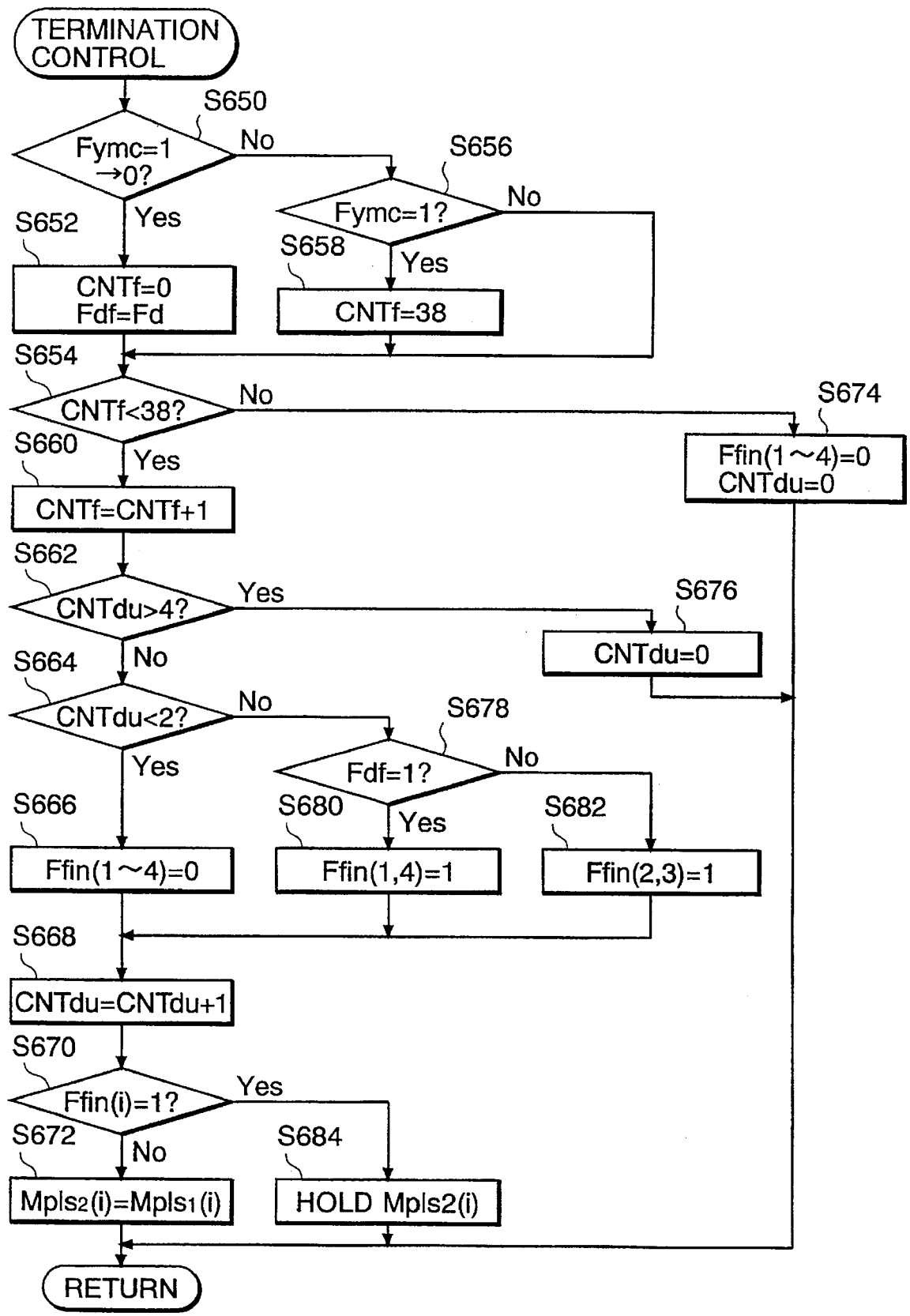
FIG. 33 is a flowchart showing a termination control routine.
Figure 34:
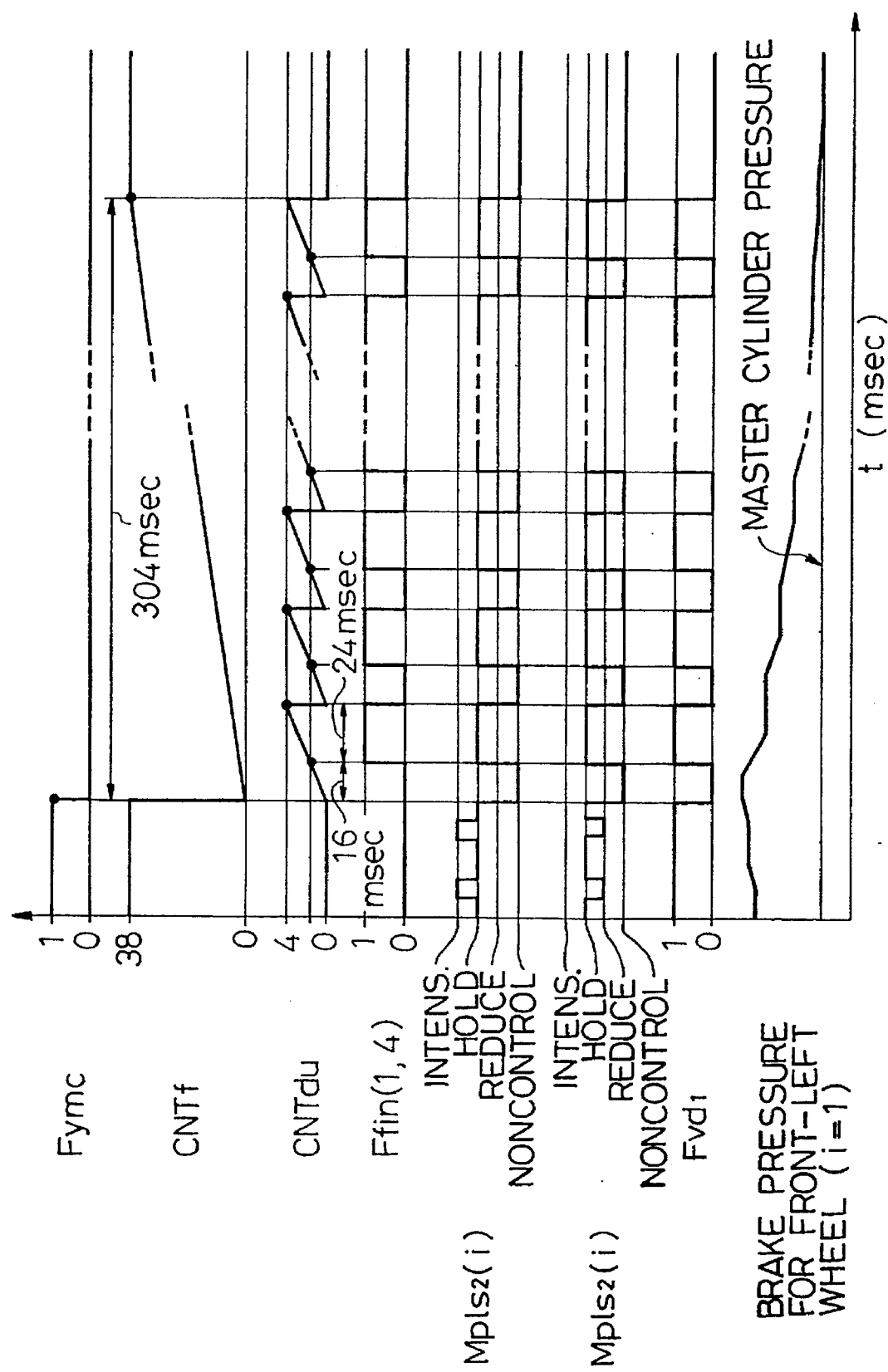
FIG. 34 is a time chart showing the time-dependent changes of termination flags Ffin(i) and the like set in accordance with the terminal control routine of FIG. 33 when the vehicle turns clockwise.

FIG. 33 is a flowchart showing a termination control routine, and FIG. 34 shows the time-dependent changes of the termination flags Ffin(i) and the like set with reference to the flowchart of FIG. 33 when the vehicle turns clockwise. Referring now to FIGS. 33 and 34, the termination control will be described.

In Step S650 shown in FIG. 33, It is first determined whether or not the value of the control beginning/ending flag Fymc has been changed from 1 to 0, that is, whether or not the yaw moment control termination command is delivered. If the decision in Step S650 is Yes, that is, if the value of the flag Fymc is concluded to have been changed from 1 to 0, the program advances to Step S652.

In Step S652, the value in the counter CNTf, which is counted up for the aforesaid fixed period (e.g., 304 msec), is reset at 0. Also, the turn flag Fd at the time of delivery of the yaw moment control termination command is held as a termination turn flag Fdf, whereupon the program advances to Step S654.

If the decision in Step S650 is No, that is, if the value of the flag Fymc is not concluded to have been changed from 1 to 0, on the other hand, the program advances to Step S656. In Step S656, it is determined whether or not the value of the control beginning/ending flag Fymc is 1, whereby it is determined whether or not the vehicle is under the yaw moment control. If the decision in Step S656 is Yes, the program advances to Step S658, whereupon the maximum value of 38 is set in the counter CNTf, and the program then advances to Step S654. If the decision in Step S656 is No, the program advances directly to Step S654.

In Step S654, it is determined whether or not the value in the counter CNTf is 38. If the decision in Step S654 is Yes, that is, if 38 is not reached by the value in the counter CNTf or if the time elapsed since the delivery of the yaw moment control termination command is shorter than 304 (38×8) msec, the program advances to Step S660, whereupon the counter CNTf is counted up.

In Step S662, it is determined whether or not the value in a counter CNTdu for counting up to a value corresponding to a predetermined time (e.g., 40 msec) is greater than 4, that is, at 5 or more, which corresponds to 40(=5×8) msec or more. If the decision in Step S662 is No, that is, if the value in the counter CNTdu is not greater than 4 or if the time elapsed since the resetting of the counter CNTdu is not concluded to have reached 40 msec, the program advances to Step S664.

In Step S664, it is determined whether or not the value in the counter CNTdu is smaller than 2. If the decision in Step S664 is Yes, that is, if the value in the counter CNTdu is smaller than 2, the program advances to Step S666.

In Step S666, the respective values of all the termination flags Ffin(i) or flags Ffin(1) to Ffin(4), control variables for the termination control, are set at 0. In Step S668, the next stage, the value in the counter CNTdu is counted up, whereupon the program advances to Step S670.

In Step S670, it is determined whether or not the values of the termination flags Ffin(i) are 1. Since the values of the termination flags Ffin(i) are all 0, as mentioned before, the decision in Step S670 is No, whereupon the program advances to Step S672.

In Step S672, the actuation mode Mpls1(i) is set and outputted directly as an actuation mode Mpls2(i). Accordingly, in this case, the switch 113 of FIG. 32 is held in the state illustrated, and the actuation mode Mpls(i) based on the control mode M(i) set in accordance with the value of the output Fymc of the control start/end determination section 80 shown in FIG. 15 is outputted as it is. Since the end of the control is already determined in the determination section 80 so that the value of Fymc is 0, in this case, the actuation mode Mpls(i) or Mpls1(i) is adjusted to the noncontrol mode, so that the actuation mode Mpls2(i) is adjusted to the noncontrol mode when it is outputted (see FIG. 34).

When the value in the counter CNTdu is counted up to 2 as this routine is executed repeatedly, the decision in Step S664 becomes No. In this case, the program advances to Step S678, whereupon it is determined whether or not the value in the termination turn flag Fdf is 1. If the decision in Step S678 is Yes, that is, if the value of the flag Fdf is 1, which is indicative of a clockwise turn of the vehicle, the program advances to Step S680, whereupon the respective values of only the flags Ffin(1) and Ffin(4), among the other termination flags Ffin(i), are set at 1. If the value of the termination turn flag Fdf is 0, which is indicative of a counterclockwise turn of the vehicle, on the other hand, the program advances to Step S682, whereupon the respective values of only the termination flags Ffin(2) and Ffin(3) are set at 1.

If the values of the termination flags Ffin(1) and Ffin(4) or Ffin(2) and Ffin(3) are set at 1 in this manner, the decision in Step S670, which is executed directly after Step S668, is Yes, whereupon the program advances to Step S684. In this case, the switch 113 of FIG. 32 is shifted to the hold side, and the actuation mode Mpls2(i) adjusted to the hold mode is delivered from the switch 113. Thereafter, the routine concerned is executed repeatedly, and the hold mode continues to be outputted for the predetermined time (e.g., 24 msec) such that the decision in Step S662 becomes Yes, that is, the predetermined cycle (e.g., 40 msec) is over. When the decision in Step S662 becomes Yes, the value in the counter CNTdu is reset at 0 in Step S676, the next stage.

In this manner, the hold mode continues to be established as the actuation mode Mpls2(i) for the predetermined time (e.g., 24 msec) with every predetermined cycle (e.g., 40 msec). The value of a cut actuation flag Fvd1 (mentioned later), which is referred to in actuating the cutoff valve 19, is kept at 0 while the noncontrol mode is established as the actuation mode Mpls2(i). While the hold mode is established as the actuation mode Mpls2(i), on the other hand, the value of the flag Fvd1 is 1. As described in detail later, therefore, the brake pressure applied to an intensify-pressure-side wheel, e.g., the front-left wheel (i=1) in this case, is repeatedly reduced and held in the manner shown in FIG. 34. Thus, the brake pressure gradually attenuates without a drastic change.

If the decision in Step S654 is No, that is, if the value in the counter CNTf reaches 38, which indicates that the fixed period (e.g., 304 msec) is over, Step S674 is executed. Thereupon, the respective values of the flags Ffin(1) and Ffin(4) are set at 0, and the value in the counter CNTdu is also reset at 0. Thus, the termination control for terminating the yaw moment control is completed, whereupon the brake pressure becomes equal to the fluid pressure in the master cylinder 1, as shown in FIG. 34.

Referring again to FIG. 15, the switch 114 is shifted according to the pre-pressurization flags Fpre1 and Fpre2 that are delivered from the pre-pressurization control determination section 100 (already described with reference to FIG. 15). When the switch 114 receives the pre-pressurization flag Fpre1=1 or Fpre2=1, it outputs an actuation mode Mpls3(i), which is obtained by compulsorily changing the control mode for the wheel to be subjected to the turn control in the actuation mode Mpls(i) to the hold mode. In the case of Fpre1=Fpre2=0, on the other hand, the actuation mode Mpls(i) is outputted as it is.

According to the above description referring to FIG. 15, the control mode M(i) and the actuation mode Mpls(i) are set in response to the output of the control beginning/ending flag Fymc=1 from the control start/end determination section 80. However, setting the modes M(i) and Mpls(i) is executed without regard to the value, 1 or 0, of the flag Fymc. Even if the actuation mode Mpls3(i) is established as the actuation mode Mpls(i) when the pre-pressurization control is started, therefore, the brake pressure for the target wheel to be controlled cannot be adversely affected before the start of the yaw moment control.

It is advisable to adjust the control mode for the target wheel to a mode somewhat inclined to the intensify-pressure side with a generous pulse width Wpls(i), instead of establishing the perfect hold mode. By doing this, the brake pressure for the target wheel can be gradually increased in advance.

The switch 115 is shifted by a release flag Frp delivered from a pedal release determination section 120. When the brake pedal 3 is released during the yaw moment control, the determination section 120 sets the release flag Frp at 1 for a predetermined time (e.g., 64 msec). When the switch 115 receives the release flag Frp=1, it outputs an actuation mode Mpls4(i) in which the reduce-pressure mode is set as the control mode for each of the front-left, front-right, rear-left and rear-right wheels, instead of the actuation mode Mpls(i). In the case of a release flag Frp=0, the actuation mode Mpls(i) is outputted as it is.

The release flag Frp is also supplied to a switch 121. In the case of Frp=1, the switch 121 outputs the pulse width Wy(i), which is obtained by compulsorily modifying the value of the pulse width Wpls(i) into the control period T (=8 msec). In the case of Frp=0, the pulse width Wpls(i) is outputted directly as the pulse width Wy(i).

The switch 116 is shifted by the augmented depression flag Fpp delivered from an augmented depression determination section 122. The flag Fpp is set in the aforementioned manner in accordance with the routine shown in FIG. 6. When the switch 116 receives Fpp=1, it outputs an actuation mode Mpls5(i) for compulsorily switching all the wheels to the noncontrol mode. In the case of Fpp=0, the actuation mode Mpls(i) is outputted as it is. When the actuation mode Mpls5(i) is established, the driver's brake pedal operation can be reflected in the brake pressure for each wheel.

The switch 117 is shifted by a reverse flag Frev delivered from a reverse determination section 123. The determination section 123 sets the reverse flag Frev at 1 when the reverse gear is selected in the transmission of the vehicle, and otherwise, at 0. When the switch 117 receives the flag Frev=1, it outputs the actuation mode My(i) for compulsorily switching all the wheels to the noncontrol mode, in place of the actuation mode Mpls(i). In the case of Frev =0, the actuation mode Mpls(i) is outputted as the actuation mode My(i).

As shown in FIG. 15, the actuation mode My(i) delivered from the control signal forced-modification section 111 and the flags delivered from the pre-pressurization control determination section 100 are also supplied to an actuation determination section 124. FIGS. 35 to 39 show the details of the determination section 124.

Figure 35:
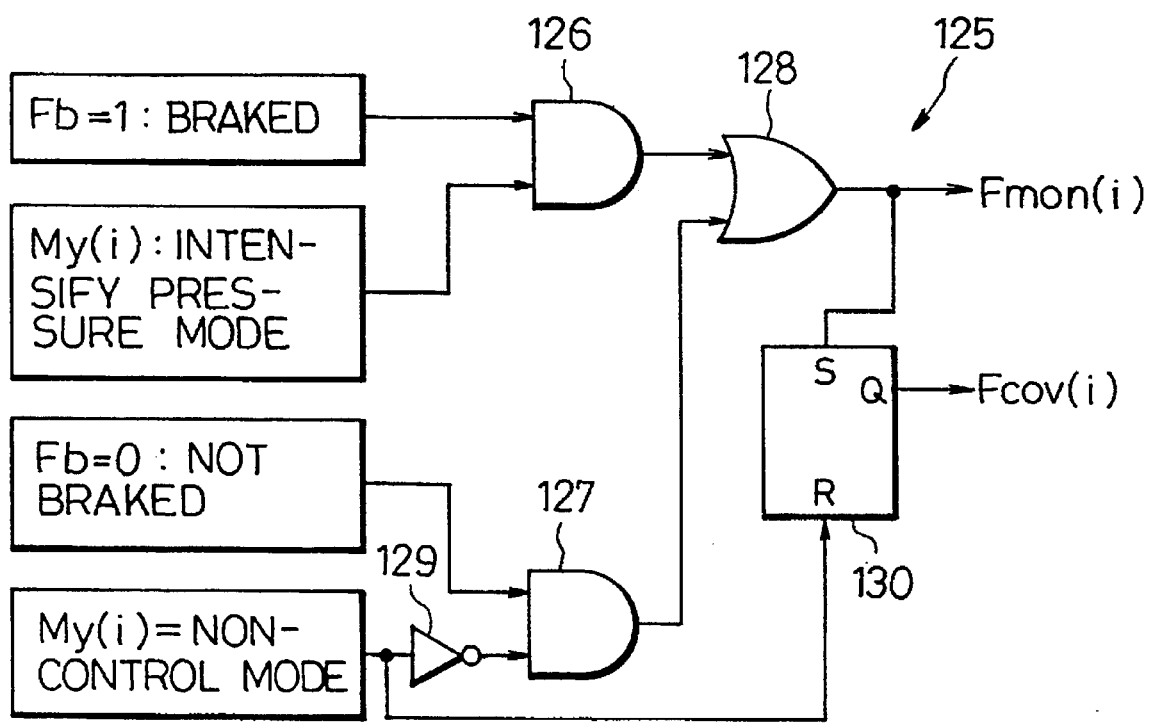
FIG. 35 is a block diagram showing part of an actuation determination section shown in FIG. 15.
Figure 36:
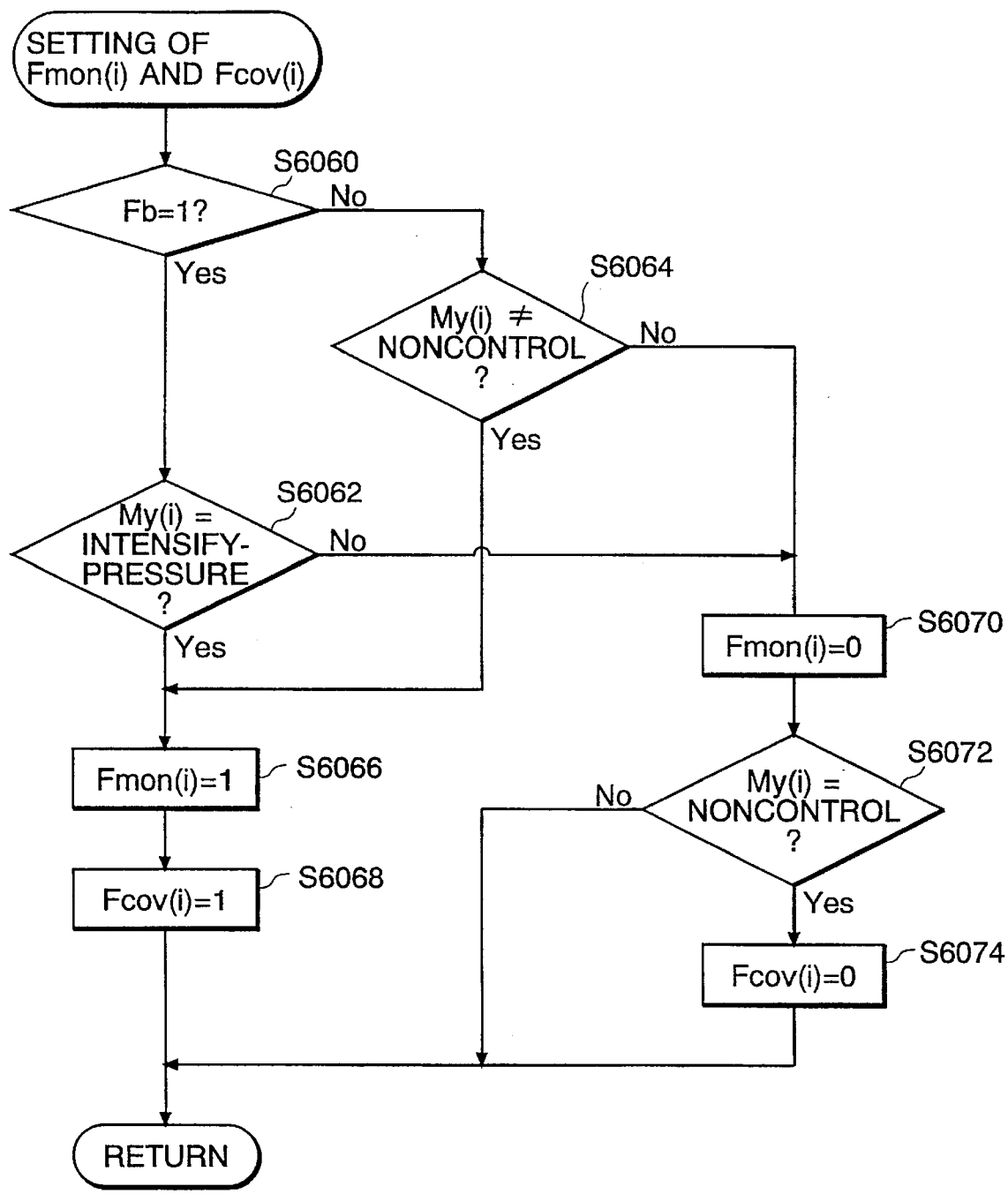
FIG. 36 is a flowchart showing a setting routine for request flags Fmon(i) and Fcov(i) the actuation determination section of FIG. 35 executes.

First, in a determination circuit 125 shown in FIG. 35, flags Fcov(i) and Fmon(i), which individually indicate requests for the actuation of the cutoff valves 19 and 20 and the motor 18, are set for the wheel cylinder of each wheel in accordance with a setting routine shown in the flowchart of FIG. 36.

The determination circuit 125 includes two AND circuits 126 and 127. The one AND circuit 126 delivers the index i, which assigns a specific wheel to the intensify-pressure mode, to an OR circuit 128 if its input is the brake flag Fb=1 and if the actuation mode My(i) is the intensify-pressure mode, that is, if the decisions in Steps S6060 and S6062 of FIG. 36 are both Yes.

The other AND circuit 127 delivers the index i, which is indicative of a wheel for which the noncontrol mode is not established, to the OR circuit 128 if its input is the brake flag Fb=0 and if the actuation mode My(i) is not the noncontrol mode, that is, if the decisions in Steps S6060 and S6064 of FIG. 36 are No and Yes, respectively. The input on the actuation-mode side of the AND circuit 127 is supplied through a NOT circuit 129.

When the OR circuit 128 receives outputs from the AND circuits 126 and 127, it sets 1 in that request flag Fmon(i) which corresponds to the supplied index i, among other request flags Fmon(i) for requesting the actuation of the motor 18, and outputs the request flag Fmon(i) (Step S6066).

If no outputs are delivered from the AND circuits 126 and 127, on the other hand, the OR circuit 128 sets 0 in the request flag Fmon(i) for requesting the motor actuation, and outputs the request flag Fmon(i) (Step S6070).

When the set terminal of a flip-flop 130 is supplied with the request flag Fmon(i)=1, the flip-flop 130 sets 1 in that request flag Fcov(i) which corresponds to the index i for specifying the wheel corresponding to the request flag Fmon(i)=1, among other request flags Fcov(i) indicative of the presence/absence of the request for the actuation of the cutoff valves 19 and 20, and continues to output the request flag Fcov(i) (Step S6068).

When the noncontrol mode is established as the actuation mode My(i), the reset terminal of the flip-flop 130 is supplied with a reset signal for each index i. Thus, when the flip-flop 130 receives the reset signal in the noncontrol mode, that is, if the decision in Step S6072 is Yes, the respective values of all the request flags Fcov(i) are reset at 0 (Step S6074). Step S6074 will not be executed if the decision in Step S6072 is No, that is, if the actuation mode My(i) is not the noncontrol mode. Even if the execution of Step S6070 indicates that the value of the request flag Fmon(i) is 0, in this case, the value of the request flag Fcov(i) cannot be reset at 0. If its value is 1, the request flag Fcov(i) is kept at 1.

Figure 37:
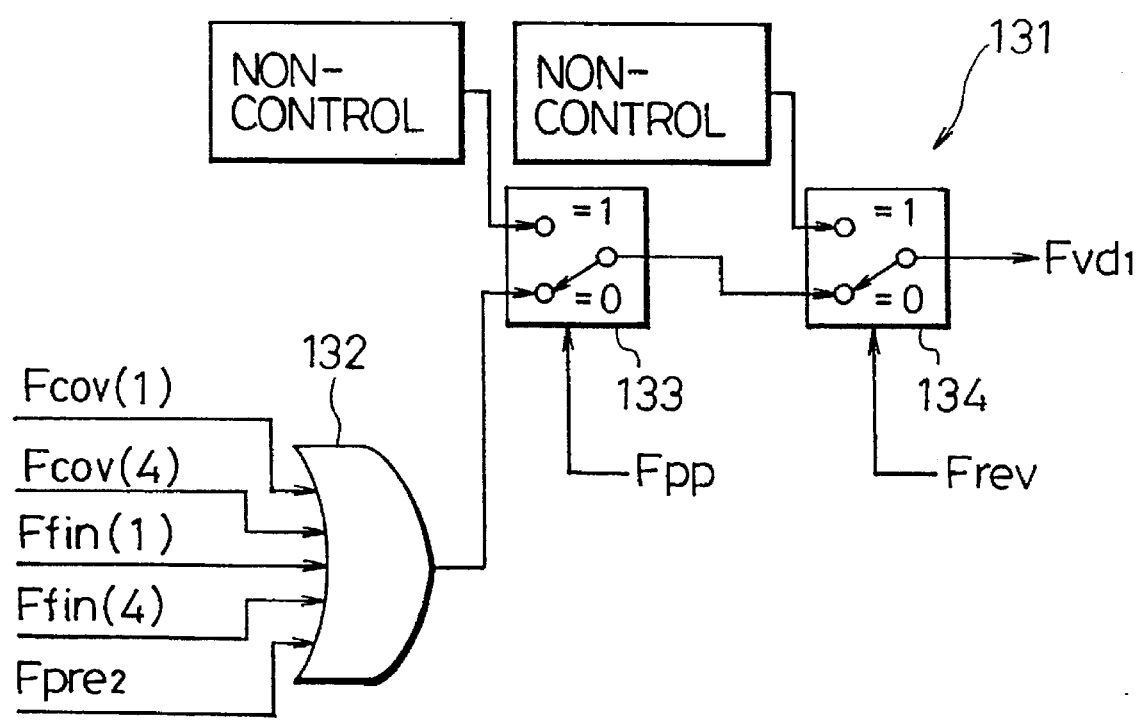
FIG. 37 is a block diagram showing part of the actuation determination section of FIG. 15.

A determination circuit 131 shown in FIG. 37 includes an OR circuit 132. The circuit 132 outputs 1 as the value of the cut actuation flag Fvd1 for actuating the cutoff valve 19, if any of the values of request flags Fcov(1) and Fcov(4), termination flags Ffin(1) and Ffin(4), and pre-pressurization flags Fpre1 and Fpre2 which are associated with the cutoff valve 19 on the side of the front-left and rear-right wheels $FW_L$ and $RW_R$, is 1.

The cut actuation flag Fvd1 from the OR circuit 132 is outputted via switches 133 and 134. The switches 133 and 134 are shifted by the augmented depression flag Fpp and the reverse flag Frev, respectively. Thus, even though the output of the OR circuit 132 is Fvd1=1, the cut actuation flag Fvd1 is reset at 0 (noncontrol mode) if either of the flags Fpp and Frev is set at 1.

Figure 38:
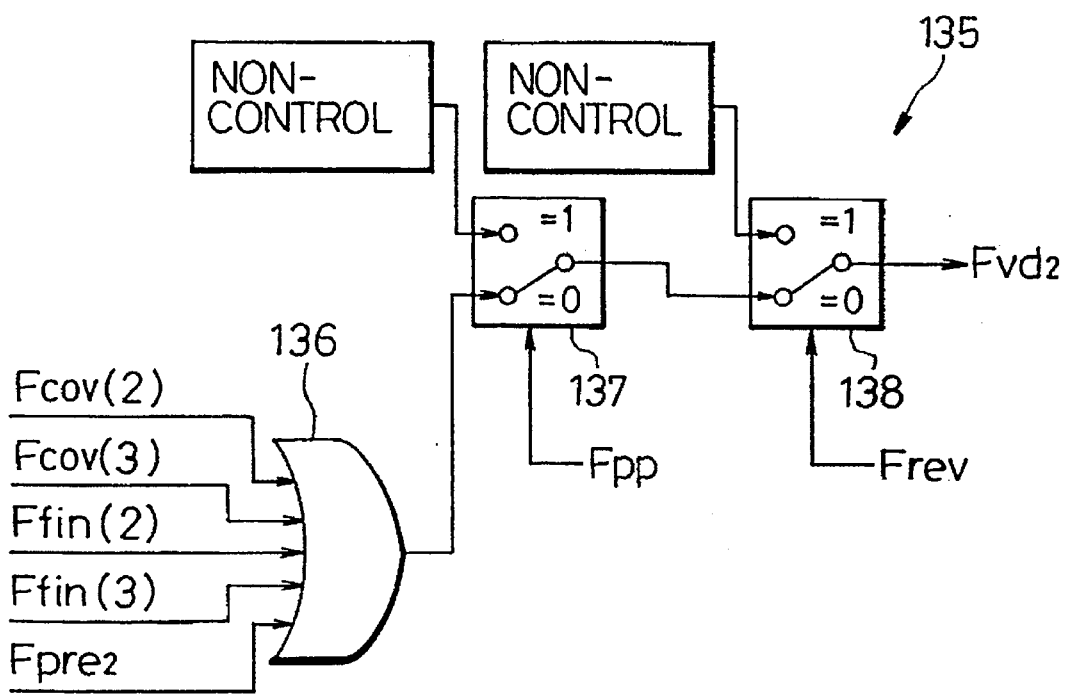
FIG. 38 is a block diagram showing part of the actuation determination section shown in FIG. 15.

A determination circuit 135 shown in FIG. 38 has the same construction and function as the determination circuit 131 of FIG. 37. However, the circuit 135 differs from the circuit 131 in that its OR circuit 136 is supplied with request flags Fcov(2) and Fcov(3), termination flags Ffin(2) and Ffin(3), and pre-pressurization flag Fpre2, which are associated with the cutoff valve 20 on the side of the front-right and rear-left wheels $FW_R$ and $RW_L$. The OR circuit 136 outputs a cut actuation flag Fvd2 for actuating the cutoff valve 20 via switches 137 and 138.

Figure 39:
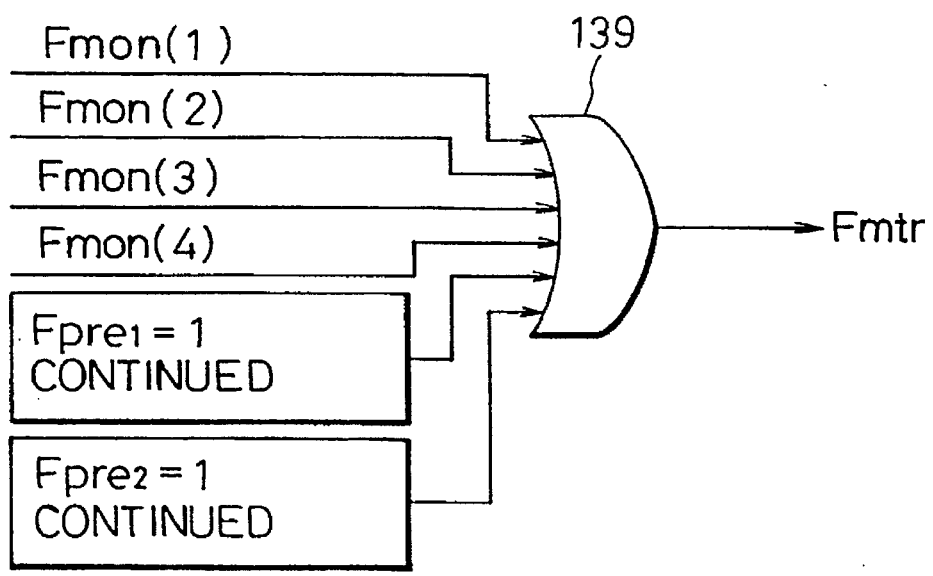
FIG. 39 is a block diagram showing part of the actuation determination section shown in FIG. 15.

The determination circuit or OR circuit 139 of FIG. 39 is supplied with the request flag Fmon(i), which indicates the presence/absence of the request for the actuation of the motor 18 for each wheel, and the pre-pressurization flags Fpre1 and Fpre2, which are indicative of the execution of the pre-pressurization control. If any of the flag values is 1, the value of the motor actuation flag Fmtr is outputted as 1.

ABS Cooperation Control

When the actuation mode My(i), pulse width Wy(i), cut actuation flags Fvd1 and Fvd2, and motor actuation flag Fmtr are set in the yaw moment control described above, ABS cooperation control is carried out (see determination section 78a of FIG. 3 and Step S7 of FIG. 4).

When the ABS control is effected, the ABS cooperation control is carried out to execute the yaw moment control in cooperation with the ABS control. In this ABS cooperation control, actuation modes Mabs(i) and pulse widths Wabs(i) for the individual wheels are set in consideration of the ABS control.

A detailed description of the setting of the actuation modes Mabs(i) and the pulse widths Wabs(i) will be omitted. It is to be noted, however, that the functions of the intensify-pressure/reduce-pressure inhibitory section 90 (see FIGS. 15 and 24) and the control signal forced-modification section 111 (see FIGS. 15 and 32) are reflected also in the actuation modes Mabs(i) and the pulse widths Wabs(i).

The following is a description of a function of the ABS cooperation control. In the case where the vehicle requires the turning moment (M+) or restoration moment M(−) while it is turning under the ABS control, the actuation modes Mabs(i) and the pulse widths Wabs(i) are set in the following manner in the ABS cooperation control.

Figure 40:
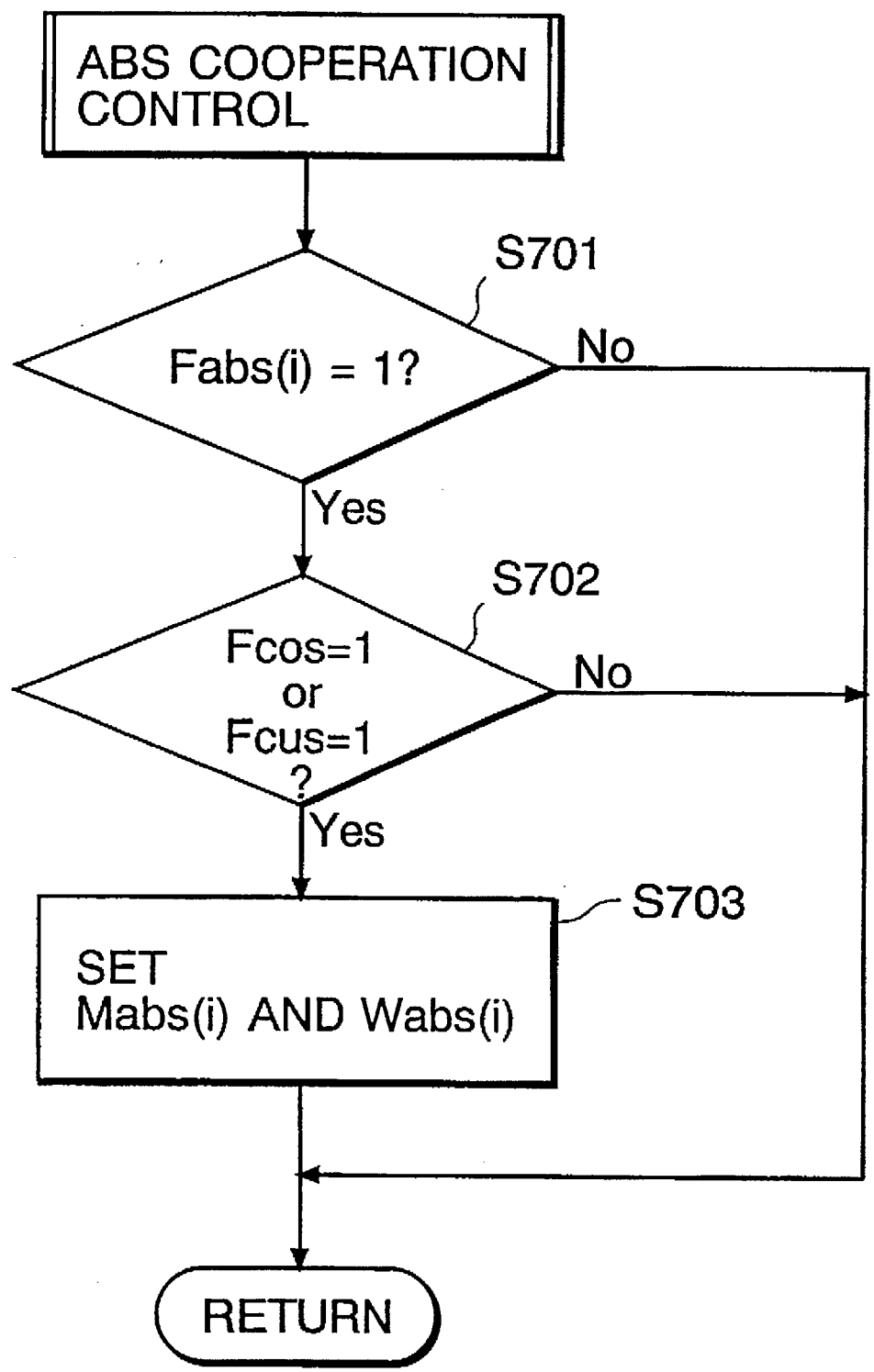
FIG. 40 is a flowchart showing an ABS cooperation routine.

In Step S701 of an ABS cooperation routine shown in FIG. 40, it is determined whether or not the vehicle is under the ABS control. This determination is based on whether or not the flag Fabs(i), which indicates the execution of the ABS control for each wheel, is 1. As is generally known, the flag Fabs(i) is set in accordance with the trend of the slip factor of the wheel concerned in an ABS control routine (not shown).

If the decision in Step S701 is Yes, it is determined whether or not the control execution flag Fcus or Fcos for the brake pressure control is 1 (Step S702). If the decision in Step S702 is Yes, that is, if it is concluded the vehicle requires the turning moment (M+) or restoration moment M(−) while it is turning, the actuation modes Mabs(i) and the pulse widths Wabs(i) are set in the following manner in Step S703, the next stage.

In the case where the yaw moment control is executed for a diagonal pair of wheels:

(1) To obtain the turning moment (M+) further, the outside front wheel FW in a turn is set in the reduce-pressure mode, and the pulse width concerned is set at the same value as that of the inside front wheel FW.

(2) To obtain the restoration moment M(−) further, the inside rear wheel RW in a turn is set in the reduce-pressure mode, and the pulse width concerned is set at the same value as that of the outside rear wheel RW.

The yaw moment control can be executed to a parallel pair of wheels on the front or rear side, as well as to the diagonal pair.

In executing the yaw moment control on the basis of the difference in braking force between left- and right-hand wheels, the restoration moment M(−) can be generated in the vehicle by setting the braking forces for the outside and inside wheels in the intensify-pressure and reduce-pressure modes, respectively. On the other hand, the turning moment M(+) can be generated in the vehicle by setting the braking forces for the outside and inside wheels in the reduce-pressure and intensify-pressure modes, respectively.

In order to obtain the turning moment M(+) further, in the case where the yaw moment control is executed for the rear-left and rear-right wheels, therefore, the outside rear wheel is set in the reduce-pressure mode, and is adjusted so as to share the pulse width with the inside rear wheel. In order to obtain the restoration moment M(−) further, in the case where the yaw moment control is executed for the front-left and front-right wheels, in contrast with this, the inside front wheel is set in the reduce-pressure mode, and is adjusted so as to share the pulse width with the outside front wheel.

If either of the decisions in Step S701 and S702 is No, on the other hand, this routine is terminated without the execution of Step S703.

Selection of Control Signals

Figure 41:
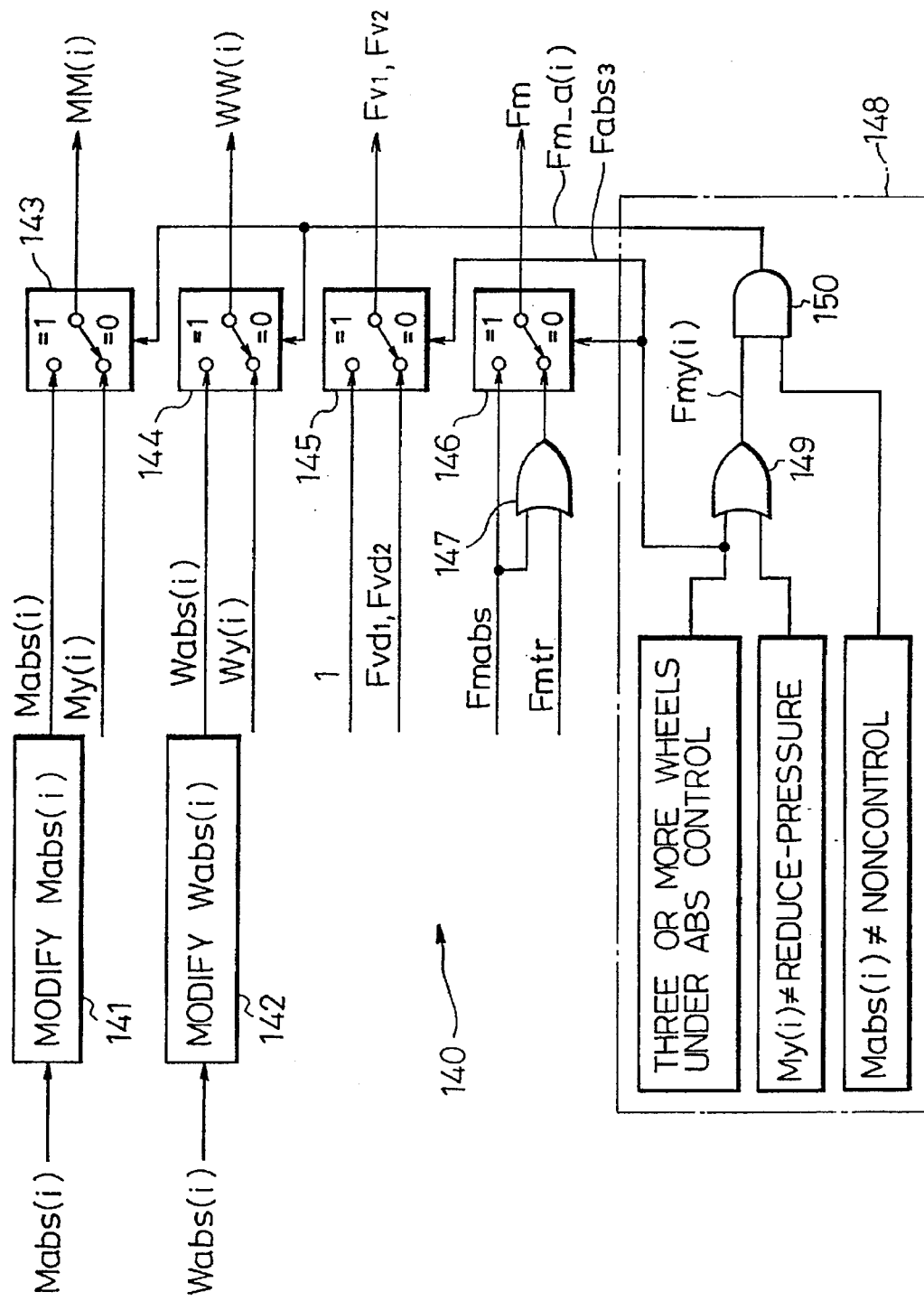
FIG. 41 is a block diagram showing the details of a control signal selecting section shown in FIG. 3.

When the ABS cooperation routine (routine for cooperation with ABS control), that is, Step S7 of FIG. 4, is finished, a control signal selection routine is carried out in Step S8 by means of a selecting circuit 140 shown in FIGS. 3 and 41. FIG. 41 also shows blocks 141 and 142 for carrying out the ABS cooperation routine of FIG. 40.

The selecting circuit 140 is provided with four switches 143, 144, 145 and 146. The switch 143 is supplied with the actuation modes Mabs(i) passed through the block 141 and the actuation mode My(i) set during the aforesaid yaw moment control. The switch 144 is supplied with the pulse width Wabs(i) passed through the block 142 and the pulse width Wy(i) set during the yaw moment control.

The switch 145 is supplied with the cut actuation flags Fvd1 and Fvd2, set during the yaw moment control, and a value of 1. The switch 146 is supplied with the motor actuation flag Fmtr, set during the yaw moment control, through an OR circuit 147, and also with a motor actuation flag Fmabs for the ABS control. The flag Fmabs is also supplied to the other input terminal of the OR circuit 147. The motor actuation flag Fmabs is a flag that is set by the ABS control itself, and Fmabs=1 is set at the start of the ABS control.

The switches 143 to 146 are shifted in response to flags delivered from a determination section 148. The determination section 148 includes an OR circuit 149, which delivers a flag Fmy(i)=1, in respect of the index i corresponding to a wheel for which the reduce-pressure mode is set, to an AND circuit 150 in the case where three or more wheels are under the ABS control or the actuation mode My(i) for the yaw moment control is not the reduce-pressure mode. When three or more wheels are under the ABS control, a flag Fabs3=1 is supplied to the switches 145 and 146.

When the actuation mode Mabs(i) for the ABS cooperation control is not the noncontrol mode, an actuation mode Mabs(i)=1 is applied to the AND circuit 150. If the AND circuit 150 is supplied with both the flag Fmy(i)=1 and Mabs(i)=1 with respect to a certain index i, a flag Fm_a(i)=1 for this index i is delivered from the AND circuit 150 to the switches 143 and 144.

If three or more wheels are under the ABS control, the flag Fabs3=1 is supplied from the determination section 148 to each of the switches 145 and 146. Accordingly, the switch 145 outputs a value of 1 as flags Fv1 and Fv2 (Fv1=Fv2=1), while the switch 146 outputs the motor actuation flag Fmabs as Fm. In the case where a flag Fabs3=0 is supplied to the switches 145 and 146, on the other hand, the switch 145 outputs the cut actuation flags Fvd1 and Fvd2 as the flags Fv1 and Fv2, respectively, while the switch 146 outputs the motor actuation flag Fmtr as Fm. Since the motor actuation flag Fmabs is supplied to the switch 146 through the OR circuit 147, the motor actuation flag Fm=1 is delivered from the switch 146 when either the flag Fmabs or Fmtr is set at 1 without regard to the shift of the switch 146.

If input conditions for the AND circuit 150 are met, on the other hand, the flag Fm_a(i)=1 is supplied from the circuit 150 to the switches 143 and 144. In this case, the switch 143 outputs the actuation mode Mabs(i) as an actuation mode MM(i), while switch 144 outputs the pulse width Wabs(i) as a pulse width WW(i). In the case where a flag Fm_a(i)=0 is supplied to the switches 143 and 144, in contrast with this, the switch 143 outputs the actuation mode My(i) as the actuation mode MM(i), while switch 144 outputs the pulse width Wy(i) as the pulse width WW(i).

Drive Signal Initial Setting

When the actuation mode MM(i) and the pulse width WW(i) are delivered from the control signal selecting circuit 140, they are set as an actual actuation mode Mexe(i) and an actual pulse width Wexe(i), respectively, by the drive signal initial setting section 151 of FIG. 3 in Step S9 of FIG. 4, and initial values are given to the actual actuation mode Mexe(i) and the actual pulse width Wexe(i), individually.

Figure 42:
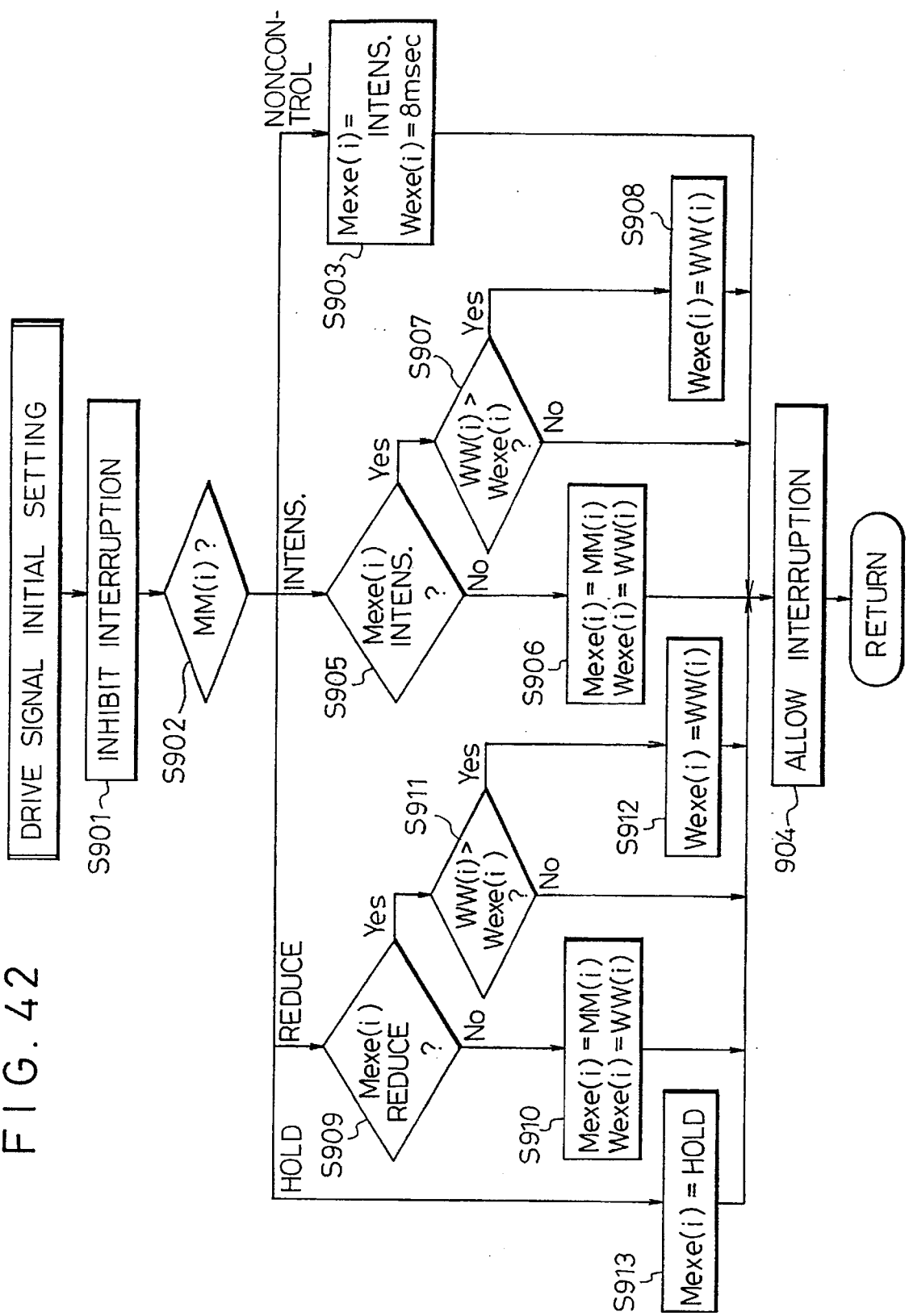
FIG. 42 is a flowchart showing a drive signal initial setting routine.

Step S9 is shown in detail in the flowchart of FIG. 42. After an interruption inhibiting process is first executed (Step S901), the actuation mode MM(i) is discriminated (Step S902).

If the decision in Step S902 indicates the noncontrol mode, the intensify-pressure mode is established as the actual actuation mode Mexe(i), and the control period T (=8 msec) for the main routine is set as the actual pulse width Wexe(i) (Step S903). After an interruption permitting process is executed (Step S904), the routine concerned is finished.

If the decision in Step S902 indicates the intensify-pressure mode, it is determined whether or not the actual actuation mode Mexe(i) is the intensify-pressure mode (Step S905). Since the actual actuation mode Mexe(i) is not established at this point of time, however, the decision in Step S905 is No. In this case, the actuation mode MM(i) or intensify-pressure mode is established as the actual actuation mode Mexe(i), and the pulse width WW(i) is set as the actual pulse width Wexe(i) (Step S906). Thereafter, the routine concerned is terminated after the execution of Step S904.

If it is concluded in Step S902 that the intensify-pressure mode is also maintained when the next routine is executed, the decision in Step S905 is Yes, whereupon it is determined whether or not the pulse width WW(i) is greater than the actual pulse width Wexe(i) (Step S907). Since the main routine is executed with every control period T, the pulse width WW(i) is newly set with every control period T. As mentioned later, however, the actual pulse width Wexe(i) decreases as the inlet or outlet valve is actually actuated. If it is concluded in Step S907 that the newly set pulse width WW(i) is longer than the remaining actual pulse width Wexe(i) at the present point of time, therefore, a new pulse width WW(i) is set as the actual pulse width Wexe(i) (Step S908). If the decision in Step S907 is No, however, the remaining actual pulse width Wexe(i) is maintained without resetting the new pulse width WW(i) as the actual pulse width Wexe(i).

If the decision in Step S902 indicates the reduce-pressure mode, on the other hand, Steps S909 to S912 are executed, whereupon the actual actuation mode Mexe(i) and the actual pulse width Wexe(i) are set in the same manner as in the case of the intensify-pressure mode.

If the decision in Step S902 indicates the reduce-pressure mode, moreover, the hold mode is established as the actual actuation mode Mexe(i) (Step S913).

Drive Signal Outputting

When the actual actuation mode Mexe(i) and the actual pulse width Wexe(i) are set in the manner described above, they are delivered from the drive signal initial setting section 151 to the valve actuating section 152, as shown in FIG. 3, and Step S10 of the main routine shown in FIG. 4 is executed.

In Step S10, drive signals for driving the cutoff valves 19 and 20 and the motor 18 are also outputted in accordance with the cut actuation flags Fv1 and Fv2 and the motor actuation flag Fm set in the foregoing control signal selection routine, as well as the actual actuation mode Mexe(i) and the actual pulse width Wexe(i).

A drive signal for closing the cutoff valve 19 is outputted if the cut actuation flag Fv1 is 1 (Fv1=1), while a drive signal for closing the cutoff valve 20 is outputted if the cut actuation flag Fv2 is 1 (Fv2=1). If the cut actuation flags F1 and Fv2 are reset at 0, in contrast with this, the cutoff valves 19 and 20 are kept open. In the case where the motor actuation flag Fm is 1 (Fm=1), on the other hand, a drive signal for actuating the motor 18 is outputted. In the case of Fm=0, the motor 18 is not actuated.

Actuation of Inlet and Outlet Valves

Figure 43:
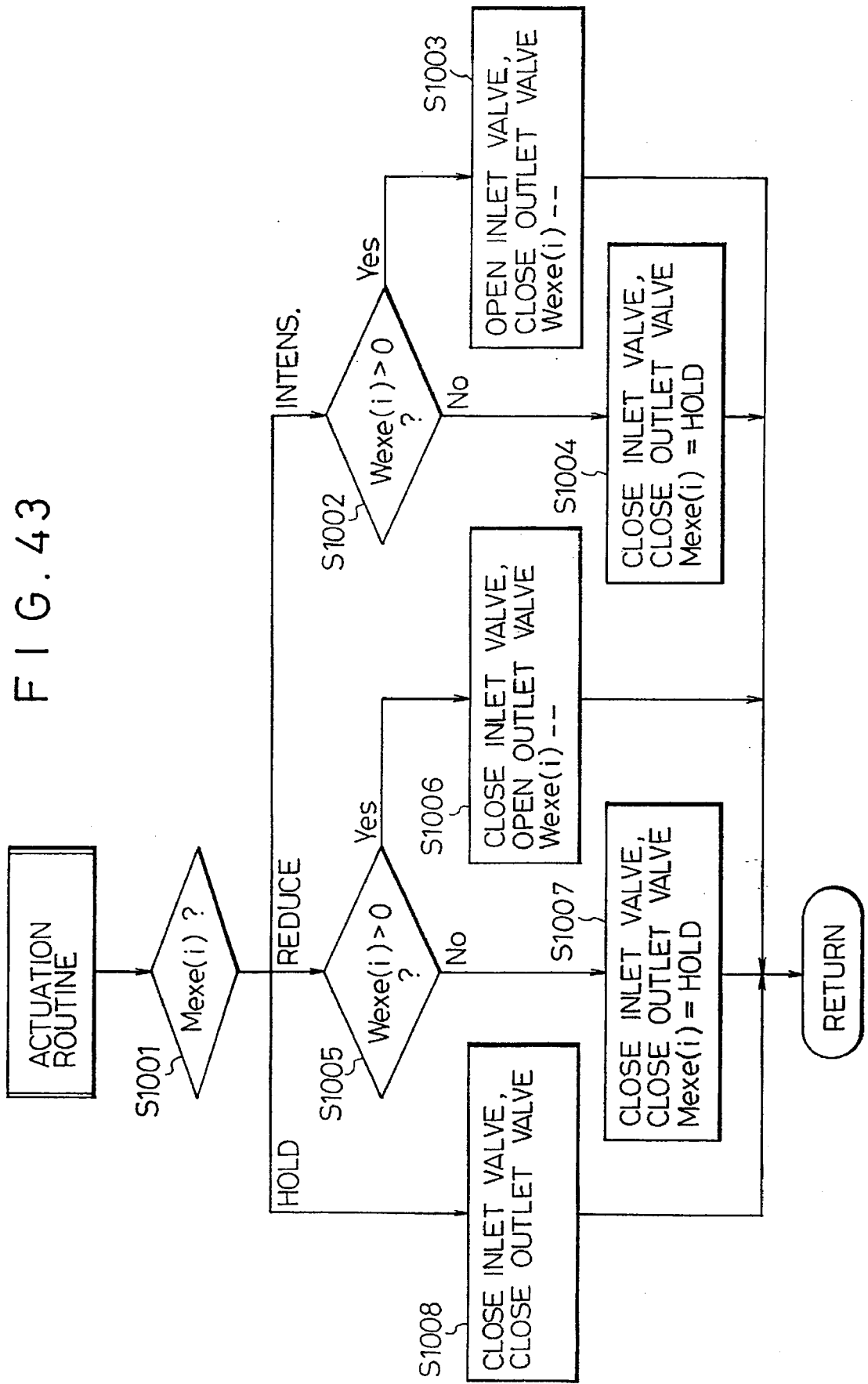
FIG. 43 is a flowchart showing an actuation routine.

When the valve actuating section 152 is supplied with the actual actuation mode Mexe(i) and the actual pulse width Wexe(i), it actuates the inlet and outlet valves 12 and 13 according to an actuation routine shown in FIG. 43. The actuation routine of FIG. 43 is executed independently of the main routine of FIG. 4, and its execution period is, for example, 1 msec.

In the actuation routine, the actual actuation mode Mexe (i) is first determined (Step S1001). If the actual actuation mode Mexe(i) is the intensify-pressure mode, in this determination, it is determined whether or not the actual pulse width Wexe(i) is greater than 0 (Step S1002). If the decision in Step S1002 is Yes, the inlet and outlet valves 12 and 13 for each wheel are opened and closed, respectively, and the actual pulse width Wexe(i) is reduced by a margin for its execution period (Step S1003). When Step S1003 is carried out, therefore, the pressure for the wheel brake corresponding to the target wheel is increased if the motor 18 is already actuated and if the corresponding cutoff valve 19 or 20 is closed.

If the decision in Step S1002 becomes No as the actuation routine is executed repeatedly with the intensify-pressure mode maintained as the actual actuation mode Mexe(i), both the inlet and outlet valves 12 and 13 for the wheel concerned are closed, and the pressure-hold mode is established as the actual actuation mode Mexe(i) (Step S1004).

If it is concluded in Step S1001 that the actual actuation mode Mexe(i) is the reduce-pressure mode, it is determined whether or not the actual pulse width Wexe(i) is greater than 0 (Step S1005), also in this case. If the decision in Step S1005 is Yes, the inlet and outlet valves 12 and 13 for the wheel concerned are closed and opened, respectively, and the actual pulse width Wexe(i) is reduced by a margin for its execution period (Step S1006). When Step S1006 is carried out, therefore, the pressure for the wheel brake corresponding to the target wheel is decreased.

Also in this case, the actuation routine is executed repeatedly with the reduce-pressure mode maintained as the actual actuation mode Mexe(i). If the decision in Step S1005 then becomes No, both the inlet and outlet valves 12 and 13 for the wheel concerned are closed, and the pressure-hold mode is established as the actual actuation mode Mexe(i) (Step S1007).

If it is concluded in Step S1001 that the actual actuation mode Mexe(i) is the pressure-hold mode, both the inlet and outlet valves 12 and 13 for the wheel concerned are closed (Step S1008).

Figure 44:
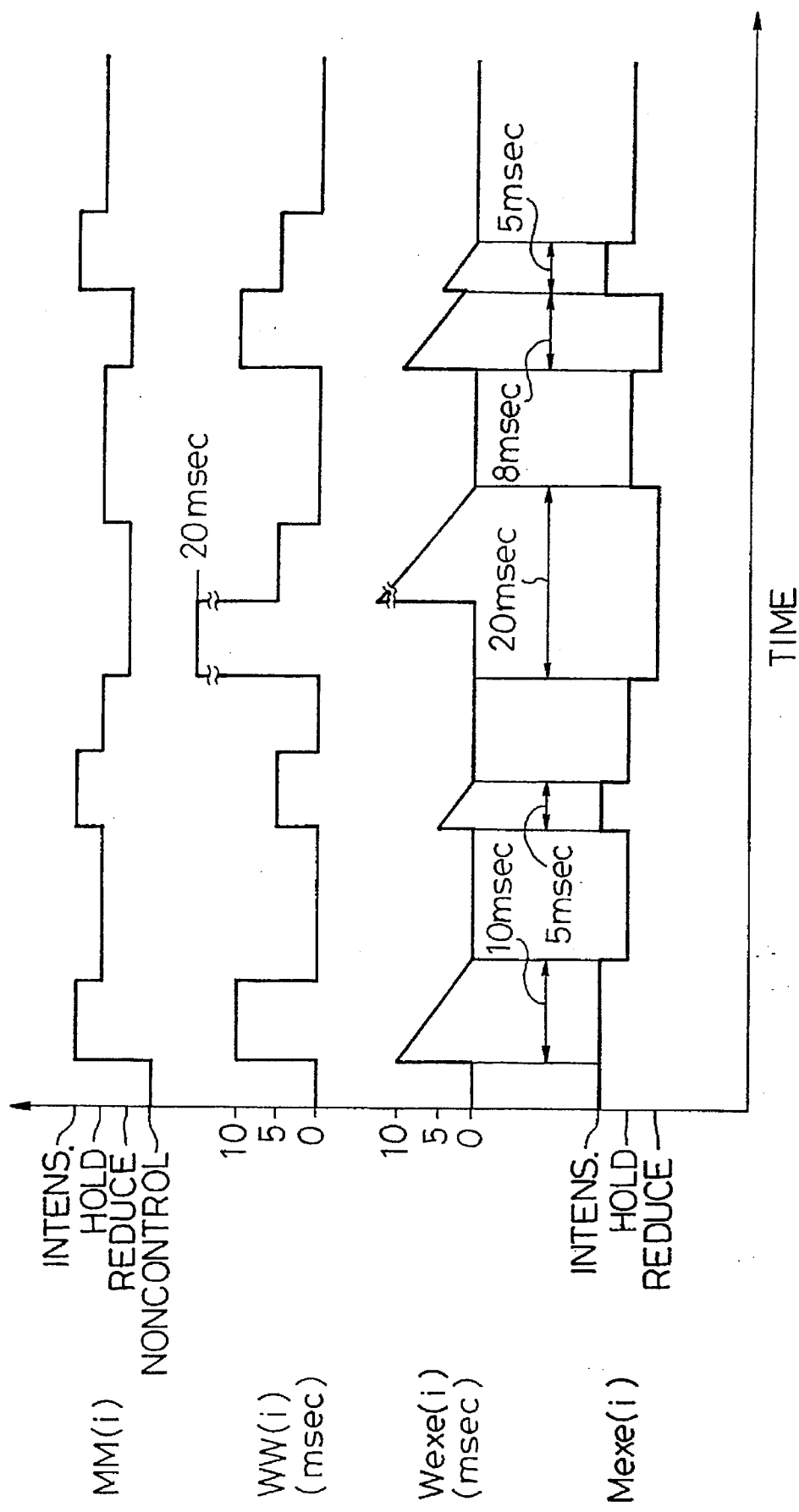
FIG. 44 is a time chart showing the relations between actuation mode MM(i), pulse width WW(i), actual actuation mode Mexe(i), and actual pulse width Wexe(i)

Referring to FIG. 44, there is shown a time chart illustrating the relations between the actuation mode MM(i), pulse width WW(i), actual actuation mode Mexe(i), and actual pulse width Wexe(i).

Effect of Yaw Moment Control

Diagonal Wheel Control

Let it be supposed that the vehicle is running and the main routine of FIG. 4 is being executed repeatedly. It can be concluded that the vehicle is turning clockwise if the turn flag Fd, which indicates a turn of the vehicle in accordance the steering-wheel angle $\theta$ and the yaw rate $\gamma$, is set at 1 in Step S3 of the main routine or in a turn determination routine shown in FIG. 8.

Clockwise Turn

Thereafter, the required yaw moment $\gamma d$ is obtained by executing Steps S4 and S5 of the main routine. When the yaw moment control of Step S6 is executed, the control mode selection routine of FIG. 18 is executed to set the control mode M(i) for each wheel on condition that the control beginning/ending flag Fymc (see the determination circuit of FIG. 16) is 1 (Fymc=1) in the yaw moment control. Since the vehicle is supposed to be turning clockwise, the decision in Step S601, in the selection routine of FIG. 18, is Yes, whereupon Step S602 and the subsequent steps are carried out.

US-Prone Clockwise Turn

If the decision in Step S602 is Yes, that is, if the vehicle has a marked tendency to US with the control execution flag Fcus=1, in this case, the reduce-pressure and intensify-pressure modes are established as the control modes M(1) and M(4) for the front-left (outside front) wheel $FW_L$ and the rear-right (inside rear) wheel $RW_R$, respectively, and the noncontrol mode as the control modes M(2) and M(3) for the other two wheels (see Table 1 and Step S603).

Based on the control mode M(i) and the required yaw moment $\gamma d$ for each wheel, thereafter, the actuation mode Mpls(i) is set in the aforementioned manner (see the setting routine of FIG. 23), and the pulse width Wpls(i) for each wheel is set. The actuation mode Mpls(i) and the pulse width Wpls(i) are changed into the actuation mode My(i) and the pulse width Wy(i), respectively, by the intensify-pressure/reduce-pressure inhibitory section 90 and the forced-modification section 111.

In the determination circuit 125 (FIG. 35) of the actuation determination section 124 of FIG. 15 (the determination circuits shown in FIGS. 35 to 39), on the other hand, the request flag Fmon(i) for each wheel, which requires the actuation of the motor 18, is set at 1 by the AND circuit 126 and the OR circuit 128, while the request flag Fcov(i) for each wheel, which requires the actuation of the cutoff valves 19 and 20, is set at 1 by the flip-flop 130, in the case where the brake flag Fb and the actuation mode My(i) are Fb=1 (brakes on) and the intensify-pressure mode, respectively.

When the vehicle is turning clockwise showing a marked tendency to US with the brake pedal 3 depressed, specifically, the output of the determination circuit 125 is Fmon(4)=Fcov(4)=1, the cut actuation flag Fv1=1 is outputted from the determination circuit 131 (OR circuit 132) of FIG. 37, and the motor actuation flag Fmtr at 1 is delivered from the determination circuit of FIG. 39 or the OR circuit 139. Since the request flag Fcov(2)=Fcov(3)=0 is satisfied, the cut actuation flag Fv2 outputted from the determination circuit 135 (OR circuit 136) of FIG. 38 is 0 (Fvd2=0).

When the vehicle is braked, therefore, only one cut actuation flag, Fvd1 in this case, is set at 1. Thereafter, the cut actuation flag Fvd1=1 and the motor actuation flag Fmtr=1 are changed into Fv1=1, Fv2=0, and Fm=1 by the control signal selecting circuit 140 of FIG. 3 (or switches 145 and 146 in FIG. 41), and these flags are supplied as drive signals to the cutoff valves 19 and 20 and the motor 18. Thus, in this case, the motor 18 is actuated in a state such that only the cutoff valve 19, which is associated with the wheel brakes for the front-left and rear-right wheels $FW_L$ and $RW_R$, is closed, and the cutoff valve 20, which is associated with the wheel brakes for the front-right and rear-left wheels $FW_R$ and $RW_L$, is left open. As the motor 18 is driven in this manner, a pressurized fluid is discharged from the pumps 16 and 17.

When the brake pedal 3 is not depressed, that is, when the vehicle is not braked, the control modes M(1) and M(4) for the front-left and rear-right wheels $FW_L$ and $RW_R$ are not the noncontrol mode, so that a request flag Fmon(1)=Fmon(4) =1 is delivered from the determination circuit 125 through the AND circuit 127 and the OR circuit 128 thereof, and Fcov(1)=Fcov(4)=1 from the flip-flop 130. Also in this case, therefore, the motor actuation flag Fmtr is Fmtr=1, so that the motor 18 or the pumps 16 and 17 are actuated, and only the cut actuation flag Fvd1 is set at 1, whereupon only the cutoff valve 19 is closed.

If the actuation mode Mpls(i) is processed in the control signal forced-modification section 111 (FIG. 15) when the vehicle is not braked, however, the flag Fhld delivered from the noncontrol diagonal hold determination section 118 (FIG. 32) is set at 1, so that the switch 112 is shifted. It is to be noted, therefore, that the actuation mode Mpls(i) is compulsorily changed from the noncontrol mode to the hold mode.

When the vehicle is not braked (Fb=0), moreover, the correction value Cpi of the required yaw moment γd to be computed (see FIG. 10) is set at 1.5, which is greater than 1.0 for the case where the vehicle is braked, so that the level of the required yaw moment γd is raised. This rise in level shortens the pulse period Tpls during which the actuation mode Mpls(i) or My(i) is executed. It is to be noted, therefore, that the pressure increase or decrease is executed positively if the actuation mode My(i) is the intensify-pressure or reduce-pressure mode.

Thereafter, the actuation mode My(i) and the pulse width Wy(i) are set as the actuation mode MM(i) and the pulse width WW(i), respectively, by the control signal selecting circuit 140, as mentioned before, and moreover, the actual actuation mode Mexe(i) and the actual pulse width Wexe(i) are set in accordance with the set values. As a result, the corresponding inlet and outlet valves 12 and 13 are actuated in accordance with the actual actuation mode Mexe(i) and the actual pulse width Wexe(i) (see the actuation routine of FIG. 43).

Specifically, the actual actuation mode Mexe(1) for the wheel brake for the front-left wheel $FW_L$ is the reduce-pressure mode when the vehicle is braked as it makes a clockwise turn showing a marked tendency to US. Accordingly, the inlet and outlet valves 12 and 13 corresponding to the wheel brake concerned are closed and opened, respectively (Step S1006 of FIG. 43), so that the brake pressure for the front-left wheel $FW_L$ is decreased. On the other hand, in this case, the actual actuation mode Mexe(4) for the wheel brake for the rear-right wheel $RW_R$ is the intensify-pressure mode, so that the inlet and outlet valves 12 and 13 corresponding to the wheel brake concerned are opened and closed, respectively (Step S1003 of FIG. 43). At this point of time, the cutoff valve 19 is closed, and the pumps 16 and 17 are actuated by the pump 18, as mentioned before. Accordingly, the pressure in the branch brake line 8 (see FIG. 1), which leads to the wheel brake for the rear-right wheel $RW_R$, is already raised independently of the master cylinder pressure, so that the wheel brake for the rear-right wheel $RW_R$ is supplied with the pressurized fluid from the branch brake line 8 through the inlet valve 12. Thus, the brake pressure for the rear-right wheel $RW_R$ is increased.

Figure 45:
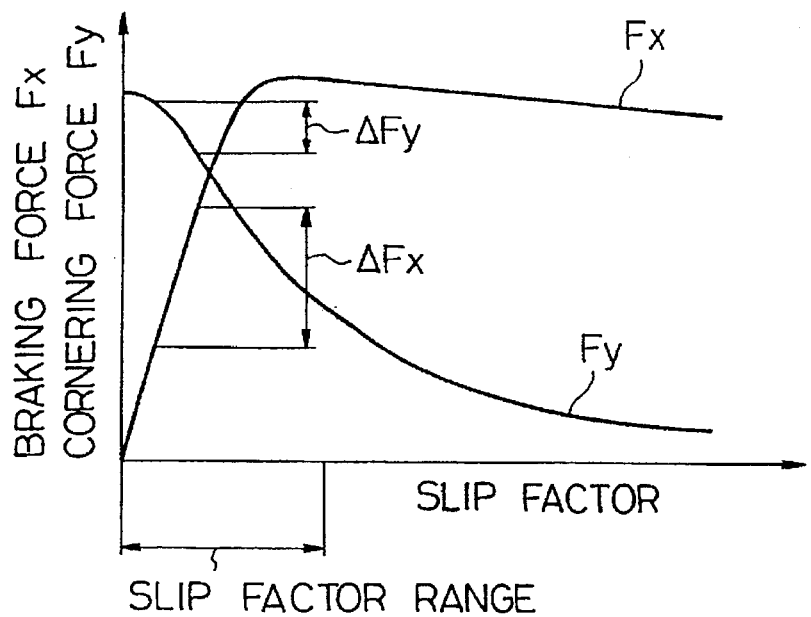
FIG. 45 is a graph showing braking force and cornering force characteristics versus the slip factor.

FIG. 45 shows braking force/cornering force characteristics compared with the slip factor. If the brake pressure or braking force Fx for a wheel decreases, as seen from the characteristic curves of FIG. 45, the slip factor also decreases within a slip factor range for the case where the vehicle is in normal running conditions. If the braking force Fx increases, in contrast with this, the slip factor also increases. The decrease and increase of the slip factor cause the cornering force to increase and decrease, respectively.

Figure 46:
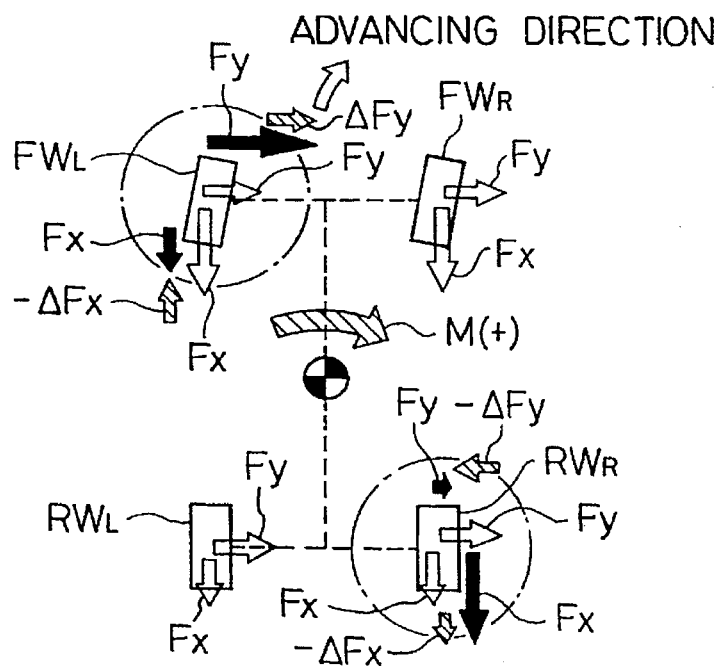
FIG. 46 is a diagram for illustrating the result of execution of yaw moment control obtained when the vehicle is braked while making a US-prone clockwise turn.

If the braking force Fx for the front-left wheel $FW_L$ is decreased from the magnitude indicated by white arrow to the magnitude indicated by black arrow, as shown in FIG. 46, therefore, the cornering force Fy increases from the magnitude indicated by white arrow to the magnitude indicated by black arrow. If the braking force Fx for the rear-right wheel $RW_R$ is increased as indicated by white and black arrows, on the other hand, the cornering force Fy decreases from the magnitude indicated by white arrow to the magnitude indicated by black arrow. Thus, the smaller the braking force Fx on the front-left wheel $FW_L$, the more heavily the cornering force Fy acts on the wheel. The greater the braking force Fx on the rear-right wheel $RW_R$, on the other hand, the smaller the cornering force Fy on the wheel is. Accordingly, the vehicle is subjected to the turning moment M(+) in the direction of its turn.

In FIG. 46, hatched arrows indicate variations ±ΔFx and ±ΔFy of the braking force Fx and the cornering force Fy.

The inlet and outlet valves 12 and 13 for the front-left and rear-right wheels $FW_L$ and $RW_R$, a diagonal pair of vehicle wheels, are opened and closed in accordance with the actual actuation mode Mexe(i) and the actual pulse width Wexe(i) set on the basis of the required yaw moment γd, so that the turning moment M(+) can be applied properly to the vehicle. Thus, the tendency of the vehicle to US can be removed, so that the vehicle can be prevented from drifting out.

Since the required yaw moment γd is computed in consideration of the operating conditions and manipulations of the vehicle (see Steps S504 and S505 in the computation routine of FIG. 11), fine yaw moment control can be effected according to the way the vehicle turns by increasing or decreasing the braking forces for the diagonal pair of wheels in accordance with the required yaw moment γd.

In starting this yaw moment control, moreover, the pulse width Wpls(i) is tempered with the response delay correction value Δty in order to compensate for the response delay of the pump 16 or 17 (see FIG. 21), and pre-pressurization control (see FIG. 30) is carried out such that the brake pressure for the target wheel to be controlled is previously increased just before the start of the control. Accordingly, an adequate brake pressure can be obtained at the start of the control, and the yaw moment control can be carried out very accurately and smoothly.

In the case where the yaw moment control is carried out while the vehicle is being normally braked by depressing the brake pedal 3, furthermore, the motor 18 is actuated to drive the pumps 16 and 17 only when the control mode M(i) is the intensify-pressure mode (see FIG. 36.). Since the discharge pressure of the pump 16 or 17 acting on the brake pedal 3 can be decreased as required, therefore, the driver can avoid getting an uneasy feeling such that the pedal 3 rebounds.

OS-Prone Clockwise Turn

If Steps S602 and S604 in the control mode selection routine of FIG. 18 are No and Yes, respectively, that is, if the vehicle has a marked tendency to OS with Fcos=1, the intensify-pressure and reduce-pressure modes are established as the control modes M(1) and M(4) for the front-left wheel $FW_L$ and the rear-right wheel $RW_R$, respectively (see Table 1 and Step S605). The OS-prone clockwise turn differs from the US-prone clockwise turn in this respect.

Figure 47:
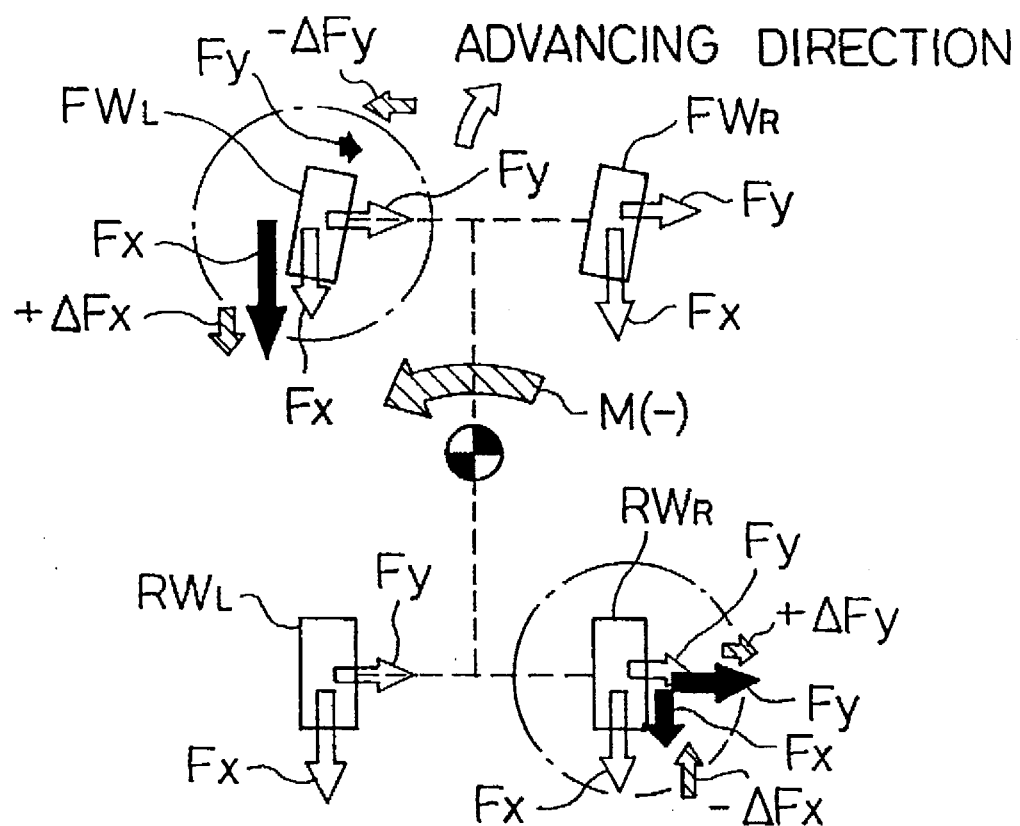
FIG. 47 is a diagram for illustrating the result of execution of yaw moment control obtained when the vehicle is braked while making an OS-prone clockwise turn.

When the vehicle is braked, the braking force Fx and cornering force Fy for the front-left wheel $FW_L$ increase and decrease, respectively, while the forces Fx and Fy for the rear-right wheel $RW_R$ decrease and increase, respectively, as shown in FIG. 47. In this case, therefore, the vehicle is subjected to the restoration moment M(−). The restoration moment M(−) serves to remove the tendency of the vehicle to OS, thereby preventing spinning of the vehicle attributable to a tack-in.

Counterclockwise Turn

When the yaw moment control is executed for a counterclockwise turn with the turn flag Fd=0 and control beginning/ending flag Fymc=1, the turning moment M(+) is generated in the case where the vehicle has a marked tendency to US, as in the case of the clockwise turn. If the vehicle has a marked tendency to OS, on the other hand, the brake pressures for the front-right and rear-left wheels $FW_R$ and $RW_L$ are controlled in order to generate the restoration moment M(−). Thus, the same effect for the case of the clockwise turn can be obtained (see Table 1 and Steps S607 to S611 of FIG. 18 and actuation routine of FIG. 43).

In effecting the yaw moment control, according to the embodiment described herein, the required yaw moment γd is computed in accordance with the information from the yaw rate sensor 30, and yaw rate feedback control is carried out on the basis of the computed moment γd. Alternatively, however, open control may be effected in accordance with the lateral acceleration Gy or the combination of the vehicle velocity V and the steering-wheel angle δ.

What is claimed is:

1. A vehicle turn control apparatus, which includes a hydraulic circuit connecting a master cylinder connected to a brake pedal and wheel brakes provided corresponding individually to wheels of a vehicle, a pump adapted to generate and supply a hydraulic pressure to the hydraulic circuit when actuated, and a hydraulic pressure control valve unit arranged in the hydraulic circuit so as to be located between the pump and the wheel brakes and adapted to adjust the hydraulic pressure generated by the pump, and which supplies the hydraulic pressure, generated by the pump and adjusted by means of the hydraulic pressure control valve unit, to one or more required wheel brakes while there is a turn control request, said apparatus comprising:

required control valve calculating means for deriving a required control valve for yaw moment control in accordance with an operating condition and/or behavior of the vehicle;

pre-pressurization control means for actuating the pump when a first predetermined value is reached by the required control valve; and hydraulic pressure control means for controlling the operation of the hydraulic pressure control valve unit in accordance with the required control valve, the hydraulic pressure control means being adapted to discriminate the turn control request and start the operation control for the hydraulic pressure control valve unit when a second predetermined value greater than the first predetermined value is reached by the required controlled variable.

2. The vehicle turn control apparatus according to claim 1, wherein said pre-pressurization control means causes the hydraulic pressure control means to start the operation control for the hydraulic pressure control valve unit when the first predetermined value is reached by the required control valve.

3. The vehicle turn control apparatus according to claim 2, wherein said pre-pressurization control means causes the hydraulic pressure control means to carry out the operation control for the hydraulic pressure control valve unit so that the hydraulic pressure applied to the one or more required wheel brakes increases gradually.

4. The vehicle turn control apparatus according to claim 1, 2 or 3, wherein said pre-pressurization control means continues the operation of the pump for a predetermined period of time when the required control valve falls below the first predetermined value after once reaching the first predetermined value.

5. The vehicle turn control apparatus according to any one of claims 1, 2 or 3, wherein said pre-pressurization control means allows the pump to be operated only when the brake pedal is not operated and if the required control valve is greater than the first predetermined value.

6. The vehicle turn control apparatus according to any one of claims 1, 2 or 3, wherein said required control valve calculating means includes yaw rate detecting means for detecting an actual yaw rate of the vehicle and setting means for setting the required control valve in accordance with the actual yaw rate detected by the yaw rate detecting means.

7. The vehicle turn control apparatus according to claim 6, wherein said required control valve calculating means includes target yaw rate setting means for setting a target yaw rate for the vehicle, the target yaw rate setting means setting the required control valve in accordance with a yaw rate deviation between the actual yaw rate and the target yaw rate or a time derivative of the yaw rate deviation.

8. The vehicle turn control apparatus according to any one of claims 1, 2 or 3, wherein said pre-pressurization control means causes the hydraulic pressure control means to control the operation of the hydraulic pressure control valve unit so that a braking force applied to one wheel, out of an outside front wheel and inside rear wheel of the vehicle, as viewed with respect to a turn of the vehicle, increases and a braking force applied to the other wheel decreases when the vehicle is braked while turning.

\* \* \* \* \*